United States Patent
Bushman et al.

(10) Patent No.: US 11,736,801 B2
(45) Date of Patent: Aug. 22, 2023

(54) MERGING WEBCAM SIGNALS FROM MULTIPLE CAMERAS

(71) Applicant: Owl Labs Inc., Somerville, MA (US)

(72) Inventors: Tom Bushman, Marblehead, MA (US); Ilya Moskovko, Campbell, CA (US); Howard Brown, Arlington, MA (US)

(73) Assignee: OWL LABS INC., Boston, MA (US)

( * ) Notice: Subject to any disclaimer, the term of this patent is extended or adjusted under 35 U.S.C. 154(b) by 0 days.

(21) Appl. No.: 17/411,016

(22) Filed: Aug. 24, 2021

(65) Prior Publication Data

US 2022/0070371 A1 Mar. 3, 2022

Related U.S. Application Data

(60) Provisional application No. 63/069,710, filed on Aug. 24, 2020.

(51) Int. Cl.
*H04N 23/698* (2023.01)
*G06F 3/01* (2006.01)
(Continued)

(52) U.S. Cl.
CPC ........... *H04N 23/698* (2023.01); *G06F 3/013* (2013.01); *G06F 3/165* (2013.01); *H04N 5/06* (2013.01);
(Continued)

(58) Field of Classification Search
CPC .. H04N 5/23238; H04N 5/06; H04N 5/23206; H04N 5/23219; H04N 7/142; H04N 7/147; G06F 3/013; G06F 3/165
(Continued)

(56) References Cited

U.S. PATENT DOCUMENTS

| | | | |
|---|---|---|---|
| 5,914,940 A | * | 6/1999 | Fukuoka .......... H04N 21/43072 370/263 |
| 6,388,654 B1 | | 5/2002 | Platzker et al. |

(Continued)

FOREIGN PATENT DOCUMENTS

| | | |
|---|---|---|
| AU | 2016242980 B2 | 8/2019 |
| AU | 2019261804 B2 | 1/2022 |

(Continued)

OTHER PUBLICATIONS

International Search Report and Written Opinion issued by the European Patent Office as International Searching Authority in International Application No. PCT/US21/44578, dated Jan. 4, 2022 (22 pages).

(Continued)

*Primary Examiner* — Thai Q Tran
*Assistant Examiner* — Stephen R Smith
(74) *Attorney, Agent, or Firm* — Wilmer Cutler Pickering Hale and Dorr LLP

(57) ABSTRACT

A system includes a camera for capturing a first panorama view. The system determines a first bearing of a person within the first panorama view, and a first gaze direction of the person within the first panorama view. The system receives, from an external source, a second panorama view, a second bearing of the person within the second panorama view, and a second gaze direction of the person within the second panorama view. The system selects, by comparing the first gaze direction and the second gaze direction, a selected panorama view and a selected bearing of the person. The system forms a localized subscene video signal based on the selected panorama view along the selected bearing of the person. The system generates a stage view signal based on the localized subscene video signal, and composites a composited signal comprising the stage view signal.

24 Claims, 27 Drawing Sheets

(51) Int. Cl.
    *G06F 3/16*         (2006.01)
    *H04N 5/06*       (2006.01)
    *H04N 23/611*    (2023.01)
    *H04N 23/661*    (2023.01)

(52) U.S. Cl.
    CPC ......... *H04N 23/611* (2023.01); *H04N 23/661* (2023.01)

(58) Field of Classification Search
    USPC ............... 348/36, 14.01, 14.03, 14.08, 14.09
    See application file for complete search history.

(56) References Cited

U.S. PATENT DOCUMENTS

| | | | |
|---|---|---|---|
| D618,192 S | 6/2010 | Huang et al. | |
| D651,185 S | 12/2011 | Andresen | |
| 8,180,112 B2 | 5/2012 | Kurtz et al. | |
| D702,658 S | 4/2014 | Kim et al. | |
| 9,154,730 B2 | 10/2015 | Lee | |
| 10,091,412 B1* | 10/2018 | Feng | H04N 5/23219 |
| D864,137 S | 10/2019 | Chang et al. | |
| 10,636,154 B2 | 4/2020 | Schnittman et al. | |
| D902,880 S | 11/2020 | Florczak et al. | |
| D913,260 S | 3/2021 | Fahrendorff et al. | |
| 10,991,108 B2 | 4/2021 | Schnittman et al. | |
| D951,222 S | 5/2022 | Su et al. | |
| 2003/0081820 A1 | 5/2003 | Ainash | |
| 2003/0103647 A1 | 6/2003 | Rui et al. | |
| 2004/0008423 A1 | 1/2004 | Driscoll, Jr. et al. | |
| 2004/0254982 A1 | 12/2004 | Hoffman et al. | |
| 2004/0263611 A1 | 12/2004 | Cutler | |
| 2004/0263636 A1 | 12/2004 | Cutler | |
| 2005/0099492 A1 | 5/2005 | Orr | |
| 2005/0122389 A1* | 6/2005 | Miao | H04N 7/152 348/E7.084 |
| 2005/0140779 A1 | 6/2005 | Schulz et al. | |
| 2006/0164552 A1 | 7/2006 | Cutler | |
| 2007/0263076 A1 | 11/2007 | Andrews et al. | |
| 2007/0297682 A1 | 12/2007 | Zhang et al. | |
| 2008/0218582 A1 | 9/2008 | Buckler | |
| 2009/0002476 A1 | 1/2009 | Cutler | |
| 2009/0002477 A1 | 1/2009 | Cutler | |
| 2009/0079812 A1 | 3/2009 | Crenshaw et al. | |
| 2009/0219387 A1 | 9/2009 | Marman et al. | |
| 2010/0123770 A1* | 5/2010 | Friel | H04N 7/15 348/240.99 |
| 2010/0149305 A1 | 6/2010 | Catchpole et al. | |
| 2010/0157016 A1 | 6/2010 | Sylvain | |
| 2011/0033086 A1 | 2/2011 | Kubota | |
| 2012/0154513 A1 | 6/2012 | Su | |
| 2012/0268553 A1* | 10/2012 | Talukder | H04L 65/1069 348/E7.083 |
| 2012/0281057 A1 | 11/2012 | Couse | |
| 2013/0271560 A1 | 10/2013 | Diao | |
| 2014/0114664 A1 | 4/2014 | Khan et al. | |
| 2014/0168354 A1* | 6/2014 | Clavel | H04N 7/152 348/14.09 |
| 2014/0233801 A1 | 8/2014 | Cho et al. | |
| 2015/0156416 A1 | 6/2015 | Filip | |
| 2015/0205457 A1 | 7/2015 | Woo | |
| 2015/0271446 A1 | 9/2015 | Browne et al. | |
| 2015/0304366 A1 | 10/2015 | Bader-Natal | |
| 2015/0341719 A1 | 11/2015 | Sun | |
| 2016/0112469 A1* | 4/2016 | Liu | H04L 65/403 348/14.09 |
| 2016/0112673 A1* | 4/2016 | Feng | H04L 65/403 348/14.08 |
| 2016/0134838 A1 | 5/2016 | Tangeland et al. | |
| 2016/0150186 A1 | 5/2016 | Huber et al. | |
| 2016/0292884 A1 | 10/2016 | Schnittman et al. | |
| 2016/0295128 A1* | 10/2016 | Schnittman | G10L 21/028 |
| 2017/0076491 A1 | 3/2017 | Jiang et al. | |
| 2017/0133036 A1 | 5/2017 | Cohen et al. | |
| 2017/0372449 A1 | 12/2017 | Yarvis et al. | |
| 2018/0122044 A1 | 5/2018 | Bai et al. | |
| 2018/0374192 A1 | 12/2018 | Kunkel et al. | |
| 2019/0087198 A1 | 3/2019 | Frascati et al. | |
| 2021/0082131 A1 | 3/2021 | Schnittman et al. | |
| 2022/0046186 A1 | 2/2022 | Fayad et al. | |
| 2022/0070371 A1 | 3/2022 | Bushman et al. | |
| 2022/0232262 A1* | 7/2022 | Nicholson | H04N 21/854 |

FOREIGN PATENT DOCUMENTS

| | | |
|---|---|---|
| CN | 1479525 | 3/2004 |
| CN | 1155292 C | 6/2004 |
| CN | 107980221 A | 5/2018 |
| JP | H5122689 A | 5/1993 |
| JP | H10145763 A | 5/1998 |
| JP | H11331827 A | 11/1999 |
| JP | 2004-248125 | 9/2004 |
| JP | 2004-248125 A | 9/2004 |
| JP | 2005341015 A | 12/2005 |
| JP | 2006263348 A | 10/2006 |
| JP | 2007124149 A | 5/2007 |
| JP | 2007-158860 A | 6/2007 |
| JP | 2009182980 A | 8/2009 |
| JP | 2009278568 A | 11/2009 |
| JP | 4908543 B2 | 4/2012 |
| JP | 2012099906 A | 5/2012 |
| JP | 2013115527 A | 6/2013 |
| KR | 100953509 B1 | 4/2010 |
| WO | WO-2000030402 A1 | 5/2000 |
| WO | WO-2014123306 | 8/2014 |
| WO | WO-2014178235 | 11/2014 |
| WO | WO-2016161288 | 10/2016 |
| WO | WO-2022031872 | 2/2022 |
| WO | WO-2022/046810 | 3/2022 |

OTHER PUBLICATIONS

Bernardin, et al., "Audio-Visual Multi-Person Tracking and Identification for Smart Environments", Computer Supported Cooperative Work, ACM, MM'07, pp. 661-670, Sep. 23-28, 2007 (10 pages).
Dimitrova, et al., "Video Classification Based on HMM Using Text and Faces", IEEE 10th European Signal Processing Conference, pp. 1-4, Sep. 4, 2000 (4 pages).
EP Search Report issued for European Patent Application No. EP21209838.8, dated Mar. 18, 2022 (12 pages).
International Search Report and Written Opinion issued by European Patent Office as International Searching Authority for International Application No. PCT/US21/47404, dated Feb. 28, 2022 (23 pages).
Luo, et al., "Multiple Object Tracking: A Literature Review", <URL: https://arxiv.org/pdf/1409.7618v4.pdf>, accessed May 22, 2017 (18 pages).
Zhang, et al., "Semantic Saliency Driven Camera Control for Personal Remote Collaboration", IEEE 10th Workshop on Multimedia Signal Processing, pp. 28-33, Oct. 8, 2008 (6 pages).
"Universal Serial Bus Device Class Definition for Video Devices, Revision 1.5", Video Class v1.5 document set, <URL: https://www.usb.org/document-library/video-class-v15-document-set>, USB Implementers Forum, Inc., Aug. 9, 2012 (527 pages).
Extended European Search Report for European Patent Application Serial No. 16774312.9, dated Nov. 28, 2018 (11 pages).
International Search Report and the Written Opinion issued by the Korean Patent Office as International Searching Authority in International Patent Application No. PCT/US2016/025557, dated Jul. 14, 2016 (12 pages).
Wikipedia, "List of Bluetooth profiles", <URL: https://en.wikipedia.org/wiki/List_of_Bluetooth_profiles>, accessed Oct. 27, 2021 (16 pages).
Wikipedia, "USB video device class", <URL: https://en.wikipedia.org/wiki/USB_video_device_class>, accessed Dec. 8, 2021 (4 pages).
Wikipedia, "Wi-Fi Direct", <URL: https://en.wikipedia.org/wiki/Wi-Fi_Direct>, accessed Dec. 8, 2021 (6 pages).

(56) References Cited

OTHER PUBLICATIONS amazon.com, "Meeting HQ Device", Owl Labs, https://www.amazon.com/Meeting-HQ-Device-Computer-Microsoft/dp/B09QV9TDMC?th=1, accessed Jun. 2, 2022 (8 pages).

International Preliminary Report on Patentability as issued by European Patent Office in International Application No. PCT/US21/47404, dated Mar. 9, 2023 (14 pages).

International Preliminary Report on Patentability issued by the European Patent Office as International Searching Authority in International Application No. PCT/US21/44578, dated Feb. 16, 2023 (13 pages).

* cited by examiner

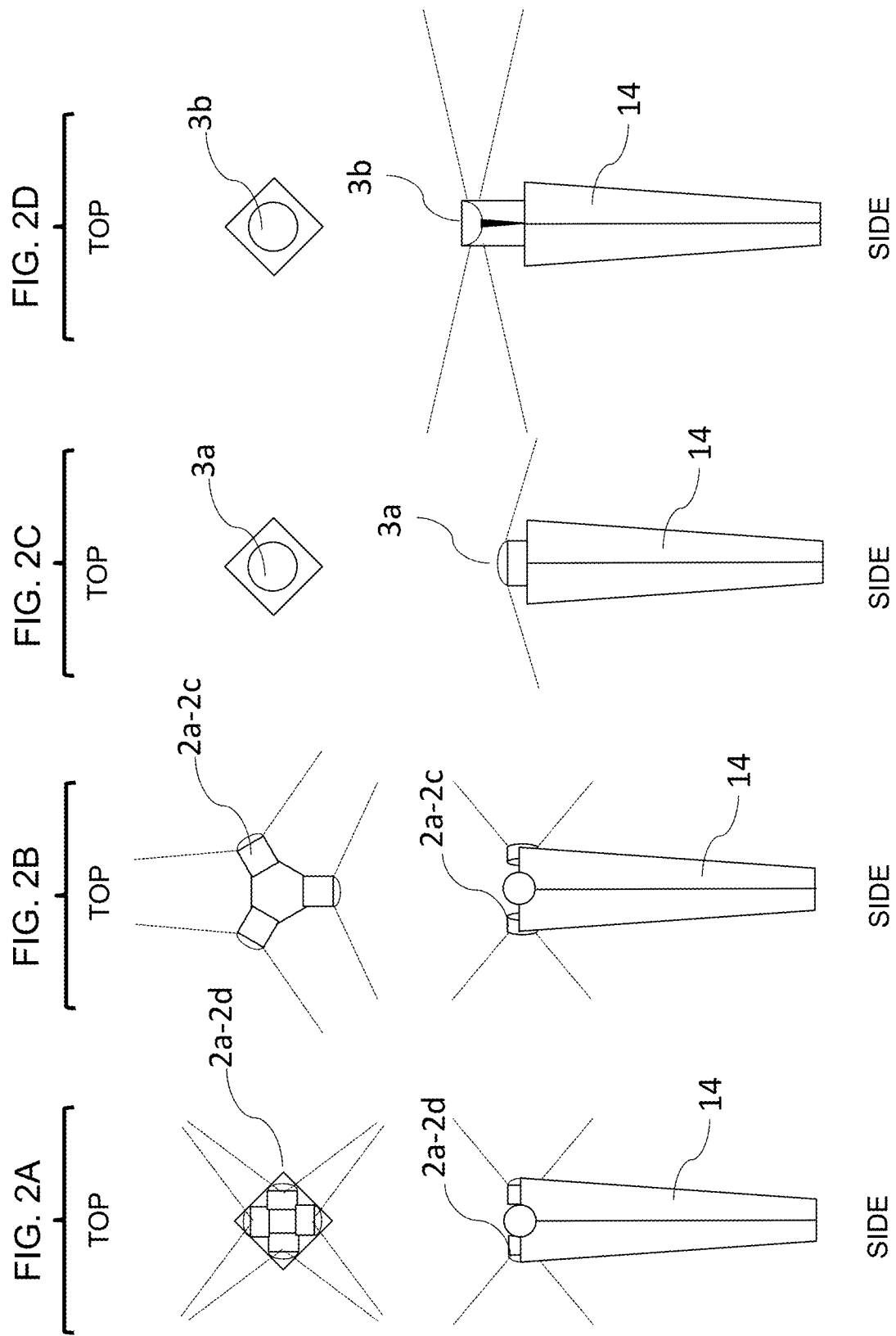

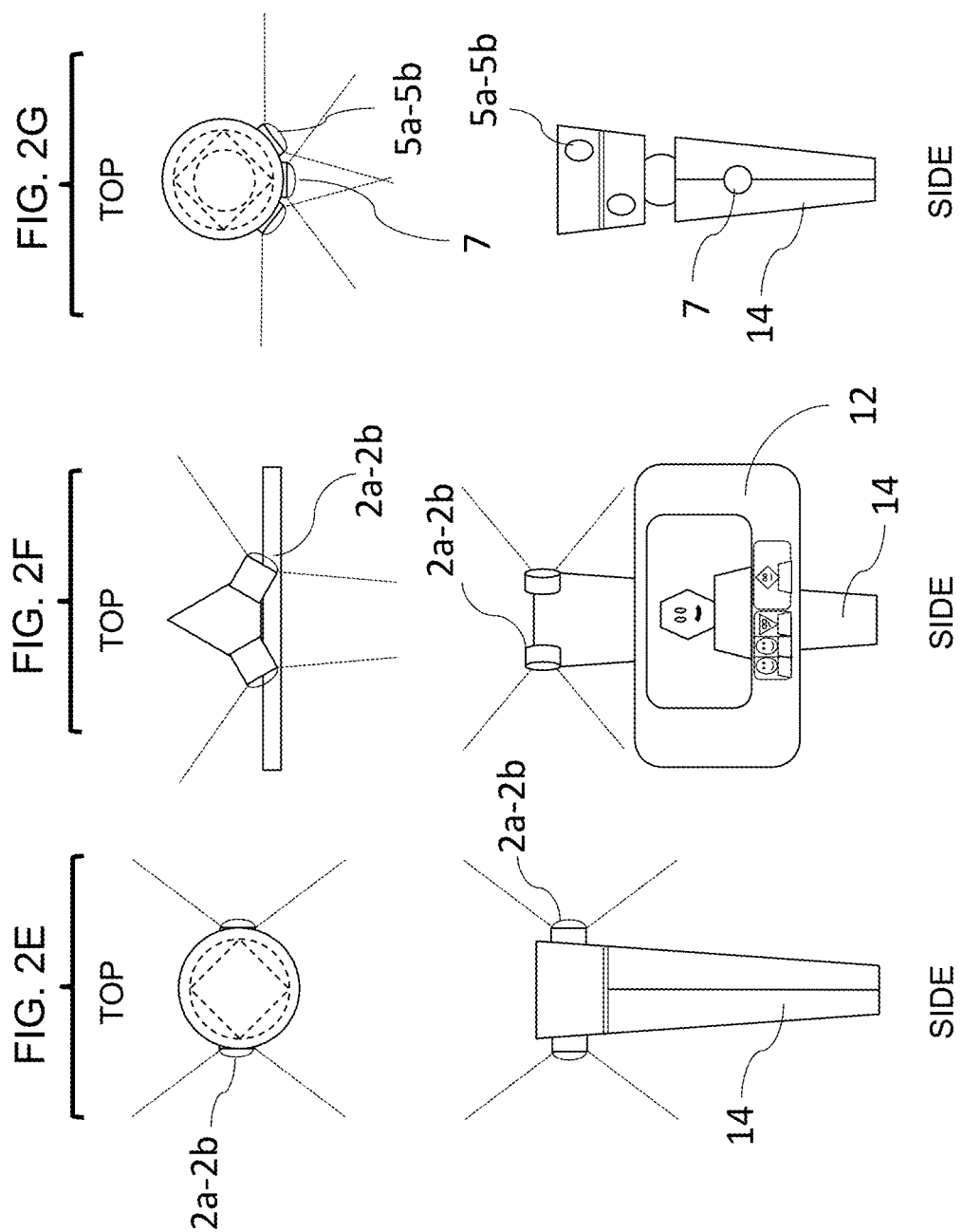

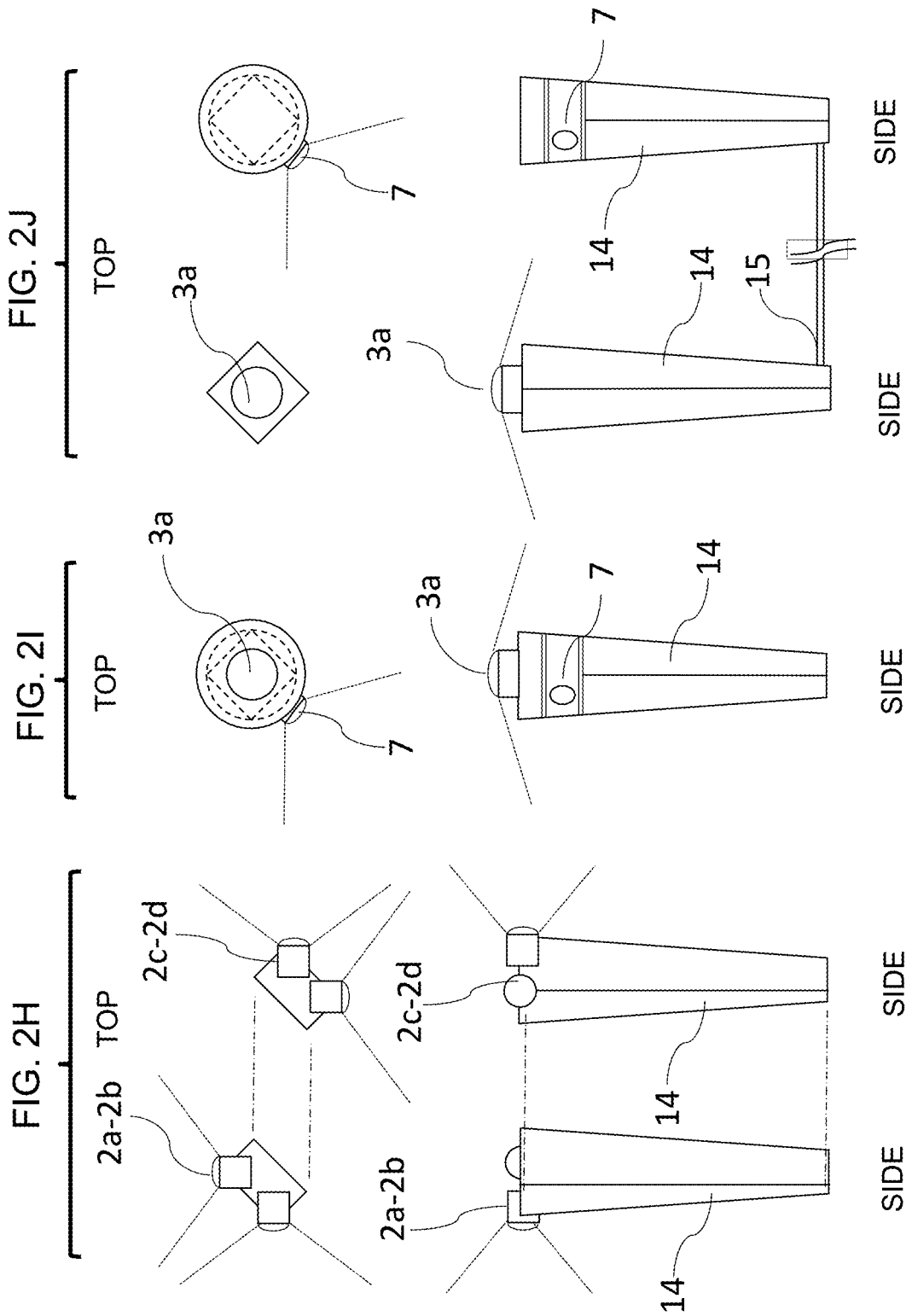

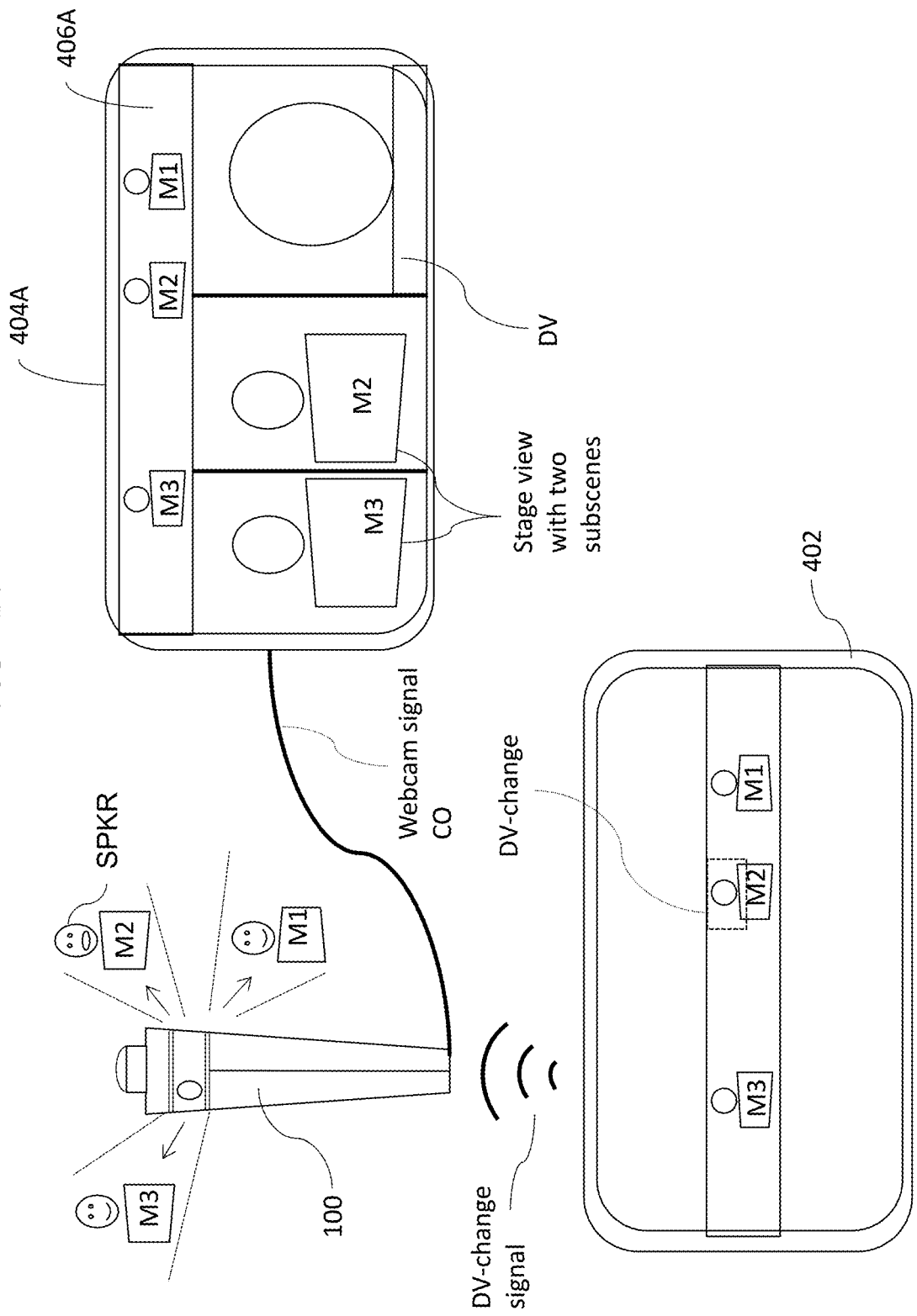

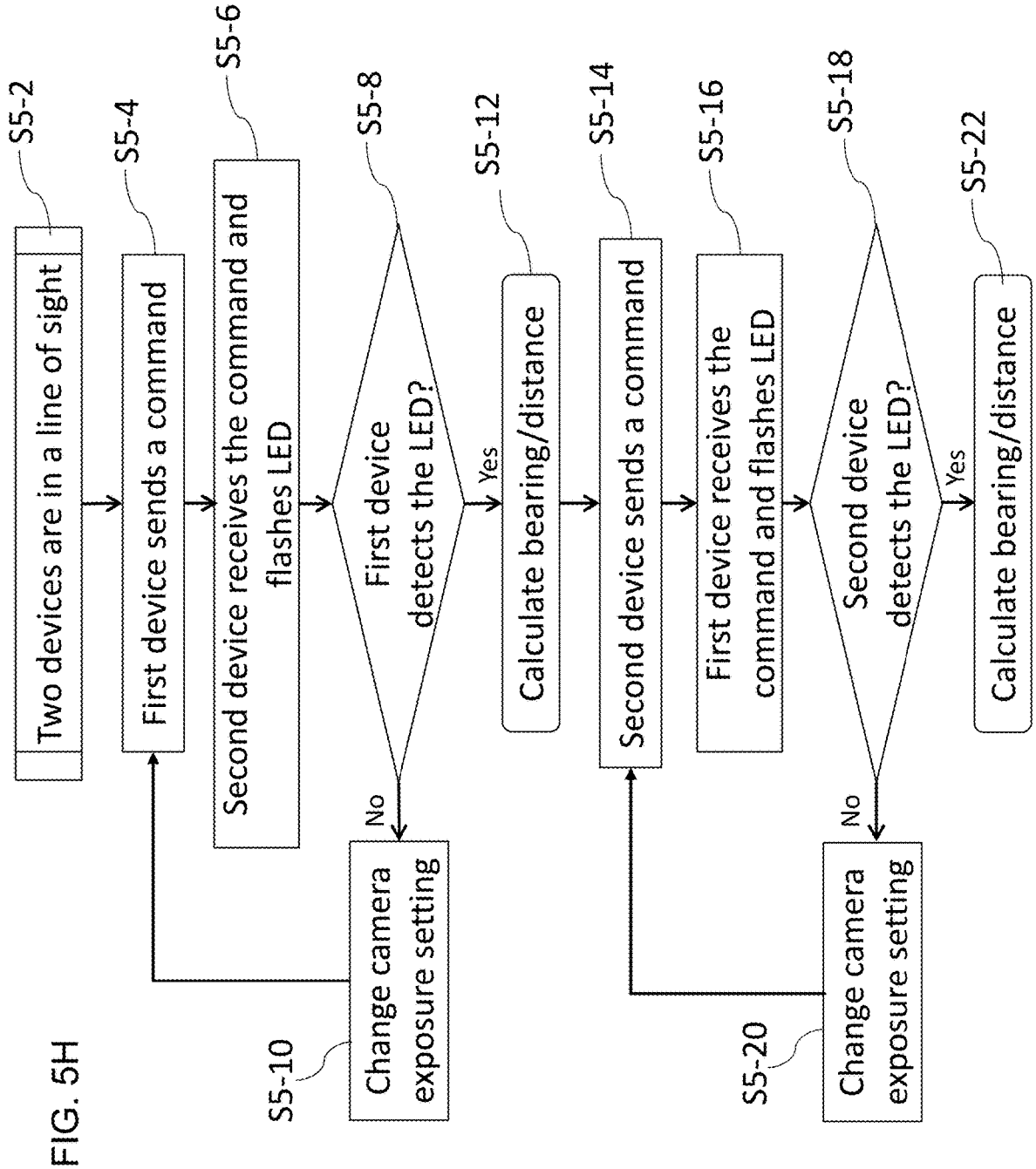

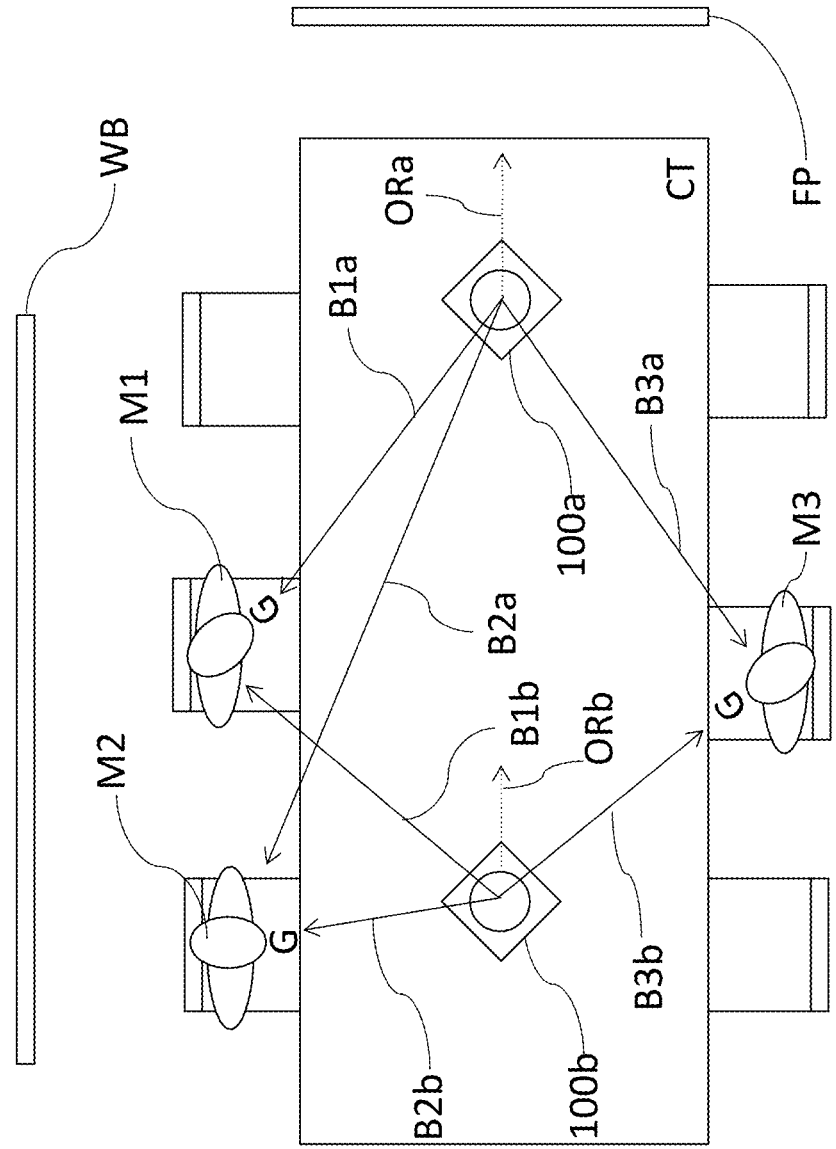

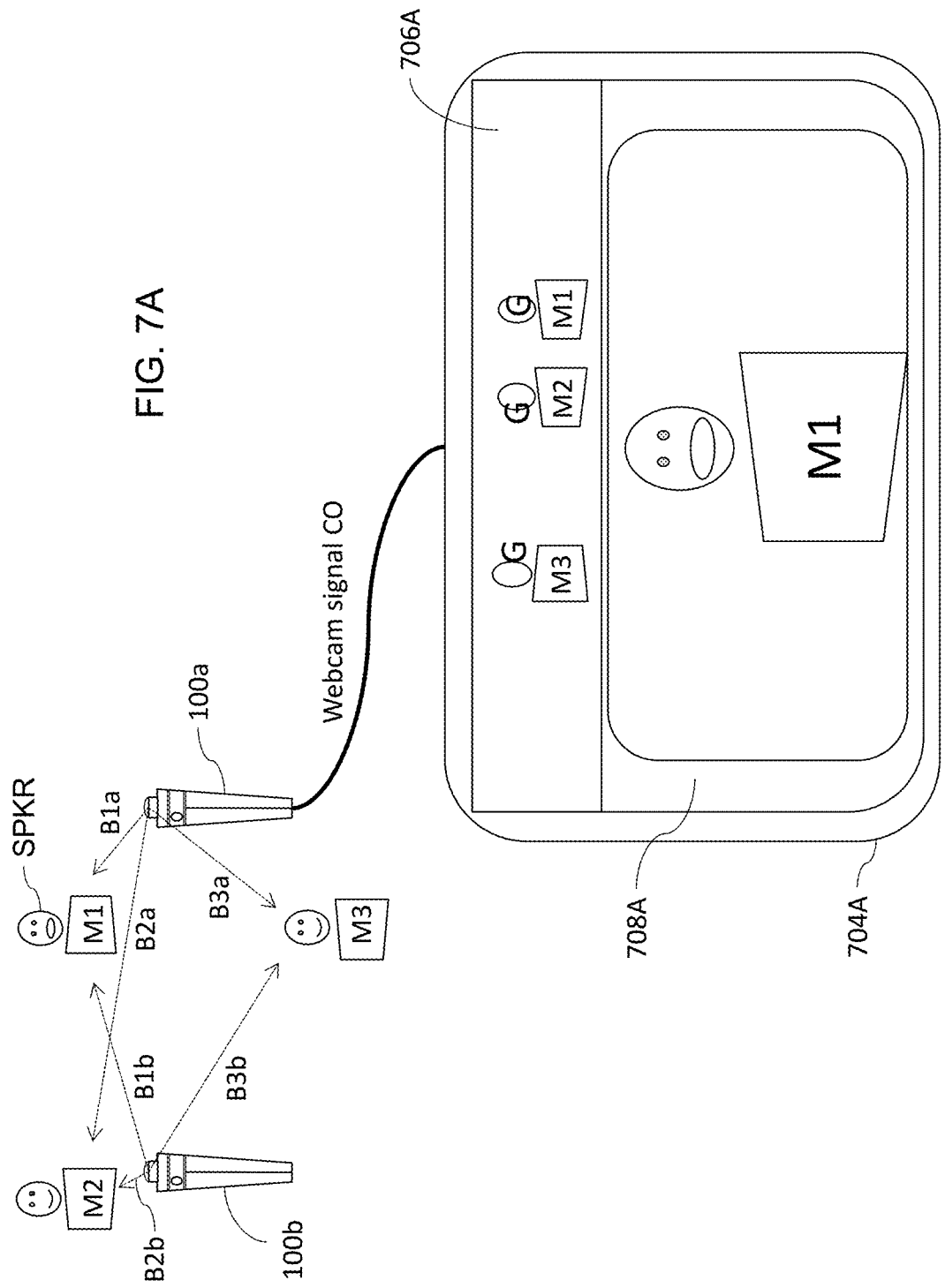

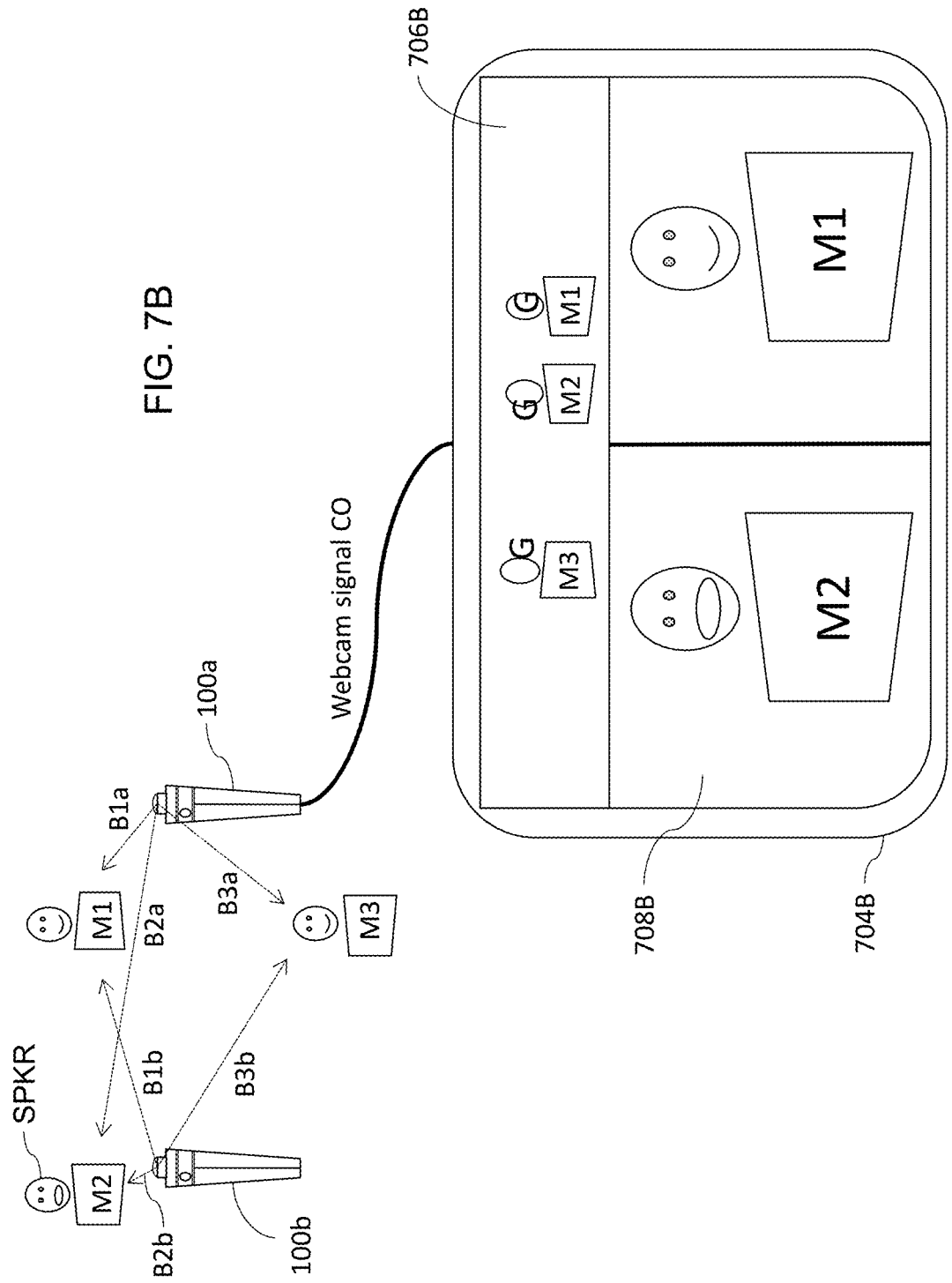

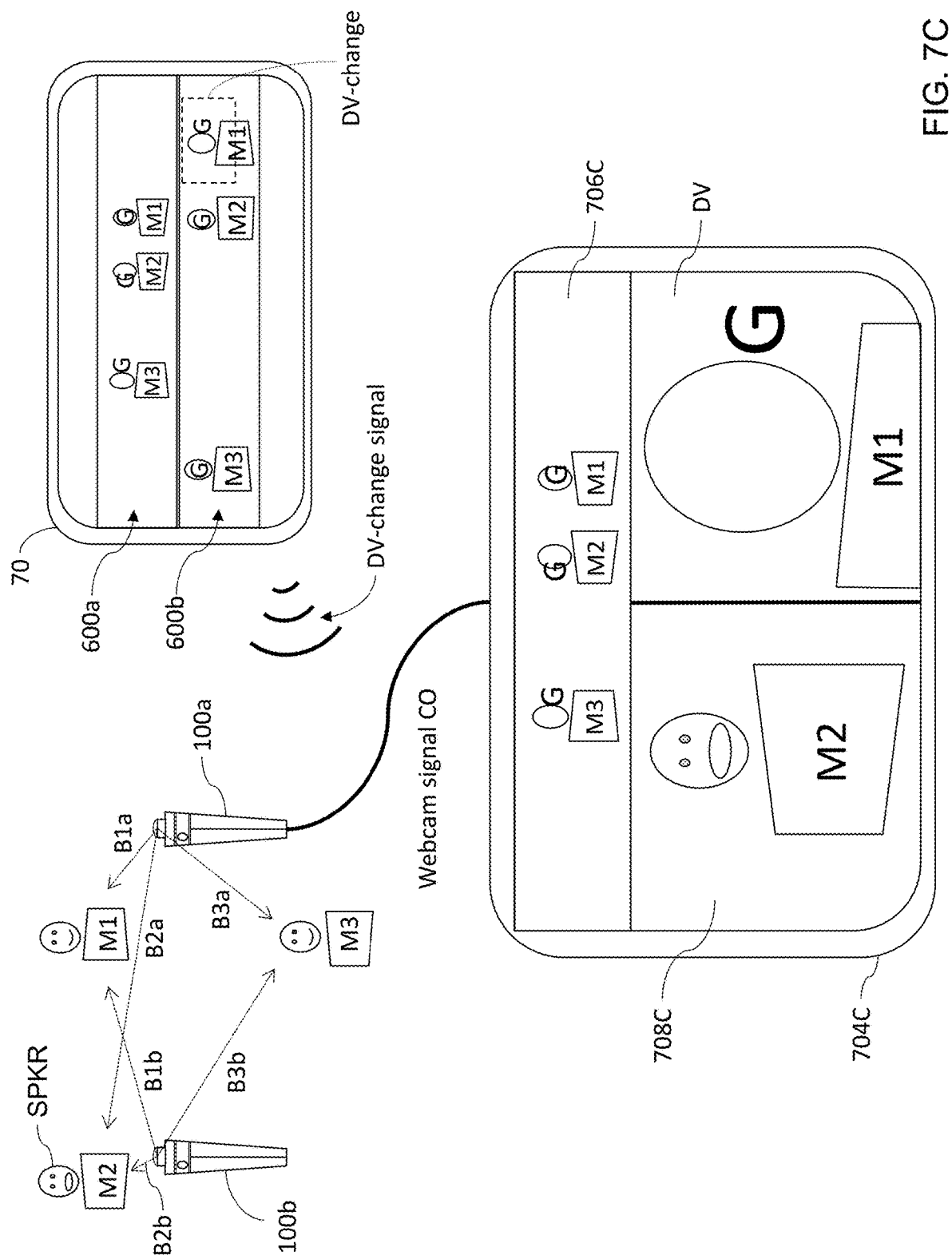

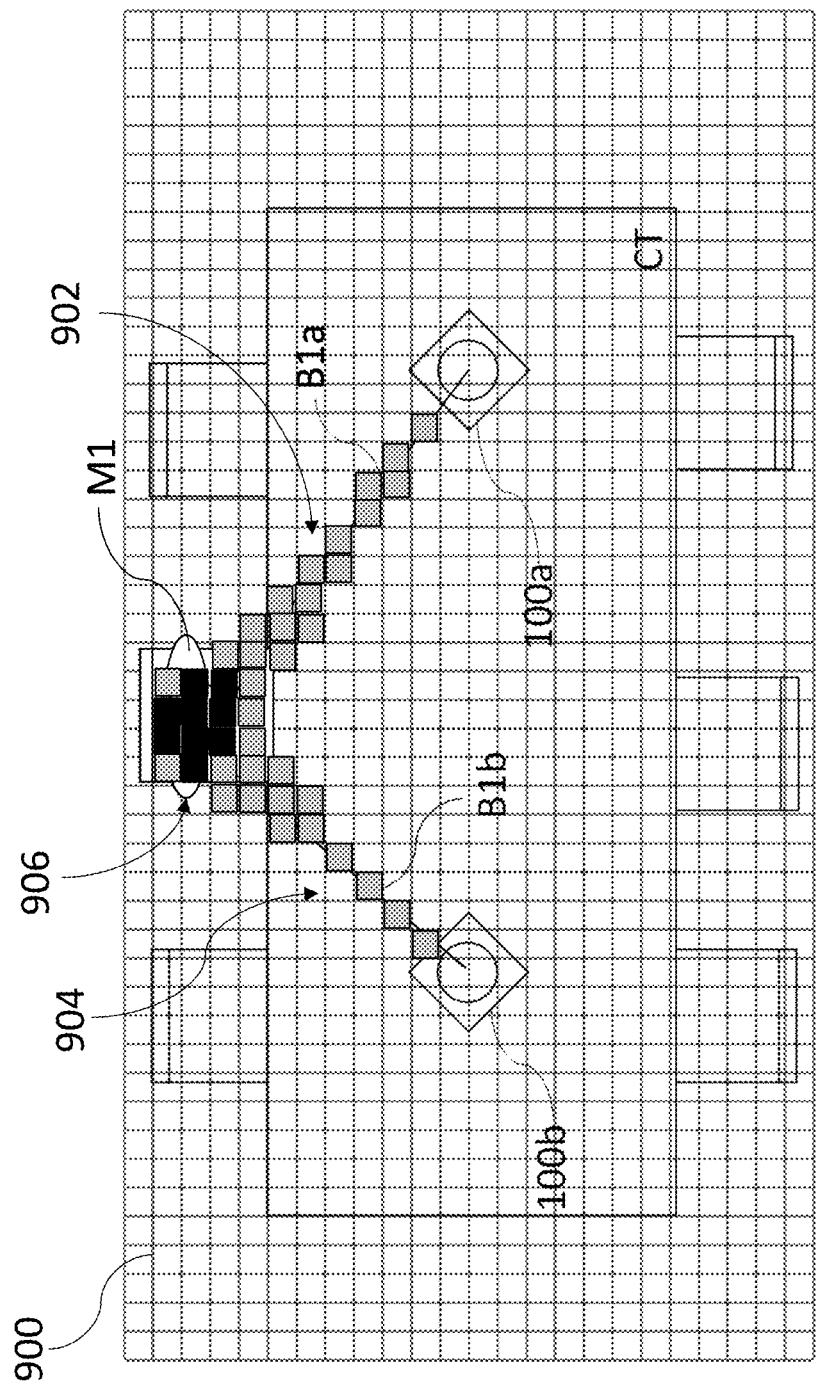

MERGING WEBCAM SIGNALS FROM MULTIPLE CAMERAS

CROSS-REFERENCE TO RELATED APPLICATIONS

This application relates to U.S. patent application Ser. No. 15/088,644, titled "DENSELY COMPOSITING ANGULARLY SEPARATED SUB-SCENES," filed Apr. 1, 2016; U.S. patent application Ser. No. 16/859,099, titled "SCALING SUB-SCENES WITHIN A WIDE ANGLE SCENE" filed on Apr. 27, 2020; and U.S. patent application Ser. No. 17/394,373, titled "DESIGNATED VIEW WITHIN A MULTI-VIEW COMPOSITED WEBCAM SIGNAL," filed on Aug. 4, 2021. The disclosures of the aforementioned applications are incorporated herein by reference in their entireties.

This application claims priority to U.S. Provisional Patent Application Ser. No. 63/069,710, titled "MERGING WEBCAM SIGNALS FROM MULTIPLE CAMERAS," filed on Aug. 24, 2020, which is incorporated herein by reference in its entirety.

FIELD OF THE DISCLOSURE

The present disclosure relates generally to systems and methods for virtual meetings.

BACKGROUND

Multi-party virtual meetings, videoconferencing, or teleconferencing can take place with multiple participants together in a meeting room connected to at least one remote party.

In the case of a person-to-person mode of videoconferencing software, only one local camera, often of limited horizontal field of view (e.g., 70 degrees or less), is available. Whether this single camera is positioned in front of one participant or at the head of a table directed to all participants, it is difficult for the remote party to follow more distant audio, body language, and non-verbal cues given by those participants in the meeting room who are farther away from the single camera, or that are at sharp angles to the camera (e.g., viewing the profile of a person rather than the face).

In the case of a multi-person mode of videoconferencing software, the availability of the cameras of two or more mobile devices (laptop, tablet, or mobile phone) located in the same meeting room can add some problems. The more meeting room participants that are logged into the conference, the greater the audio feedback and crosstalk may become. The camera perspectives may be as remote from participants or as skewed as in the case of a single camera. Local participants may tend to engage the other participants via their mobile device, despite being in the same room (thereby inheriting the same weaknesses in body language and non-verbal cues as the remote party).

In the case of using multiple video cameras for a virtual meeting, typical video conferencing systems may not be able to provide a desirable view of the meeting participants captured by the multiple video cameras. For example, the meeting participants in the meeting room can each have a mobile device with a webcam in the front to capture the video of each meeting participant. However, the mobile devices with webcams in the front of the meeting participants may not capture the face-on views of the meeting participants unless they are looking at their mobile devices. For example, the meeting participant can be facing and talking to each other. In such cases, it can be difficult for the remote party to follow facial expressions, non-verbal cues, and generally the faces of those participants in the meeting room who are not looking at their mobile devices with the cameras.

Therefore, there is a need for systems and methods for virtual meetings that can provide a better context of the meetings to the participants. There is also a need for systems and methods for virtual meetings that can provide a feeling to the participants that they are physically present in the room.

SUMMARY

According to one aspect of the invention, a system comprises a processor; a camera operatively coupled to the processor configured to capture a first panorama view; a first communication interface operatively coupled to the processor; and a memory storing computer-readable instructions that, when executed, cause the processor to: determine a first bearing of a person within the first panorama view, determine a first gaze direction of a person within the first panorama view, receive, from an external source via the first communication interface, a second panorama view, receive, from the external source via the first communication interface, a second bearing of the person within the second panorama view, receive, from the external source via the first communication interface, a second gaze direction of the person within the second panorama view, compare the first gaze direction and the second gaze direction, select, based on comparing the first gaze direction and the second gaze direction, a selected panorama view from between the first panorama view and the second panorama view, select, based on the selected panorama view, a selected bearing of the person from between the first bearing of the person and the second bearing of the person, form a localized subscene video signal based on the selected panorama view along the selected bearing of the person, generate a stage view signal based on the localized subscene video signal, generate a scaled panorama view signal based on the first panorama view or the second panorama view, composite a composited signal comprising the scaled panorama view signal and the stage view signal, and transmit the composited signal.

In one embodiment, the first communication interface is a wireless interface.

In one embodiment, the system further comprises a second communication interface operatively coupled to the processor, the second communication interface being different from the first communication interface, and wherein the composited signal is transmitted via the second communication interface.

In one embodiment, the second communication interface is a wired interface.

In one embodiment, the system further comprises an audio sensor system operatively coupled to the processor configured to capture audio corresponding to the first panorama view, and wherein determining the first bearing of the person within the first panorama view is based on information from the audio sensor system.

In one embodiment, the computer-readable instructions, when executed, further cause the processor to: receive audio information corresponding to the second panorama view, establish a common coordinate system of the camera and the external source, and determine an offset of a relative orientation between the first camera and the external source in the common coordinate system, and determine, based on the offset, that the first bearing of the person within the first panorama view is directed to a same location as the second bearing of the person in the second panorama view.

In one embodiment, the first gaze direction is determined as a first angle of the person's gaze away from the camera; the second gaze direction is a measurement of a second angle of the person's gaze away from a video sensor of the external source; and selecting the selected panorama view based on comparing the first gaze direction and the second gaze direction comprises selecting the first panorama view as the selected panorama view when the first angle is smaller than the second angle, or selecting the second panorama view as the selected panorama view when the second angle is smaller than the first angle.

In one embodiment, the system further comprises an audio sensor system operatively coupled to the processor configured to capture audio corresponding to the first panorama view, and wherein the computer-readable instructions, when executed, further cause the processor to: receive audio information corresponding to the second panorama view; synchronize the audio corresponding to the first panorama view and the audio corresponding to the second panorama view; merge the audio corresponding to the first panorama view and the audio corresponding to the second panorama view into a merged audio signal; and further composite the merged audio signal with the composited signal.

In one embodiment, the computer-readable instructions, when executed, further cause the processor to: detect an error in the audio corresponding to the second panorama view by finding a missing audio data of the audio corresponding to the second panorama view; and conceal the detected error in the audio corresponding to the second panorama view by replacing the missing audio data.

In one embodiment, the computer-readable instructions, when executed, further cause the first processor to: determine a volume of the merged audio; determine a portion of the audio corresponding to the first panorama view merged with a replaced portion of audio information corresponding to the second panorama view; and adjust a relative gain of the determined portion of the audio corresponding to the first panorama view to increase the volume of the determined portion of the audio corresponding to the first panorama view.

In one embodiment, the computer-readable instructions, when executed, further cause the first processor to: determine a first coordinate map of the first panorama view; receive, from the external source, a second coordinate map of the second panorama view via the first communication interface; determine a coordinate instruction associated with the first coordinate map of the first panorama view and the second coordinate map of the second panorama view; determine a coordinate of a designated view in the first panorama view or the second panorama view based on the coordinate instruction; and further composite the designated view with the composited signal.

In one embodiment, the camera is configured to capture the first panorama view with a horizontal angle of 360 degrees; and the second panorama view has a horizontal angle of 360 degrees.

According to another aspect of the invention, a method comprises: capturing a first panorama view with a camera; determining a first bearing of a person within the first panorama view; determining a first gaze direction of a person within the first panorama view; receiving, from an external source via a first communication interface, a second panorama view; receiving, from the external source via the first communication interface, a second bearing of the person within the second panorama view; receiving, from the external source via the first communication interface, a second gaze direction of the person within the second panorama view; comparing the first gaze direction and the second gaze direction; selecting, based on comparing the first gaze direction and the second gaze direction, a selected panorama view from between the first panorama view and the second panorama view; selecting, based on the selected panorama view, a selected bearing of the person from between the first bearing of the person and the second bearing of the person; forming a localized subscene video signal based on the selected panorama view along the selected bearing of the person; generating a stage view signal based on the localized subscene video signal; generating a scaled panorama view signal based on the first panorama view or the second panorama view; compositing a composited signal comprising the scaled panorama view signal and the stage view signal; and transmitting the composited signal.

In one embodiment, the first communication interface is a wireless interface.

In one embodiment, the composited signal is transmitted via a second communication interface that is different from the first communication interface.

In one embodiment, the second communication interface is a wired interface.

In one embodiment, determining the first bearing of the person within the first panorama view is based on information from an audio sensor system.

In one embodiment, the method further comprises: receiving audio information corresponding to the second panorama view; establishing a common coordinate system of the camera and the external source; determining an offset of a relative orientation between the first camera and the external source in the common coordinate system; and determining, based on the offset, that the first bearing of the person within the first panorama view is directed to a same location as the second bearing of the person in the second panorama view.

In one embodiment, the first gaze direction is determined as a first angle of the person's gaze away from the camera; the second gaze direction is a measurement of a second angle of the person's gaze away from a video sensor of the external source; and selecting the selected panorama view based on comparing the first gaze direction and the second gaze direction comprises selecting the first panorama view as the selected panorama view when the first angle is smaller than the second angle, or selecting the second panorama view as the selected panorama view when the second angle is smaller than the first angle.

In one embodiment, the method further comprises: capturing audio corresponding to the first panorama view; receiving audio information corresponding to the second panorama view; synchronizing the audio corresponding to the first panorama view and the audio corresponding to the second panorama view; merging the audio corresponding to the first panorama view and the audio corresponding to the second panorama view into a merged audio signal; and further compositing the merged audio signal with the composited signal.

In one embodiment, the method further comprises: detecting an error in the audio corresponding to the second panorama view by finding a missing audio data of the audio corresponding to the second panorama view; and concealing the detected error in the audio corresponding to the second panorama view by replacing the missing audio data.

In one embodiment, the method further comprises: determining a volume of the merged audio; determining a portion of the audio corresponding to the first panorama view merged with a replaced portion of audio information corresponding to the second panorama view; and adjusting a relative gain of the determined portion of the audio corresponding to the first panorama view to increase the volume of the determined portion of the audio corresponding to the first panorama view.

In one embodiment, the method further comprises: determining a first coordinate map of the first panorama view; receiving, from the external source, a second coordinate map of the second panorama view via the first communication interface; determining a coordinate instruction associated with the first coordinate map of the first panorama view and the second coordinate map of the second panorama view; determining a coordinate of a designated view in the first panorama view or the second panorama view based on the coordinate instruction; and further compositing the designated view with the composited signal.

In one embodiment, the first panorama view has a horizontal angle of 360 degrees; and the second panorama view has a horizontal angle of 360 degrees.

According to another aspect of the invention, a system comprises: a processor; a camera operatively coupled to the processor configured to capture a first panorama view; a first communication interface operatively coupled to the processor; and a memory storing computer-readable instructions that, when executed, cause the processor to: determine a first bearing of interest within the first panorama view, determine a first criterion associated with the first panorama view, receive, from an external source via the first communication interface, a second panorama view, receive, from the external source via the first communication interface, a second bearing of interest within the second panorama view, receive, from the external source via the first communication interface, a second criterion associated with the second panorama view, select, based on at least one of the first bearing of interest, the second bearing of interest, the first criterion, and the second criterion, a selected panorama view from between the first panorama view and the second panorama view, select, based on the selected panorama view, a selected bearing of interest from between the first bearing of interest and the second bearing of interest, form a localized subscene video signal based on the selected panorama view along the selected bearing of interest, generate a stage view signal based on the localized subscene video signal, generate a scaled panorama view signal based on the first panorama view or the second panorama view, composite a composited signal comprising the scaled panorama view signal and the stage view signal, and transmit the composited signal.

In one embodiment, the first communication interface is a wireless interface.

In one embodiment, the system further comprises a second communication interface operatively coupled to the processor, the second communication interface being different from the first communication interface, and wherein the composited signal is transmitted via the second communication interface.

In one embodiment, the second communication interface is a wired interface.

In one embodiment, the system further comprises an audio sensor system operatively coupled to the processor configured to capture audio corresponding to the first panorama view, and wherein determining the first bearing of interest within the first panorama view is based on information from the audio sensor system.

In one embodiment, the computer-readable instructions, when executed, further cause the processor to: receive audio information corresponding to the second panorama view, establish a common coordinate system of the camera and the external source, determine an offset of a relative orientation between the first camera and the external source in the common coordinate system, and determine, based on the offset, that the first bearing of the person within the first panorama view is directed to a same location as the second bearing of the person in the second panorama view.

In one embodiment, the first criterion is a first estimated relative location of a person from the camera, and the second criterion is a second estimated relative location of the person from a video sensor of the external source, and selecting the selected panorama view from between the first panorama view and the second panorama view comprises selecting the first panorama view as the selected panorama view when the first estimated relative location of the person is closer to the first camera and selecting the second panorama view as the selected panorama view when the second estimated relative location of the person is closer to the video sensor of the external source.

In one embodiment, the first estimated relative location of the person from the camera is based on a first size of the person within the first panorama view relative to a second size of the person within the second panorama view.

In one embodiment, the system further comprises an audio sensor system operatively coupled to the processor configured to capture audio corresponding to the first panorama view and wherein the computer-readable instructions, when executed, cause the processor to: receive audio information corresponding to the second panorama view; and estimate a first estimated relative location of a person from the camera along the first bearing of interest and a second estimated relative location of the person from a video sensor of the external source along the second bearing of interest based on the audio corresponding to the first panorama view and the audio corresponding to the second panorama view, wherein selecting the selected panorama view from between the first panorama view and the second panorama view comprises selecting the first panorama view as the selected panorama view when the first estimated relative location of the person is closer to the first camera and selecting the second panorama view as the selected panorama view when the second estimated relative location of the person is closer to the video sensor of the external source.

In one embodiment, the computer-readable instructions, when executed, further cause the processor to determine, based on the first bearing of interest and the second bearing of interest, relative locations of a person from the camera and a video sensor of the external source, and wherein selecting the selected panorama view from between the first panorama view and the second panorama view comprises selecting the first panorama view as the selected panorama view when the relative location of the person is closer to the camera, and selecting the second panorama view as the selected panorama view when the relative location of the person is closer to the video sensor of the external source.

According to another aspect of the invention, a method comprises: capturing a first panorama view with a camera; determining a first bearing of interest within the first panorama view; determining a first criterion associated with the first panorama view; receiving, from an external source via a first communication interface, a second panorama view; receiving, from the external source via the first communication interface, a second bearing of interest within the second panorama view; receiving, from the external source via the first communication interface, a second criterion associated with the second panorama view; selecting, based on at least one of the first bearing of interest, the second bearing of interest, the first criterion, and the second criterion, a selected panorama view from between the first panorama view and the second panorama view; selecting, based on the selected panorama view, a selected bearing of interest from between the first bearing of interest and the second bearing of interest; forming a localized sub scene video signal based on the selected panorama view along the selected bearing of interest; generating a stage view signal based on the localized subscene video signal; generating a scaled panorama view signal based on the first panorama view or the second panorama view; compositing a composited signal comprising the scaled panorama view signal and the stage view signal; and transmitting the composited signal.

In one embodiment, the first communication interface is a wireless interface.

In one embodiment, the composited signal is transmitted via a second communication interface that is different from the first communication interface.

In one embodiment, the second communication interface is a wired interface.

In one embodiment, the method further comprises capturing audio information corresponding to the first panorama view, and wherein determining the first bearing of interest within the first panorama view is based on the audio information corresponding to the first panorama view.

In one embodiment, the method further comprises: receive audio information corresponding to the second panorama view; establishing a common coordinate system of the camera and the external source; determining an offset of a relative orientation between the first camera and the external source in the common coordinate system; and determining, based on the offset, that the first bearing of interest within the first panorama view is directed to a same location as the second bearing of interest in the second panorama view.

In one embodiment, the first criterion is a first estimated relative location of a person from the camera, and the second criterion is a second estimated relative location of the person from a video sensor of the external source, and selecting the selected panorama view from between the first panorama view and the second panorama view comprises selecting the first panorama view as the selected panorama view when the first estimated relative location of the person is closer to the first camera and selecting the second panorama view as the selected panorama view when the second estimated relative location of the person is closer to the video sensor of the external source.

In one embodiment, the first estimated relative location of the person from the camera is based on a first size of the person within the first panorama view relative to a second size of the person within the second panorama view.

In one embodiment, the method further comprises: capturing audio corresponding to the first panorama view; receiving audio information corresponding to the second panorama view; and estimating a first estimated relative location of a person from the camera along the first bearing of interest and a second estimated relative location of the person from a video sensor of the external source along the second bearing of interest based on the audio corresponding to the first panorama view and the audio corresponding to the second panorama view, wherein selecting the selected panorama view from between the first panorama view and the second panorama view comprises selecting the first panorama view as the selected panorama view when the first estimated relative location of the person is closer to the first camera and selecting the second panorama view as the selected panorama view when the second estimated relative location of the person is closer to the video sensor of the external source.

In one embodiment, the method further comprises: determining, based on the first bearing of interest and the second bearing of interest, relative locations of a person from the camera and a video sensor of the external source, and wherein selecting the selected panorama view from between the first panorama view and the second panorama view comprises selecting the first panorama view as the selected panorama view when the relative location of the person is closer to the camera, and selecting the second panorama view as the selected panorama view when the relative location of the person is closer to the video sensor of the external source.

According to another aspect of the invention, a system comprises: a processor; a camera operatively coupled to the processor; a communication interface operatively coupled to the processor; and a memory storing computer-readable instructions that, when executed, cause the processor to: establish a communication connection with a second camera system via the communication interface, cause a visual cue to appear on the second camera system, detect, by the camera, the visual cue of the second camera system, determine a bearing of the visual cue, and determine a bearing offset between the camera and the second camera system based on the bearing of the visual cue.

In one embodiment, the computer-readable instructions, when executed, further cause the processor to: capture a first panorama view with the camera, and receive a second panorama view captured by the second camera system, wherein determining a bearing offset between the camera system and the second camera system is further based on at least one of the first panorama view and the second panorama view.

In one embodiment, the communication interface is a wireless interface.

In one embodiment, the visual cue is at least one light illuminated by the second camera system.

In one embodiment, the computer-readable instructions, when executed, further cause the processor to: capture a first panorama view with the camera; determine a first bearing of interest in the first panorama view; receive a second panorama view captured by the second camera system; receive a second bearing of interest in the second panorama view; determine, based on the offset, that the first bearing of interest within the first panorama view is directed to a same location as the second bearing of interest in the second panorama view.

According to another aspect of the invention, a method comprises: establishing a communication connection between a first camera system and a second camera system; causing a visual cue to appear on the second camera system; detecting, by the first camera system, the visual cue of the second camera system; determining a bearing of the visual cue; and determining a bearing offset between the first camera system and the second camera based on the bearing of the visual cue.

In one embodiment, the method further comprises: capturing, by the first camera system, a first panorama view; and receiving, by the first camera system, a second panorama view captured by the second camera system, wherein determining a bearing offset between the first camera system and the second camera is further based on at least one of the first panorama view and the second panorama view.

In one embodiment, the communication connection is a wireless connection.

In one embodiment, the first camera system causes the visual cue to appear on the second camera system.

In one embodiment, the visual cue is at least one light illuminated by the second camera system.

In one embodiment, the method further comprises: capturing, by the first camera system, a first panorama view; determining, by the first camera system, a first bearing of interest in the first panorama view; receiving, by the first camera system, a second panorama view captured by the second camera system; receiving, by the first camera system, a second bearing of interest in the second panorama view; determining, based on the offset, that the first bearing of interest within the first panorama view is directed to a same location as the second bearing of interest in the second panorama view.

Any of the aspects, implementations, and/or embodiments can be combined with any other aspect, implementation, and/or embodiment.

BRIEF DESCRIPTION OF THE DRAWINGS

Drawing descriptions generally preface paragraphs of detailed description herein.

FIGS. 2A-2J show exemplary top and side views of the devices 100 according to aspects of the disclosed subject matter.

FIGS. 4A-4C show exemplary schematic views of webcam video signal (CO) by the devices 100 according to aspects of the disclosed subject matter.

FIG. 5H shows an exemplary process for pairing or co-location of two meeting cameras according to aspects of the disclosed subject matter.

FIGS. 6A-6C show exemplary top down view of using two meeting cameras, and a panorama image signal according to aspects of the disclosed subject matter.

FIGS. 7A-7C show exemplary schematic views of webcam video signal (CO) by the devices 100*a* and 100*b* according to aspects of the disclosed subject matter.

FIGS. 9A-9B show exemplary top down view of using two meeting cameras for locating an event according to aspects of the disclosed subject matter.

DETAILED DESCRIPTION

The following describes embodiments of the present disclosure. The designs, figures, and description are non-limiting examples of embodiments of the present disclosure. Other embodiments may or may not include the features disclosed herein. Moreover, disclosed advantages and benefits may apply to only one or some embodiments and should not be used to limit the scope of the present disclosure.

Meeting Camera(s)

A great deal of productivity work in organizations (business, education, government) is conducted using notebook or tablet computers. These are most often used as a vertically oriented flat panel screen connected to or associated with a second panel with a keyboard and trackpad for user input.

A small camera is often located at the top of the flat panel, to be used together with microphone(s) and speakers in one of the panels. These enable videoconferencing over any such application or platform that may be executed on the device. Often, the user of the notebook computer may have multiple applications or platforms on the notebook computer in order to communicate with different partners—for example, the organization may use one platform to video conference, while customers use a variety of different platforms for the same purpose.

Interoperability between platforms is fragmented, and only some larger platform owners have negotiated and enabled interoperability between their platforms, at a variety of functional levels. Hardware (e.g., Dolby Voice Room) and software (e.g., Pexip) interoperability services have provided partial platforms to potentially address interoperability. In some cases, even without interoperability, improvements in user experience may readily enter a workflow that uses multiple platforms via a direct change to the video or audio collected locally.

In some embodiments, the camera, microphones, and/or speakers provided to notebook computers or tablets are of reasonable quality, but not professional quality. For this reason, some video videoconferencing platform accepts the input of third party "webcams," microphones, or speakers to take the place of a notebook computer's built-in components. Webcams are typically plugged into a wired connection (e.g., USB in some form) in order to support the relatively high bandwidth needed for professional quality video and sound. The above referenced applications: U.S. patent application Ser. Nos. 15/088,644, 16/859,099, 17/394,373, disclosures of each are incorporated herein by reference in their entireties, disclose such device(s), replacing the camera, microphones, and speakers of a host notebook computer, for example, with an augmented 360 degree videoconferencing nexus device and/or with a device can be used to generate an imagery of an object of interest such as a whiteboard WB.

Figure 1B:
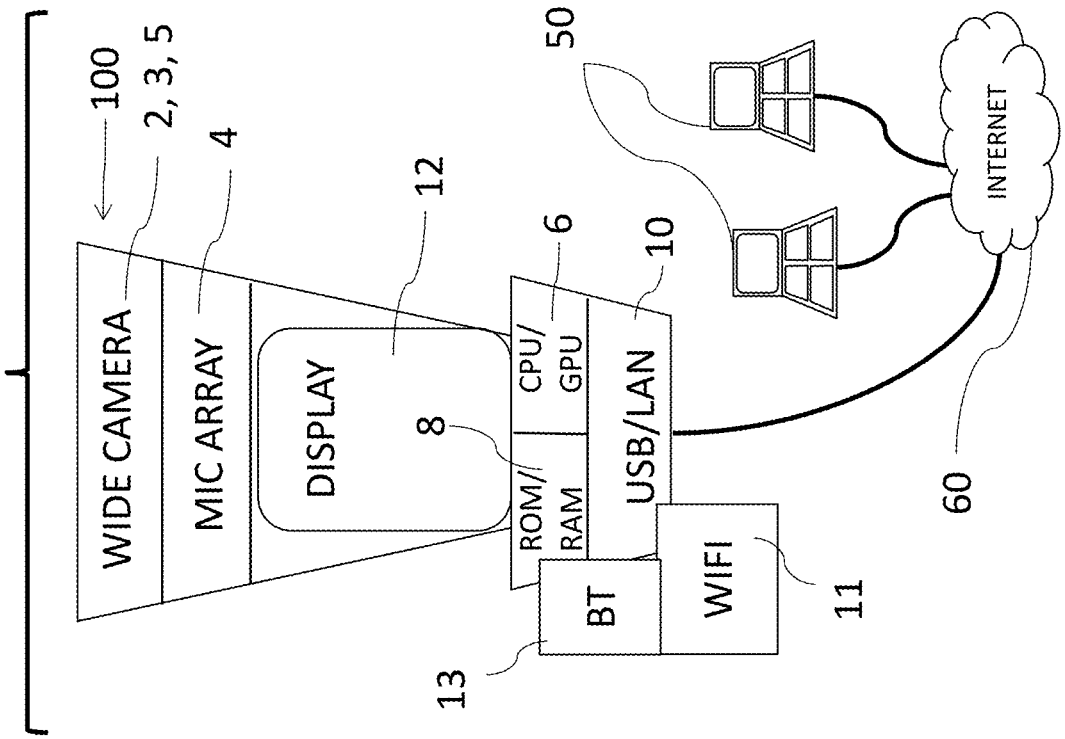
FIGS. 1A-1D show exemplary schematic block representations of devices 100 according to aspects of the disclosed subject matter.
Figure 1A:
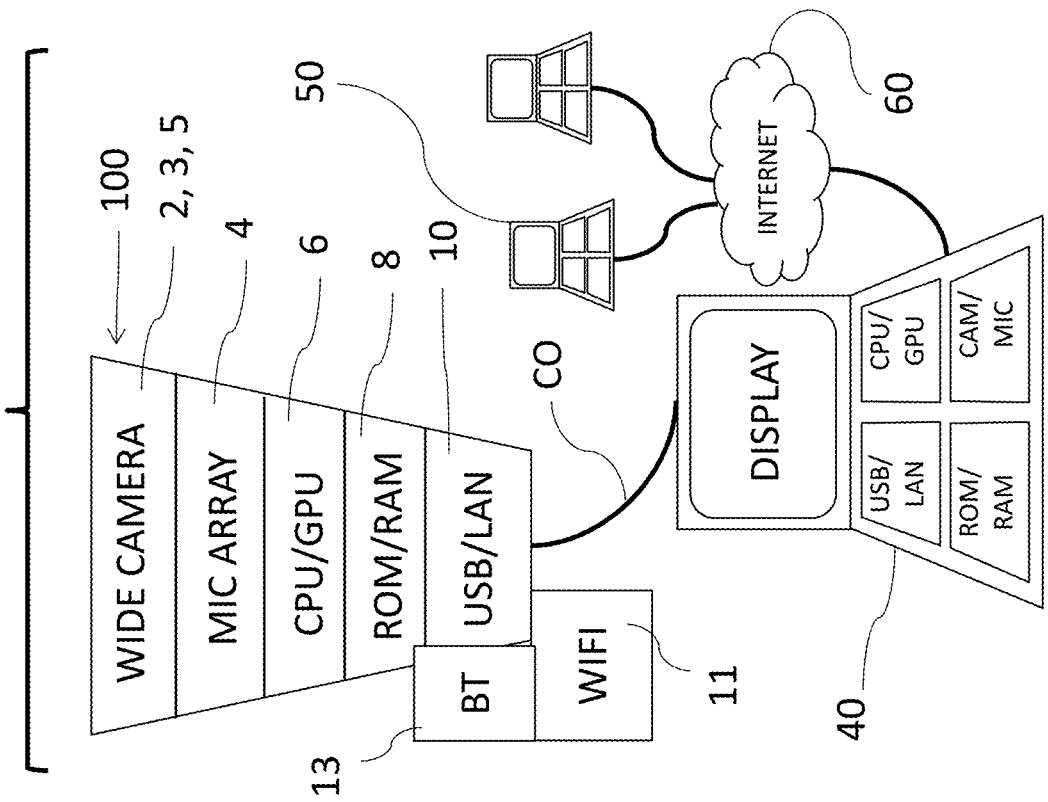

Improvements in user experience may be achieved upon the nexus device by processing or compositing video and audio as a webcam signal before it is presented to the notebook computer and any videoconferencing platform thereon. This may be accomplished on the nexus device itself, or remotely, but in most cases lag and audio/video synchronization are important for user experience in teleconferencing, so local processing may be advantageous in the case of real-time processing. FIGS. 1A and 1B are schematic block representations of embodiments of devices suitable for compositing, tracking, and/or displaying angularly separated sub-scenes and/or sub-scenes of interest within wide scenes collected by the devices, meeting cameras 100. Herein, device 100 and meeting camera 100 is used interchangeably.

FIG. 1A shows a device constructed to communicate as a meeting camera 100 or meeting "webcam," e.g., as a USB peripheral connected to a USB host or hub of a connected laptop, tablet, or mobile device 40; and to provide a single video image of an aspect ratio, pixel count, and proportion commonly used by off-the-shelf video chat or videoconferencing software such as "Google Hangouts", "Skype," "Microsoft Teams," "Webex," "Facetime," etc. The device 100 can include a "wide camera" 2, 3, or 5, e.g., a camera capable of capturing more than one attendee, and directed to survey a meeting of attendees or participants M1, M2 . . . Mn. The camera 2, 3, or 5 may include one digital imager or lens, or two or more digital imagers or lenses (e.g., stitched in software or otherwise stitched together). In some embodiments, depending on the location of the device 100 within a meeting, the field of view of the wide camera 2, 3, or 5 may be no more than 70 degrees. In some embodiments, the wide camera 2, 3, 5 can be useful in the center of the meeting, and in this case, the wide camera may have a horizontal field of view of substantially 90 degrees, or more than 140 degrees (e.g., contiguously or not contiguously), or up to 360 degrees. In some embodiments, the wide camera 2, 3, 5 can be a 360-degree camera (e.g., a 360-degree camera that can capture and generate a panorama view with a horizontal field of view of up to 360 degrees). For example, a 360-degree camera can be a virtual camera formed by two or more stitched camera views from the wide camera 2, 3, 5, and/or camera views of wide aspect, panoramic, wide angle, fisheye, or catadioptric perspective. In another example, a 360-degree camera can be a single camera configured to capture and generate a panorama view with a horizontal field of view of up to 360 degrees.

In some embodiments, in large conference rooms (e.g., conference rooms designed to fit 8 people or more) it may be useful to have multiple wide-angle camera devices recording wide fields of view (e.g. substantially 90 degrees or more) and collaboratively stitching together a wide scene to capture a desirable angle. For example, a wide angle camera at the far end of a long (e.g., 10'-20' or longer) table may result in an unsatisfying, distant view of the speaker SPKR but having multiple cameras spread across a table (e.g., 1 for every 5 seats) may yield one or more satisfactory or pleasing view. In some embodiments, the camera 2, 3, 5 may image or record a panoramic scene (e.g., of 2.4:1 through 10:1 aspect ratio, e.g., H:V horizontal to vertical proportion) and/or make this signal available via the USB connection.

In some embodiments, the height of the wide camera 2, 3, 5 from the base of the meeting camera 100 can be more than 8 inches (e.g., as discussed with respect to FIGS. 2A-2J herein), so that the camera 2, 3, 5 may be higher than typical laptop screens at a meeting, and thereby have an unobstructed and/or approximately eye-level view to meeting attendees M1, M2 . . . Mn. In some embodiments, the height of the wide camera 2, 3, 5 from the base of the meeting camera 100 can be between 8 inches and 15 inches. In some embodiments, the height of the wide camera 2, 3, 5 from the base of the meeting camera 100 can be between 8 inches and 12 inches. In some embodiments, the height of the wide camera 2, 3, 5 from the base of the meeting camera 100 can be between 10 and 12 inches. In some embodiments, the height of the wide camera 2, 3, 5 from the base of the meeting camera 100 can be between 10 and 11 inches. In some embodiments, the camera 2, 3, 5 can be placed with a height that is below the eye-level view to meeting attendees M1, M2 . . . Mn. In other embodiments, the camera 2, 3, 5 can be placed with a height that is above the eye-level view to meeting attendees M1, M2 . . . Mn. In some embodiments, the meeting camera 100 can be mounted to a ceiling of the meeting room, to a wall, at the top of the table CT, on a tripod, or any other means to place the meeting camera 100, such that the camera 2, 3, 5 may have unobstructed or least unobstructed view to meeting attendees M1, M2 . . . Mn.

In some embodiments, when mounting the meeting camera 100 to a ceiling, the meeting camera 100 can be inverted and hung from the ceiling, which can cause the meeting camera 100 to capture inverted picture or video image. In such cases, the meeting camera 100 can be configured to switch to an inverted mode to correct the inverted picture or video image to an upright position. For example, the meeting camera 100 can be configured to correct the inverted picture or video image by inverting the captured picture or video image to an upright position, for example, during a rendering process to generate upright video image or picture data. In some embodiments, the upright video image or picture data can be received by internal computer vision operations for various vision or image processing as described herein. In some embodiments, the meeting camera 100 can be configured to process coordinate system transformations to map between inverted and upright domains. In some embodiments, the meeting camera 100 can switch to an inverted mode when a user selects an inverted mode, or when processor 6 detects an inverted picture or video image.

In some embodiment, a microphone array 4 includes at least one or more microphones, and may obtain bearings of interest to sounds or speech nearby by beam forming, relative time of flight, localizing, or received signal strength differential. The microphone array 4 may include a plurality of microphone pairs directed to cover at least substantially the same angular range as the wide camera 2 field of view.

In some embodiments, the microphone array 4 can be optionally arranged together with the wide camera 2, 3, 5 at a height of higher than 8 inches, again so that a direct "line of sight" exists between the array 4 and attendees M1, M2 . . . Mn as they are speaking, unobstructed by typical laptop screens. A CPU and/or GPU (and associated circuits such as a camera circuit) 6, for processing computing and graphical events, are connected to each of the wide camera 2, 3, 5 and microphone array 4. In some embodiments, the microphone array 4 can be arranged within the same height ranges set forth above for camera 2, 3, 5. ROM and RAM 8 are connected to the CPU and GPU 6 for retaining and receiving executable code. Network interfaces and stacks 10 are provided for USB, Ethernet, Bluetooth 13 and/or WiFi 11, connected to the CPU 6. One or more serial busses can interconnect these electronic components, and they can be powered by DC, AC, or battery power.

The camera circuit of the camera 2, 3, 5 may output a processed or rendered image or video stream as a single camera image signal, video signal or stream from 1.25:1 to 2.4:1 or 2.5:1 "H:V" horizontal to vertical proportion or aspect ratio (e.g., inclusive of 4:3, 16:10, 16:9 proportions) in landscape orientation, and/or, as noted, with a suitable lens and/or stitching circuit, a panoramic image or video stream as a single camera image signal of substantially 2.4:1 or greater. The meeting camera 100 of FIG. 1A may be connected as a USB peripheral to a laptop, tablet, or mobile device 40 (e.g., having a display, network interface, computing processor, memory, camera and microphone sections, interconnected by at least one bus) upon which multi-party teleconferencing, video conferencing, or video chat software is hosted, and connectable for teleconferencing to remote clients 50 via the internet 60.

FIG. 1B is a variation of FIG. 1A in which both the device 100 of FIG. 1A and the teleconferencing device 40 are integrated. In some embodiments, a camera circuit can be configured to output as a single camera image signal, video signal, or video stream can be directly available to the CPU, GPU, associated circuits and memory 5, 6, and the teleconferencing software can be hosted instead by the CPU, GPU and associated circuits and memory 5, 6. The device 100 can be directly connected (e.g., via WiFi or Ethernet) for teleconferencing to remote clients 50 via the internet 60 or INET. A display 12 provides a user interface for operating the teleconferencing software and showing the teleconferencing views and graphics discussed herein to meeting attendees M1, M2 . . . M3. The device or meeting camera 100 of FIG. 1A may alternatively be connect directly to the internet 60, thereby allowing video to be recorded directly to a remote server, or accessed live from such a server, by remote clients 50.

Figure 1C:
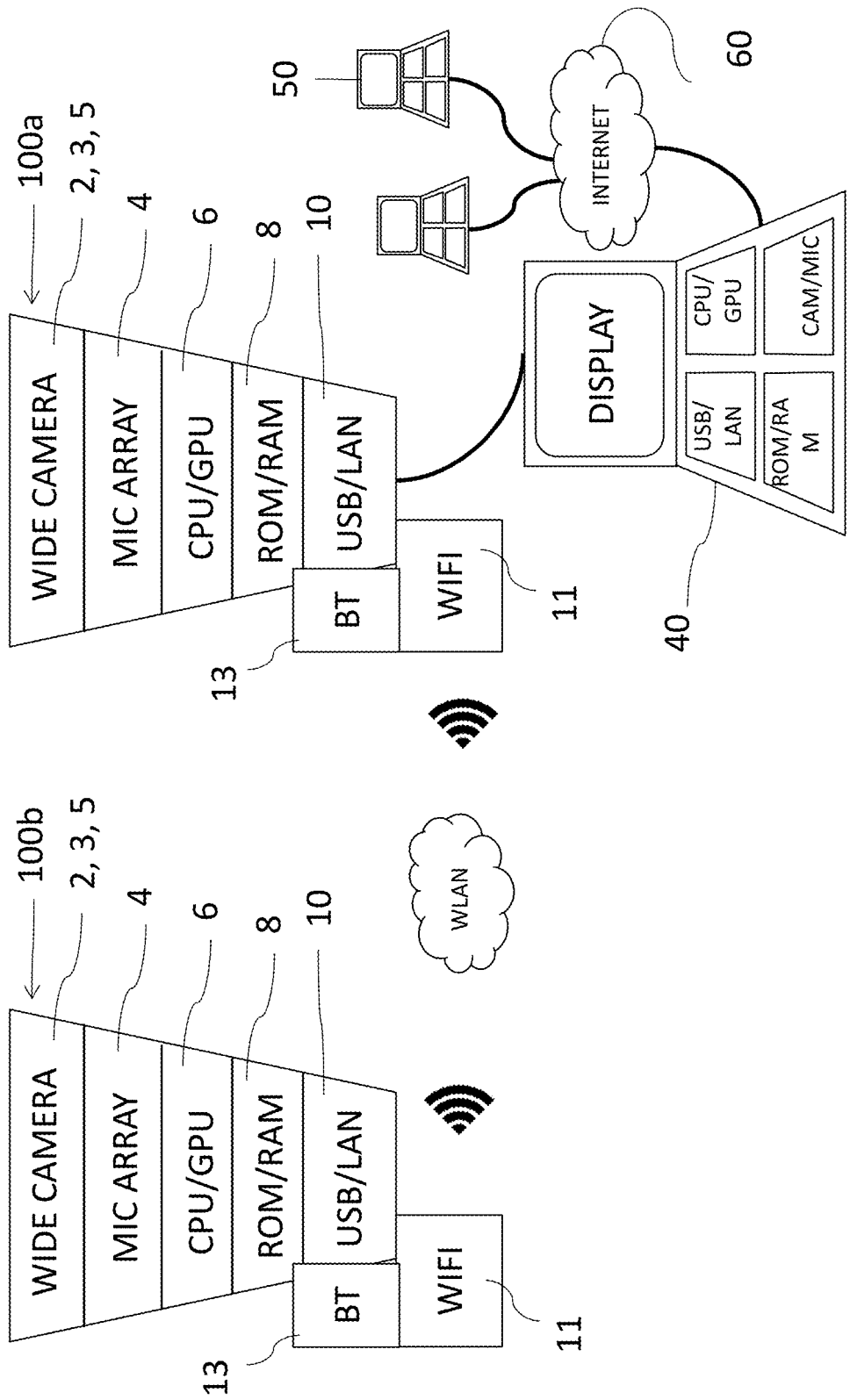

FIG. 1C shows two meeting cameras 100a and 100b that can be used together to provide multiple viewpoints in the same meeting. In some embodiments, more than two meeting cameras can be used together to provide multiple viewpoints in the same meeting with similar set ups, configurations, features, functions, etc. as described herein. In some embodiments, the two meeting cameras 100a and 100b may deliver a live or streamed video display to the videoconferencing platform, and the live video display provided may be composited to include various subscenes. The subscenes can be those taken from the wide camera 2, 3, 5 in 100a and/or 100b, for example, such as a panoramic view of all meeting participants, focused subviews cropped from the full resolution panoramic view, other views (e.g., a whiteboard WB, a virtual white board VWB, a designated view DV, etc.), or synthesized views (e.g., a digital slide presentation, an augmented view of physical whiteboard WB and virtual whiteboard VWB, etc.).

The meeting camera's features such as a whiteboard WB view, a virtual white board VWB view, a designated view (DV), a synthesized or augmented view, etc. are described in greater detail in the above referenced U.S. patent application Ser. No. 17/394,373, the disclosure of which is incorporated herein by reference in its entirety.

In some embodiments, the two meeting cameras 100a and 100b can connected via the network interfaces and stacks 10. For example, the two meeting cameras 100a and 100b can be connected using USB, Ethernet, or other wired connections. In another example, the two meeting cameras 100a and 100b can be wirelessly connected via WiFi 11, Bluetooth 13, or any other wireless connections. In other embodiments, the device 100b can be a standalone device configured to generate, process, and/or share a high resolution image of an object of interest such as whiteboard WB as describe herein.

In some embodiments, the height of the wide camera 2, 3, 5 from the base of the two meeting cameras 100a and 100b can be between 8-15 inches. In some embodiments, the height of the meeting camera 100a's wide camera 2, 3, 5 and the height of the meeting camera 100b's wide camera 2, 3, 5 can be similar or the same. For example, the two meeting cameras 100a and 100b can be placed at the top of the table CT, so that the heights are similar or the same. In some embodiments, it can be desirable to place the two meeting cameras 100a and 100b, such that the height of the meeting camera 100a's wide camera 2, 3, 5 and the height of the meeting camera 100b's wide camera 2, 3, 5 can be within 10 inches of each other. In some embodiments, the height of the meeting camera 100a's wide camera 2, 3, 5 and the height of the meeting camera 100b's wide camera 2, 3, 5 can differ by more than 10 inches. For example, one of the two meeting cameras 100a and 100b can be mounted to a ceiling, while the other is placed at the top of the table CT.

In some embodiments, the two meeting cameras 100a and 100b can be placed within a threshold distance, such that the two meeting cameras 100a and 100b can detect each other, can maintain wired/wireless communications with each other, are within the line of visual sight from each other (e.g., the camera in each meeting cameras 100a and 100b can capture an image or video with the other meeting camera), and/or are able to hear each other (e.g., mic array 4 in each meeting cameras 100a and 100b can detect sound generated by the other meeting camera). For example, the two meeting cameras 100a and 100b can be placed about 3 to 8 feet apart from each other. In another example, the two meeting cameras 100a and 100b can be placed farther than 8 feet from each other or closer than 3 feet from each other.

Figure 1D:
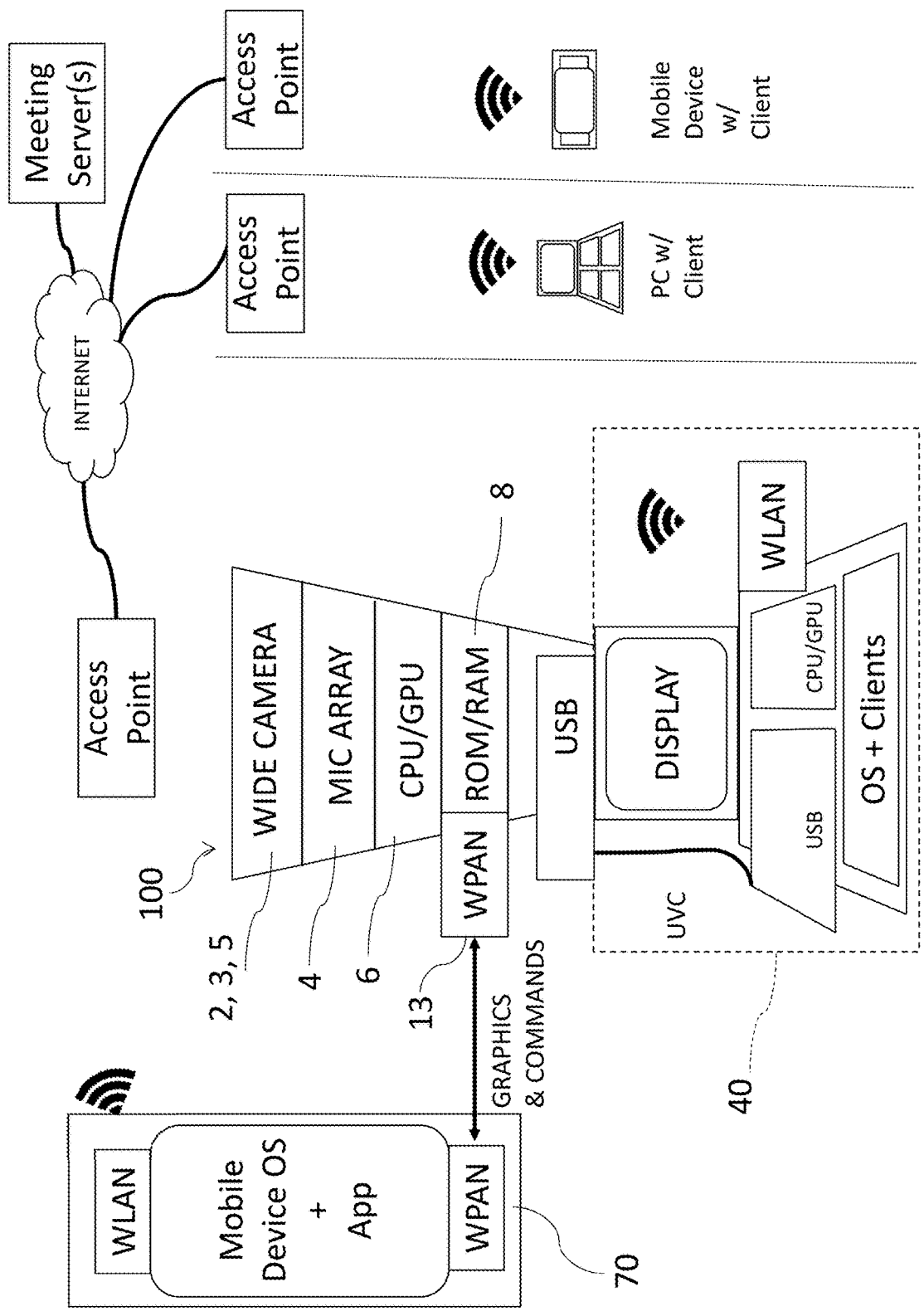

FIG. 1D shows a simplified schematic of the device 100 and the teleconferencing device 40. For example, as shown in FIG. 1D, both the device 100 of FIG. 1A and the teleconferencing device 40 may be unitary or separate. Even if enclosed in a single, unitary housing, the wired connection (e.g., USB) providing the webcam video signal permits various video conferencing platforms to be used on the teleconferencing device 40 to be used, as the various platforms all receive the webcam video signal as an external camera (e.g., UVC). In some embodiments, the meeting camera 100 portion of the optionally combined 100, 40 device can be directly connected to the teleconferencing device 40 as a wired webcam, and may receive whiteboard notes and commands from a mobile device 70 via a WPAN, WLAN, any other wireless connections (e.g., WiFi, Bluetooth, etc.), or any wired connections described herein.

FIGS. 2A through 2J are schematic representations of embodiments of meeting camera 14 or camera tower 14 arrangements for the devices or meeting cameras 100 of FIGS. 1A and 1B, and suitable for collecting wide and/or panoramic scenes. "Camera tower" 14 and "meeting camera" 14 may be used herein substantially interchangeably, although a meeting camera need not be a camera tower. In some embodiments, the height of the wide camera 2, 3, 5 from the base of the device 100 in FIGS. 2A-2J can be between 8 inches and 15 inches. In other embodiments, the height of the wide camera 2, 3, 5 from the base of the device 100 in FIGS. 2A-2J can be less than 8 inches. In other embodiments, the height of the wide camera 2, 3, 5 from the base of the device 100 in FIGS. 2A-2J can be more than 15 inches.

FIG. 2A shows an exemplary camera tower 14 arrangement with multiple cameras that are peripherally arranged at the camera tower 14 camera level (e.g., 8 to 15 inches), equiangularly spaced. The number of cameras can be determined by field of view of the cameras and the angle to be spanned, and in the case of forming a panoramic stitched view, the cumulative angle spanned may have overlap among the individual cameras. In the case of, for example, FIG. 2A, four cameras 2a, 2b, 2c, 2d (labeled 2a-2d) each of 100-110 degree field of view (shown in dashed lines) are arranged at 90 degrees to one another, to provide cumulative view or a stitchable or stitched view of 360 degrees about the camera tower 14.

FIG. 2B shows an exemplary camera tower 14 arrangement with three cameras 2a, 2b, 2c (labeled 2a-2c) each of 130 or higher degree field of view (shown in dashed lines) are arranged at 120 degrees to one another, again to provide a 360 degree cumulative or stitchable view about the tower 14. The vertical field of view of the cameras 2a-2d is less than the horizontal field of view, e.g., less than 80 degrees.

In some embodiments, images, video or sub-scenes from each camera 2a-2d may be processed to identify bearings or sub-scenes of interest before or after optical correction such as stitching, dewarping, or distortion compensation, and can be corrected before output.

FIG. 2C shows an exemplary camera tower 14 arrangement with a single fisheye or near-fisheye camera 3a, directed upward, is arranged atop the camera tower 14 camera level (e.g., 8 to 15 inches). In this case, the fisheye camera lens is arranged with a 360 continuous horizontal view, and approximately a 215 (e.g., 190-230) degree vertical field of view (shown in dashed lines). Alternatively, a single catadioptric "cylindrical image" camera or lens 3b, e.g., having a cylindrical transparent shell, top parabolic mirror, black central post, telecentric lens configuration as shown in FIG. 2D, is arranged with a 360 degree continuous horizontal view, with an approximately 40-80 degree vertical field of view, centered approximately on the horizon. In the case of each of the fisheye and cylindrical image cameras, the vertical field of view, positioned at 8-15 inches above a meeting table, extends below the horizon, permitting attendees M1, M2 . . . Mn about a meeting table to be imaged to waist level or below. In some embodiments, images, video or sub-scenes from each camera 3a or 3b may be processed to identify bearings or sub-scenes of interest before or after optical correction for fisheye or catadioptric lenses such as dewarping, or distortion compensation, and can be corrected before output.

In the camera tower 14 arrangement of FIG. 2E, multiple cameras are peripherally arranged at the camera tower 14 camera level (e.g., 8 to 15 inches), equiangularly spaced. The number of cameras is not in this case intended to form a completely contiguous panoramic stitched view, and the cumulative angle spanned does not have overlap among the individual cameras. In the case of, for example, FIG. 2E, two cameras 2a, 2b each of 130 or higher degree field of view (shown in dashed lines) are arranged at 90 degrees to one another, to provide a separated view inclusive of approximately 260 degrees or higher on both sides of the camera tower 14. This arrangement would be useful in the case of longer conference tables CT. In the case of, for example, FIG. 2E, the two cameras 2a-2b are panning and/or rotatable about a vertical axis to cover the bearings of interest B1, B2 . . . Bn discussed herein. Images, video or sub-scenes from each camera 2a-2b may be scanned or analyzed as discussed herein before or after optical correction.

In FIGS. 2F and 2G, table head or end arrangements are shown, e.g., each of the camera towers 14 shown in FIGS. 2F and 2G are intended to be placed advantageously at the head of a conference table CT. As shown in FIGS. 3A-3D, a large flat panel display FP for presentations and videoconferencing can be placed at the head or end of a conference table CT, and the arrangements of FIGS. 2F and 2G are alternatively placed directly in front of and proximate the flat panel FP. In the camera tower 14 arrangement of FIG. 2F, two cameras of approximately 130 degree field of view are placed 120 degrees from one another, covering two sides of a long conference table CT. A display and touch interface 12 is directed down-table (particularly useful in the case of no flat panel FP on the wall) and displays a client for the videoconferencing software. This display 12 may be a connected, connectable or removable tablet or mobile device. In the camera tower arrangement of FIG. 2G, one high resolution, optionally tilting camera 7 (optionally connected to its own independent teleconferencing client software or instance) is directable at an object of interest (such as a whiteboard WB or a page or paper on the table CT surface), and two independently panning/or tilting cameras 5a, 5b of, e.g., 100-110 degree field of view are directed or directable to cover the bearings of interest.

Images, video or sub-scenes from each camera 2a, 2b, 5a, 5b, 7 may be scanned or analyzed as discussed herein before or after optical correction. FIG. 2H shows a variation in which two identical units, each having two cameras 2a-2b or 2c-2d of 100-130 degrees arranged at 90 degree separation, may be independently used 180 or greater degree view units at the head(s) or end(s) of a table CT, but also optionally combined back-to-back to create a unit substantially identical to that of FIG. 2A having four cameras 2a-2d spanning an entire room and well-placed at the middle of a conference table CT. Each of the tower units 14, 14 of FIG. 2H would be provided with a network interface and/or a physical interface for forming the combined unit. The two units may alternatively or in addition be freely arranged or arranged in concert as discussed with respect to FIG. 2J.

In FIG. 2I, a fisheye camera or lens 3a (physically and/or conceptually interchangeable with a catadioptric lens 3b) similar to the camera of FIG. 2C, is arranged atop the camera tower 14 camera level (8 to 15 inches). One rotatable, high resolution, optionally tilting camera 7 (optionally connected to its own independent teleconferencing client software or instance) is directable at an object of interest (such as a whiteboard WB or a page or paper on the table CT surface). In some embodiments, this arrangement works advantageously when a first teleconferencing client receives the composited sub-scenes from the scene SC camera 3a, 3b as a single camera image or Composited Output CO, e.g., via first physical or virtual network interface, and a second teleconferencing client receives the independent high resolution image from camera 7.

FIG. 2J shows a similar arrangement, similarly in which separate videoconferencing channels for the images from cameras 3a, 3b and 7 may be advantageous, but in the arrangement of FIG. 2J, each camera 3a, 3b, and 7 has its own tower 14 and is optionally connected to the remaining tower 14 via interface 15 (which may be wired or wireless). In the arrangement of FIG. 2J, the panoramic tower 14 with the scene SC camera 3a, 3b may be placed in the center of the meeting conference table CT, and the directed, high resolution tower 14 may be placed at the head of the table CT, or anywhere where a directed, high resolution, separate client image or video stream would be of interest. Images, video or sub-scenes from each camera 3a, 3b, and 7 may be scanned or analyzed as discussed herein before or after optical correction.

Meeting Camera Usage

Figure 3A:
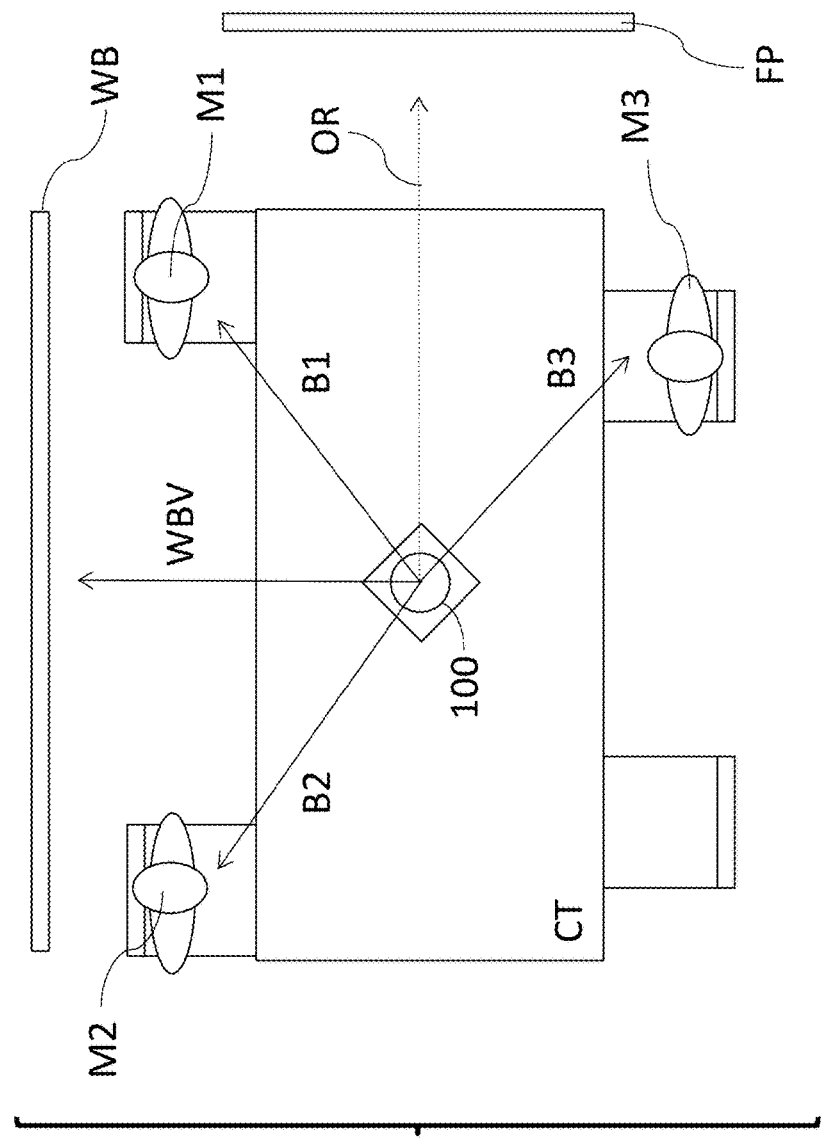
FIGS. 3A-3B show exemplary top down view of a meeting camera use case, and a panorama image signal according to aspects of the disclosed subject matter.
Figure 3B:
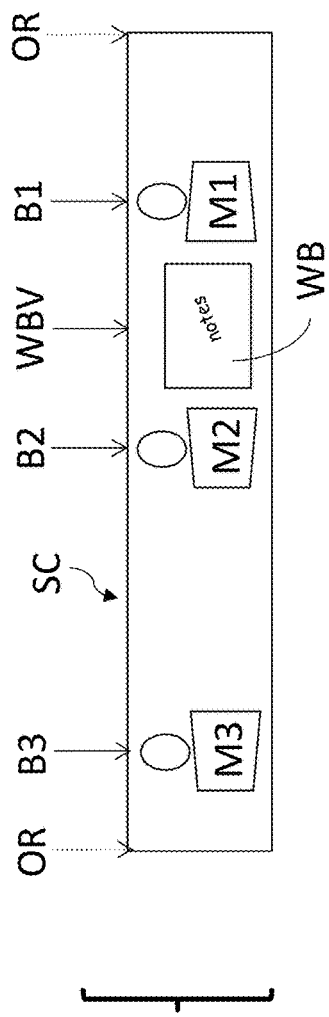

With reference to FIGS. 3A and 3B, according to an embodiment of the present method of compositing and outputting photographic scenes, a device or meeting camera 100 is placed atop, for example, a circular or square conference table CT. The device 100 may be located according to the convenience or intent of the meeting participants M1, M2, M3 . . . Mn, for example, based on the locations of the participants, a flat panel display FP, and/or a whiteboard WB.

In some embodiments, in a meeting, participants M1, M2 . . . Mn will be angularly distributed with respect to the device 100. For example, if the device 100 is placed in the center of the participants M1, M2 . . . Mn, the participants can be captured, as discussed herein, with a panoramic camera. In another example, if the device 100 is placed to one side of the participants (e.g., at one end of the table, or mounted to a flat panel FP), then a wide camera (e.g., 90 degrees or more) may be sufficient to span or capture the participants M1, M2 . . . Mn, and/or a whiteboard WB.

As shown in FIG. 3A, participants M1, M2 . . . Mn will each have a respective bearing B1, B2 . . . Bn from the device 100, e.g., measured for illustration purposes from an origin OR. Each bearing B1, B2 . . . Bn may be a range of angles or a nominal angle. As shown in FIG. 3B, an "unrolled", projected, or dewarped fisheye, panoramic or wide scene SC includes imagery of each participant M1, M2 . . . Mn, arranged at the expected respective bearing B1, B2 . . . Bn. Particularly in the case of rectangular tables CT and/or an arrangement of the device 100 to one side of the table CT, imagery of each participant M1, M2 . . . Mn may be foreshortened or distorted in perspective according to the facing angle of the participant (roughly depicted in FIG. 3B and throughout the drawings with an expected foreshortening direction). Perspective and/or visual geometry correction as is well known to one of skill in the art may be applied to foreshortened or perspective distorted imagery, sub-scenes, or the scene SC, but may not be necessary.

Combining a Manually or Automatically Designated View (DV)

In some embodiments, a self-contained portable webcam apparatus such as a meeting camera 100 may benefit from integrating, in addition to the stage presentation and panorama presentation discussed herein, the function of integrating a manually or automatically designated portion of the overall wide camera or panorama view. In some embodiments, the wide, or optionally 360-degree camera 2, 3, 5 may generate the panorama view (e.g., at full resolution, a "scaled" panorama view being down-sampled with substantially identical aspect ratio).

In some embodiments, a meeting camera 100's processor 6 (e.g., CPU/GPU) may maintain a coordinate map of the panorama view within RAM 8. As discussed herein, the processor 6 may composite a webcam video signal (e.g., also a single camera image or Composited Output CO). In addition to the scaled panorama view and stage views discussed herein, a manually or automatically designated view DV may be added or substituted by the processor 6.

In some embodiments, as shown in FIG. 1A, a meeting camera 100 can be tethered to a host PC or workstation, and can be configured to identify itself as a web camera (e.g., via USB). In some embodiments, the meeting camera 100 can be configured with a ready mechanism for specifying or changing designation of the manually or automatically designated view DV. In another embodiment, the meeting camera 100 can be configured without a ready mechanism for specifying or changing designation of the manually or automatically designated view DV.

Figure 4B:
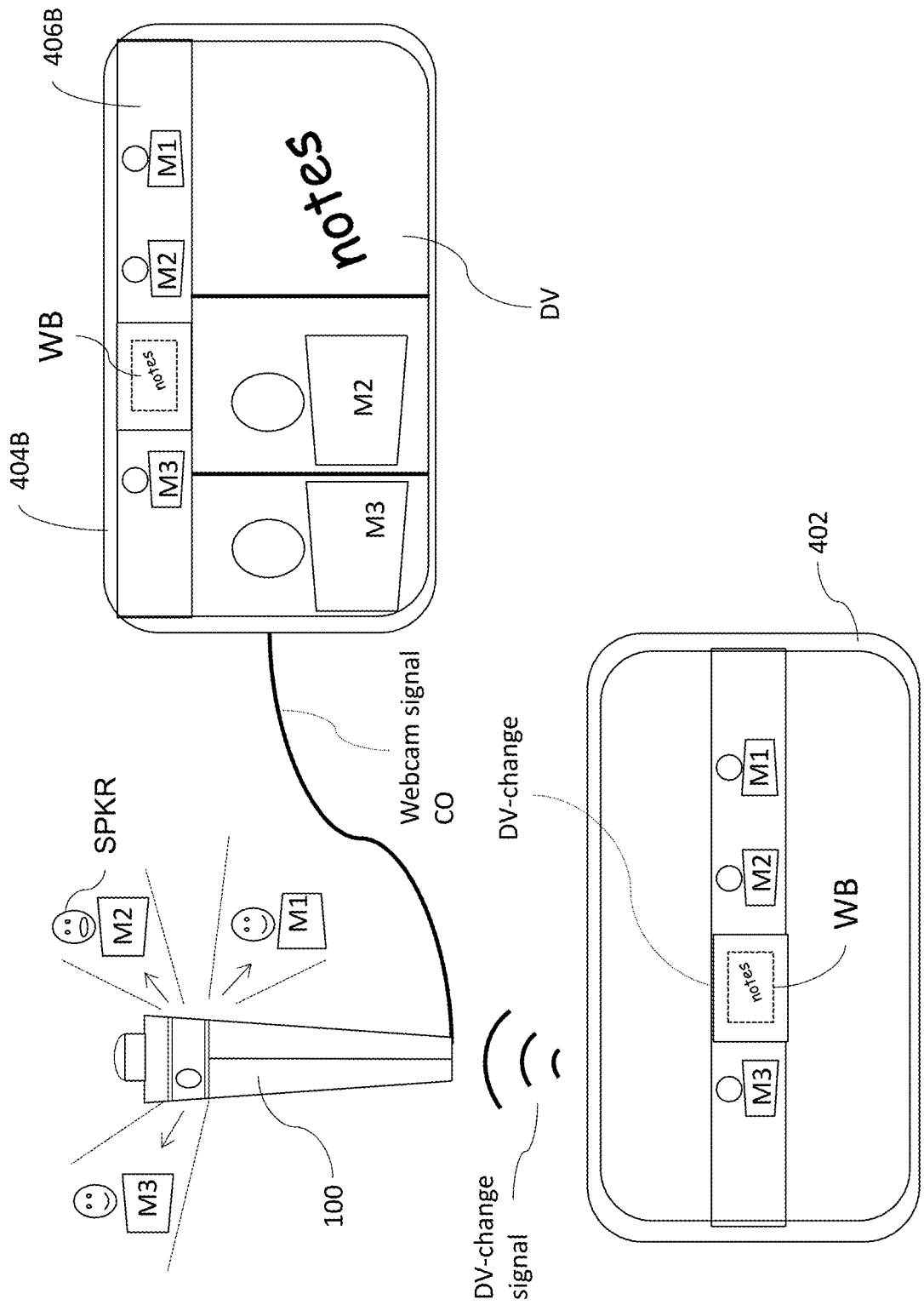
Figure 4C:
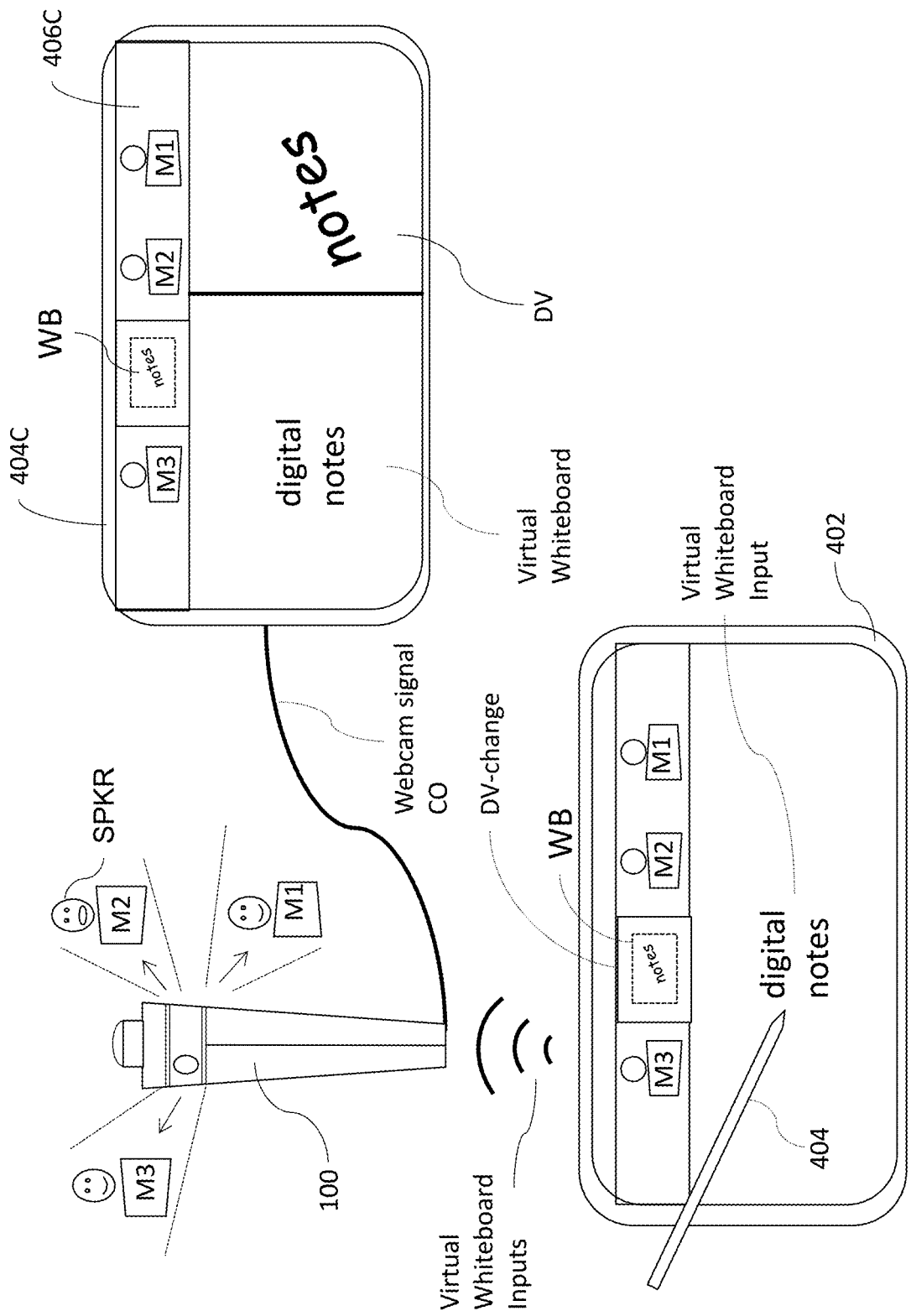

In some embodiments, as shown in FIGS. 4A, 4B, and 4C, a local mobile device 402 connected to the meeting camera 100 via a peripheral interface, e.g., Bluetooth, may be configured to provide the location or size or change in either location or size "DV-change" of the designated view DV within the panorama view. In this case, the meeting camera 100 includes a receiver for that interface, e.g., a Bluetooth receiver, as a first communications interface configured to receive coordinate instructions within the coordinate map that determine coordinates of the manually or automatically designated view DV within the panorama view, while the tethered webcam connection, e.g., USB, is a second communications interface. For example, the meeting camera 100 can be configured to include a second communications interface configured to communicate the webcam video signal CO, including the manually or automatically designated view DV, as a video signal to e.g., a host computer.

In some embodiments, as discussed herein, a meeting camera 100 may act as a device for compositing webcam video signals according to sensor-localized and manual inputs. For example, a meeting camera 100 may have a wide camera observing a wide field of view of substantially 90 degrees or greater. A localization sensor array may be configured to identify one or more bearings of interest within the wide field of view. As discussed herein, this array may be a fusion array including both audio and video localization.

In some embodiments, a meeting camera 100's processor 6 may be operatively connected to the wide camera, and may be configured to maintain a coordinate map of the wide camera field of view, e.g., in RAM 8. The processor may be configured to sub-sample subscene video signals along the bearings of interest to include within the stage view.

In some embodiments, a meeting camera 100's processor 6 may composite a webcam video signal that includes just some or all of the views available. For example, the views available can include a representation of the wide field of view (e.g., the downsampled scaled panorama view that extends across the top of the webcam video signal CO), a stage view including the subscene video signals (arranged as discussed herein, with 1, 2, or 3 variable width subscene signals composited into the stage), or a manually or automatically designated view DV.

In some embodiments, a manually or automatically designated view DV can be similar to the subscene video signals used to form the stage view. For example, the designated view DV may be automatically determined, e.g., based on sensor-localized, bearing of interest, that can be automatically added to or moved off the stage, or resized according to an expectation of accuracy of the localization (e.g., confidence level). In another embodiment, the designated view DV can be different from the subscene video signals used to form the stage view, and may not be automatically determined (e.g., manually determined).

In some embodiments, a first communications interface such as Bluetooth may be configured to receive coordinate instructions within the coordinate map that determine coordinates of the designated view "DV-change" within the wide field of view, and a second communications interface such as USB (e.g., camera) may be configured to communicate the webcam video signal including at least the manually or automatically designated view DV.

In some embodiments, a meeting camera 100's processor 6 may form the manually or automatically designated view DV as a subscene of lesser height and width than the panorama view. For example, as discussed herein, the stage views may be assembled according to a localization sensor array configured to identify one or more bearings of interest within panorama view, wherein the processor sub-samples localized subscene video signals of lesser height and width than the panorama view along the bearings of interest, and the stage view includes the localized subscene video signals. For example, the processor may form the scaled panorama view as a reduced magnification of the panorama view of approximately the width of the webcam video signal.

In some embodiments, a meeting camera 100 may begin a session with a default size and location (e.g., arbitrary middle, last localization, pre-determined, etc.) for the manually or automatically designated view DV, in which case the coordinate instructions may be limited or may not be limited to a direction of movement of a "window" within the panorama view corresponding to the default size and location. As shown in FIGS. 4A-4C, the mobile device 402 may send, and the meeting camera 100 may receive, coordinate instructions that include a direction of movement of the coordinates of the designated view DV.

In some embodiments, a meeting camera 100's processor 6 may change the manually or automatically designated view DV in real time in accordance with the direction of movement, and may continuously update the webcam video signal CO to show the real-time motion of the designated view DV. In this case, for example, the mobile device and corresponding instructions can be a form of joystick that move the window about. In other examples, the size and location of the manually or automatically designated view DV may be drawn or traced on a touchscreen.

In some embodiments, a meeting camera 100's processor 6 may change the "zoom" or magnification of the designated view DV. For example, the processor may change the designated view DV in real time in accordance with the change in magnification, and can be configured to continuously update the webcam video signal CO to show the real-time change in magnification of the designated view DV.

In some embodiments, as shown in FIG. 4A, a local mobile device 402 connected to the meeting camera 100 (e.g., via Bluetooth) can be configured to provide the location or size or change in either location or size "DV-change" of the designated view DV within the panorama view. In this case, for example, the local mobile device 402 can be designating the participant M2's head. In response to receiving the signal from the mobile device 402, the meeting camera 100 can be configured to communicate the webcam video signal CO, including the designated view DV that shows the participant M2's head, as a video signal to e.g., a host computer. In some embodiments, the webcam video signal CO in FIG. 4A can generate a composited video 404A, which can be displayed, for example, by a host computer 40, remote client 50, etc. For example, the composited video 404A shows the panorama view 406A with the participants M1, M2, and M3. For example, the composited video 404A also shows the stage view with two subscenes, where one subscene is showing the participant M3 and the other subscene is showing the participant M2. For example, the composited video 404A also shows the designated view DV as designated by the local mobile device 402 to show the participant M2's head.

In another embodiments, as shown in FIG. 4B, a local mobile device 402 connected to the meeting camera 100 (e.g., via Bluetooth) can be configured to provide the location or size or change in either location or size "DV-change" of the designated view DV within the panorama view. In this case, for example, the local mobile device 402 can be designating the whiteboard WB's writing "notes." In response to receiving the signal from the mobile device 402, the meeting camera 100 can be configured to communicate the webcam video signal CO, including the designated view DV that shows the whiteboard WB's writing "notes," as a video signal to e.g., a host computer. In some embodiments, the webcam video signal CO in FIG. 4B can generate a composited video 404B, which can be displayed, for example, by a host computer 40, remote client 50, etc. For example, the composited video 404B shows the panorama view 406B with the participants M1, M2, and M3, and the whiteboard WB. For example, the composited video 404B also shows the stage view with two subscenes on the participants M2 and M3, where one subscene is showing the participant M3 and the other subscene is showing the participant M2. For example, the composited video 404B also shows the designated view DV as designated by the local mobile device 402 to show the writing "notes" on the whiteboard WB.

In another embodiments, as shown in FIG. 4C, a local mobile device 402 connected to the meeting camera 100 (e.g., via Bluetooth) can be configured to provide the location or size or change in either location or size "DV-change" of the designated view DV within the panorama view. In addition, the local mobile device 402 can also be configured to provide an input to a virtual whiteboard described herein, for example, using a writing device 404 (e.g., stylus, finger, etc.). In this case, for example, the local mobile device 402 is designating the whiteboard WB's writing "notes," and also sending virtual whiteboard input "digital notes." In response to receiving the signal from the mobile device 402, the meeting camera 100 can be configured to communicate the webcam video signal CO, including the designated view DV that shows the whiteboard WB's writing "notes" and the virtual whiteboard with "digital notes" input, as a video signal to e.g., a host computer. In some embodiments, the webcam video signal CO in FIG. 4C can generate a composited video 404C, which can be displayed, for example, by a host computer 40, remote client 50, etc. For example, the composited video 404C shows the panorama view 406C with the participants M1, M2, and M3, and the whiteboard WB. For example, the composited video 404C also shows the stage view with the virtual whiteboard and the designated view DV. For example the virtual whiteboard is showing the digital writing "digital notes" according to the virtual whiteboard input "digital notes" from the mobile device 402. For example, the composited video 404C also shows the designated view DV as designated by the local mobile device 402 to show the writing "notes" on the whiteboard WB.

Examples of Bearings of Interest

For example, bearings of interest may be those bearing(s) corresponding to one or more audio signal or detection, e.g., a participant M1, M2 . . . Mn speaking, angularly recognized, vectored, or identified by a microphone array 4 by, e.g., beam forming, localizing, or comparative received signal strength, or comparative time of flight using at least two microphones. Thresholding or frequency domain analysis may be used to decide whether an audio signal is strong enough or distinct enough, and filtering may be performed using at least three microphones to discard inconsistent pairs, multipath, and/or redundancies. Three microphones have the benefit of forming three pairs for comparison.

As another example, in the alternative or in addition, bearings of interest may be those bearing(s) at which motion is detected in the scene, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which facial structures are detected in the scene, angularly recognized, vectored, or identified by facial detection circuits or executable code that scan images or motion video or RGBD signal from the camera 2. Skeletal structures may also be detected in this manner.

As another example, in the alternative or in addition, bearings of interest may be those bearing(s) at which color, texture, and/or pattern substantially contiguous structures are detected in the scene, angularly recognized, vectored, or identified by edge detection, corner detection, blob detection or segmentation, extrema detection, and/or feature detection circuits or executable code that scan images or motion video or RGBD signal from the camera 2. Recognition may refer to previously recorded, learned, or trained image patches, colors, textures, or patterns.

As another example, in the alternative or in addition, bearings of interest may be those bearing(s) at which a difference from known environment are detected in the scene, angularly recognized, vectored, or identified by differencing and/or change detection circuits or executable code that scan images or motion video or RGBD signal from the camera 2. For example, the device 100 may keep one or more visual maps of an empty meeting room in which it is located, and detect when a sufficiently obstructive entity, such as a person, obscures known features or areas in the map.

As another example, in the alternative or in addition, bearings of interest may be those bearing(s) at which regular shapes such as rectangles are identified, including 'whiteboard' shapes, door shapes, or chair back shapes, angularly recognized, vectored, or identified by feature, image, pattern, class, and or motion detection circuits or executable code that scan image or motion video or RGBD from the camera 2.

As another example, in the alternative or in addition, bearings of interest may be those bearing(s) at which fiducial objects or features recognizable as artificial landmarks are placed by persons using the device 100, including active or passive acoustic emitters or transducers, and/or active or passive optical or visual fiducial markers, and/or RFID or otherwise electromagnetically detectable, these angularly recognized, vectored, or identified by one or more techniques noted above.

Multiple Units

In some embodiments, as shown in FIG. 1C, more than one meeting camera 100a, 100b may be used together to provide multiple viewpoints in the same meeting. For example, two meeting cameras 100a and 100b can each include a 360-degree camera (e.g., a tabletop 360 camera or a virtual tabletop 360 camera that can capture and generate a panorama view) that can deliver a live or streamed video display to the videoconferencing platform, and the live video display provided may be composited to include various subscenes. In some embodiments, the subscenes can be captured from the 360 degree camera, such as a panoramic view of all meeting participants or focused subviews cropped from the full resolution panoramic view. In some embodiments, the subscenes can also include other views (e.g., a separate camera for a whiteboard WB) or synthesized views (e.g., a digital slide presentation, virtual white board, etc.).

In some embodiments, by compositing from among potential focused views according to perceived utility (e.g., autonomously or by direction) the tabletop 360-type camera can present consolidated, holistic views to remote observers that can be more inclusive, natural, or information-rich.

In some embodiments, when a tabletop 360-type camera is used in a small meeting (e.g., where all participants are within 6 feet of the tabletop 360 camera), the central placement of the camera can include focused sub-views of local participants (e.g., individual, tiled, or upon a managed stage) presented to the videoconferencing platform. For example, as participants direct their gaze or attention across the table (e.g., across the camera), the sub-view can appear natural, as the participant tends to face the central camera. In other cases, there can be some situations in which at least these benefits of the tabletop 360 camera may be somewhat compromised.

For example, when a remote participant takes a leading or frequently speaking role in the meeting, the local group may tend to often face the videoconferencing monitor (e.g., a flat panel display FP in FIGS. 3A and 6A) upon which they appear (e.g., typically placed upon a wall or cart to one side of the meeting table). In such cases, the tabletop 360 camera may present more profile sub-views of the local participants, and fewer face-on views, which can be less natural and satisfying to the remote participants. In another example, when the meeting table or room is particularly oblong, e.g., having a higher 'aspect ratio,' the local group may not look across the camera, and instead look more along the table. In such cases, the tabletop 360 camera may then, again present more profile sub-views of the local participants, and fewer face-on views.

As shown in FIG. 1C, introducing a second camera 100b can provide more views from which face-on views may be selected. In addition, the second camera 100b's complement of speakers and/or microphones can provide richer sound sources to collect or present to remote or local participants. The video and audio-oriented benefits here, for example, can independently or in combination provide an improved virtual meeting experience to remote or local participants.

In some embodiments, a down sampled version of a camera's dewarped, and full resolution panorama view may be provided as an 'unrolled cylinder' ribbon subscene within the composited signal provided to the videoconferencing platform. While having two or more panorama views from which to crop portrait subscenes can be beneficial, this down sampled panorama ribbon is often presented primarily as a reference for the remote viewer to understand the spatial relationship of the local participants. In some embodiments, one camera 100a or 100b can be used at a time to present the panorama ribbon, and the two or more cameras 100a or 100b can be used to select sub-views for compositing. In some embodiments, videoconferencing, directional, stereo, or polyphonic or surround sound (e.g., might be found in music reproduction) can be less important than consistent sound, so the present embodiments include techniques for merging and correcting audio inputs and outputs for uniformity and consistency.

Aspects of the disclosed subject matter herein include achieving communication enabling two or more meeting cameras (e.g., two or more tabletop 360 cameras) to work together, how to select subscenes from two or more panorama images in a manner that is natural, how to blend associated audio (microphone/input and speaker/output) in an effective manner, and how to ensure changes in the position of the meeting cameras are seamlessly accounted for.

Throughout this disclosure, when referring to "first" and "second" meeting cameras or, or "primary" and "secondary" meeting cameras or roles, "second" will mean "second or subsequent" and "secondary" will mean "secondary, tertiary, and so on." Details on the manner in which a third, fourth, or subsequent meeting camera or role may communicate with or be handled by the primary camera or host computer may included in some cases, but in general a third or fourth meeting camera or role would be added or integrated in the substantially same manner or in a routinely incremented manner to the manner in which the second meeting camera or role is described.

In some embodiments, as shown in FIG. 1C, the meeting cameras (e.g., tabletop 360 cameras) may include similar or identical hardware and software, and may be configured such that two or more can be used at once. For example, a first meeting camera 100a may take a primary or gatekeeping role (e.g., presenting itself as a conventional webcam connected by, e.g., USB, and providing conventional webcam signals) while the second meeting camera 100*b* and subsequent meeting cameras may take a secondary role (e.g., communicating data and telemetry primarily to the first meeting camera 100*a*, which then selects and processes selected data as describe from the second camera's offering).

As described herein, where the primary and secondary roles are performed by similar hardware/software structures, active functions appropriate for the role may be performed by the camera while the remaining functions remain available, can be inactive.

As described herein, some industry standard terminology can be used, as may be found in, for example, U.S. Patent Application Publication No. US 2019/0087198, hereby incorporated by reference in its entirety. In some embodiments, a camera processor may be configured as an image signal processor, which may include a camera interface or an image front end ("IFE") that interfaces between a camera module and a camera processor. In some embodiments, the camera processor may include additional circuitry to process the image content, including one or more image processing engines ("IPEs") configured to perform various image processing techniques, including demosaicing, color correction, effects, denoising, filtering, compression, and the like.

Figure 5A:
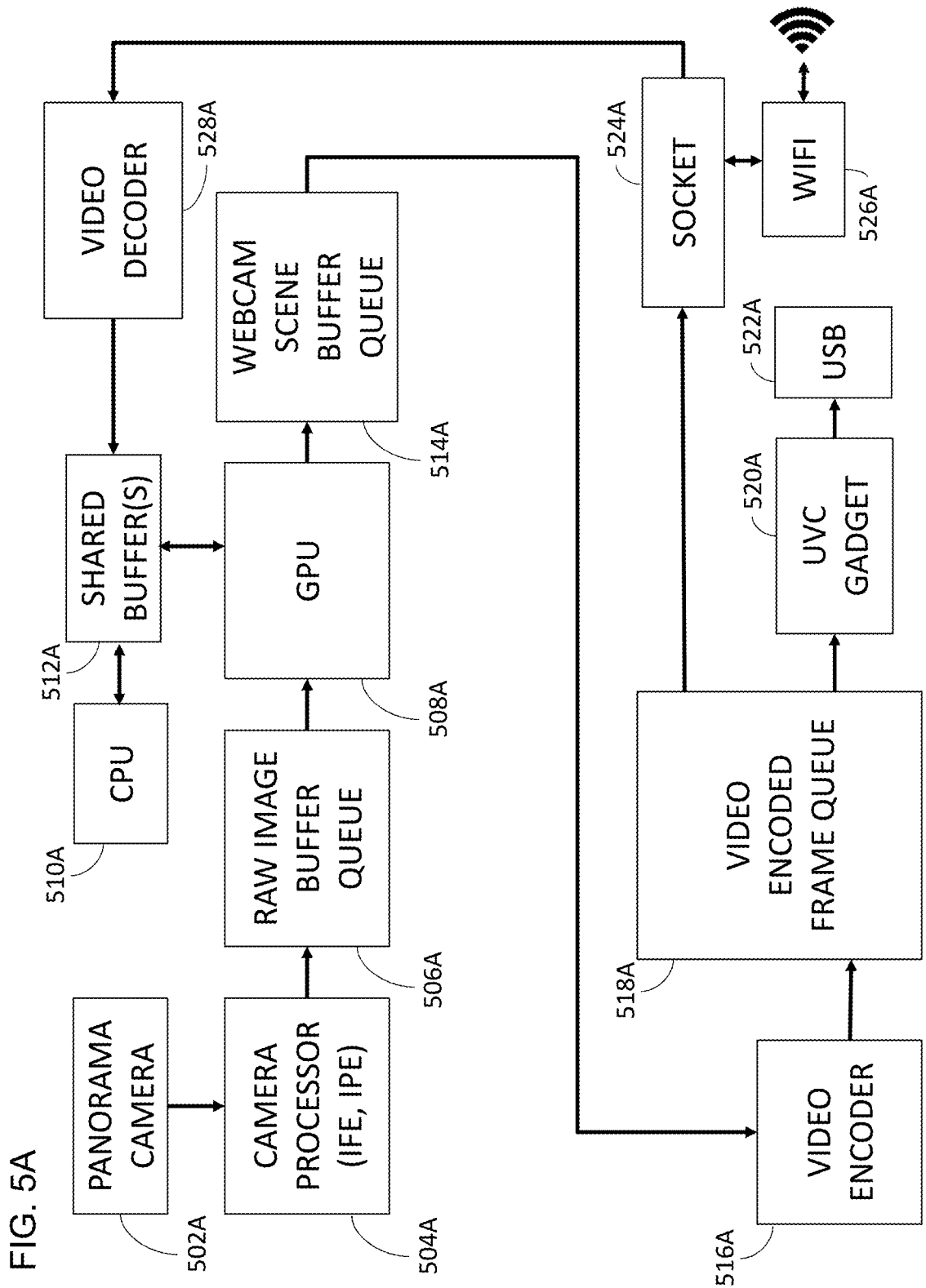
FIGS. 5A-5G show exemplary block diagrams depicting video pipelines of meeting cameras 100*a* and/or 100*b* with primary, secondary, and/or solitary roles according to aspects of the disclosed subject matter.

FIG. 5A shows an exemplary block diagram depicting a video pipeline of a meeting camera 100 (e.g., shown in FIGS. 1A-1D) with various components for configuring the meeting camera 100 to perform primary, secondary, and/or solitary roles as described herein. In some embodiments, the meeting camera 100 can include a panorama camera 502A that can capture and generate a panoramic view of meeting participants. For example, the panorama camera 502A can be OmniVision's OV16825 CameraChip™ Sensor, or any other commercially available camera sensors. In some embodiments, the panorama camera 502A can be configured to interact with or include a camera processor 504A that can process the panorama image captured by the camera. For example, the wide camera 2, 3, 5 of meeting camera 100 as shown in FIGS. 1A-1D can include the panorama camera 502A and the camera processor 504A. For example, the camera processor 504A can include a camera interface or an image front end (IFE) that can interface between a camera module and a camera processor. In another example, the camera processor 504A can include an image processing engine (IPE) that can be configured to perform various image processing techniques described herein (e.g., distortion compensation, demosaicing, color correction, effects, denoising, filtering, compression, or optical correction such as stitching, dewarping, etc.). In some embodiments, the camera processor 504A can send the processed image to a buffer queue such as a raw image buffer queue 504A before the processed image can be provided to GPU 508A and/or CPU 510A for further processing. For example, the raw image buffer queue 504A can store 4K (e.g., 3456×3456 pixels) image(s) from the camera 502A and camera processor 504A. In some embodiments, GPU 508A and CPU 510A can be connected to shared buffer(s) 512A to share and buffer audio and video data in between and with other components. As shown in FIGS. 1A-1D, the meeting camera 100 can include a CPU/GPU 6 (e.g., GPU 508A and/or CPU 510A) to perform the main processing functions of the meeting camera 100, for example, to process the audio and/or video data and composite a webcam video signal CO as described herein. For example, the GPU 508A and/or CPU 510A can process the 4K (e.g., 3456×3456 pixel) image(s) in the raw image buffer queue 504A and/or from a video decoder 528A, and generate a panorama view (e.g., 3840×540 pixel, 1920×1080 pixel, or 1920×540) image(s). In some embodiments, the processed video and/or audio data can be placed in another buffer queue 514A before sending the data to a video encoder 516A. In some embodiments, the video encoder 516A can encode the video images (e.g., panorama view images with 3840×540 pixel, 1920× 1080 pixel, or 1920×540 that are generated by the GPU 508A and/or CPU510A). For example, the video encoder 516A can encode the images using an H.264 format encoder (or any other standard encoders such as MPEG encoders). In some embodiments, the encoded images from the video encoder 516A can be placed on a video encoded frame queue 518A for transmission by network interfaces and stacks 10 (e.g., shown in FIGS. 1A-1D), such as the socket 524A connected to WiFi 526A and/or UVC gadget 520A with USB 522A. For example, the encoded and composited video signal CO can be transmitted to a host computer 40, remote client 50, etc. via the wired or wireless connections. In some embodiments, the meeting camera 100 can be configured to received audio and/or video data from other meeting camera(s) (e.g., meeting cameras with a secondary role). For example, the audio and/or video data can be received via WiFi 526A, and the received audio and/or video data from the other meeting camera(s) can be provided to the GPU 508A and/or CPU 510A for processing as described herein. If the video data received from the other meeting camera(s) is encoded, the encoded video data can be provided to a video decoder 528A, and decoded before the processing by the GPU 508A and/or CPU 510A.

Figure 5B:
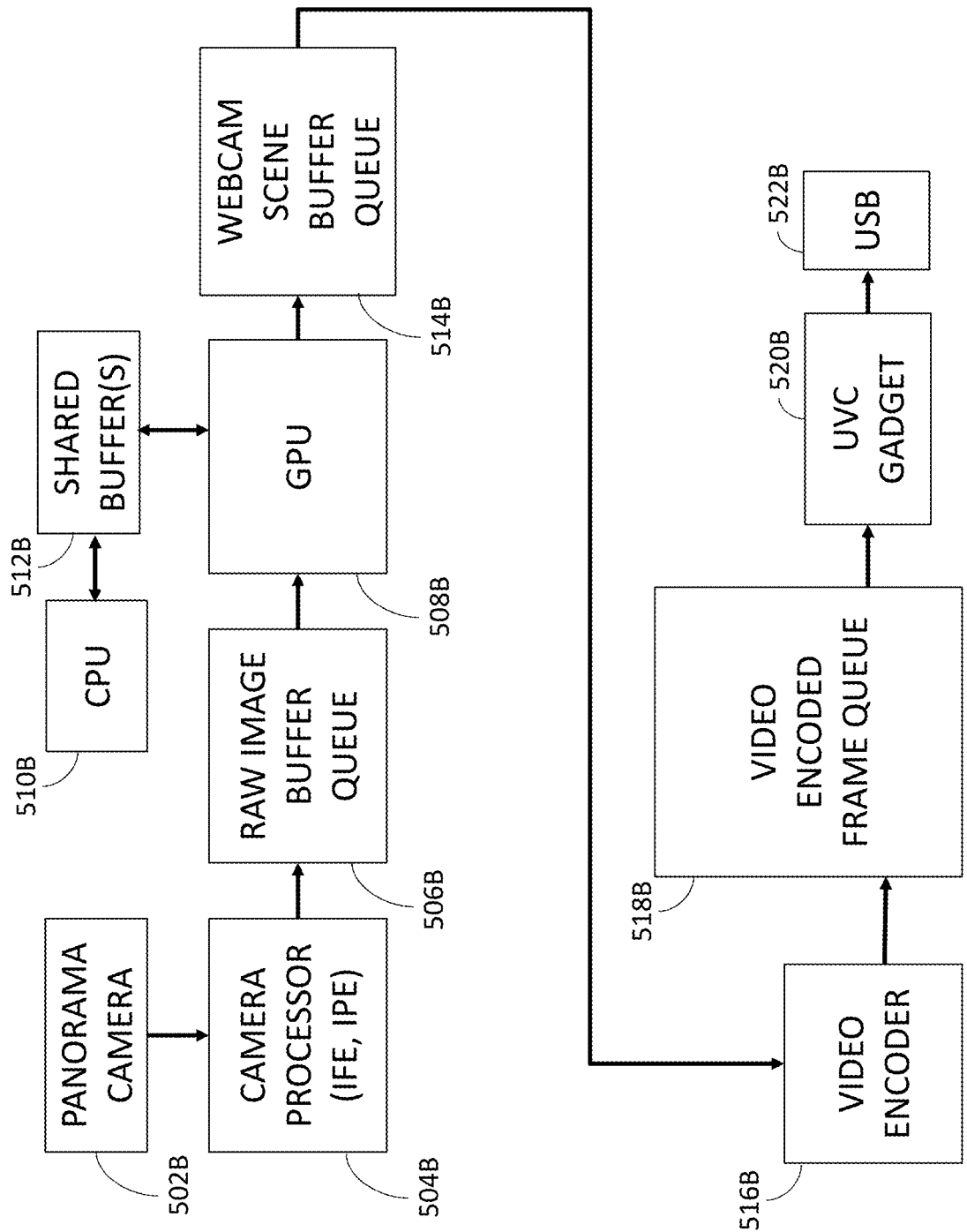

FIG. 5B shows an exemplary block diagram depicting a video pipeline of a meeting camera 100 (e.g., shown in FIGS. 1A-1D) with various components for configuring the meeting camera 100 to perform a lone/solitary role as described herein. For example, the lone/solitary role can be a configuration in the meeting camera 100 as shown in FIGS. 1A and 1B that functions as a standalone device configured to function on its own without co-operating with other meeting cameras. For example, the meeting camera 100 in a lone/solitary role can be configured to not receive audio/video data from other meeting cameras. In another example, the meeting camera 100 in a lone/solitary role can be configured to not send its audio/video data to other meeting cameras, for example, with a primary role. In some embodiments, the meeting camera 100 in a lone/solitary role in FIG. 5B can include the same or similar components and functions shown in FIG. 5A, but may not include or use the components and functions to send or receive audio/video data from other meeting cameras for co-operation. For example, the meeting camera 100 in a lone/solitary role can include a panorama camera 502B, a camera processor 504B, a raw image buffer queue 506B, GPU 508B, CPU 510B, shared buffer(s) 512B, a webcam scene buffer queue 514B, a video encoder 516B, a video encoded frame queue 518B, UVC gadget 520B, and USB 522B with the same or similar functions as those in FIG. 5A. In some embodiments, the meeting camera 100 in a lone/solitary role can be connected to a host PC 40 via USB 522B to provide a composited video signal CO. In some embodiments, the meeting camera 100 in a lone/solitary role may not include or use wireless connections for sending/receiving audio/video data to/from other meeting cameras for co-operation, and a video for decoding video data that may not be received from other meeting cameras.

Figure 5C:
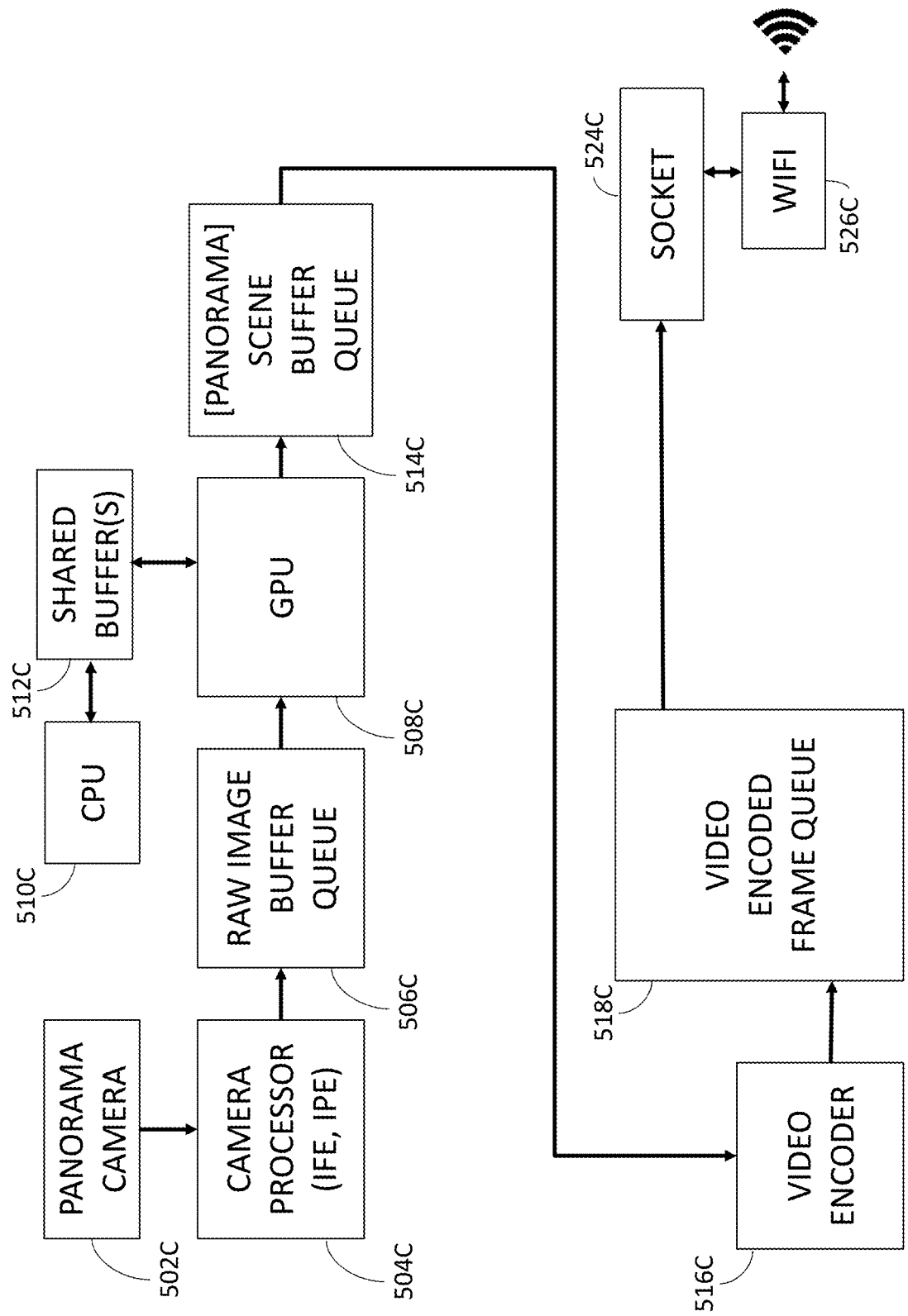
Figure 5D:
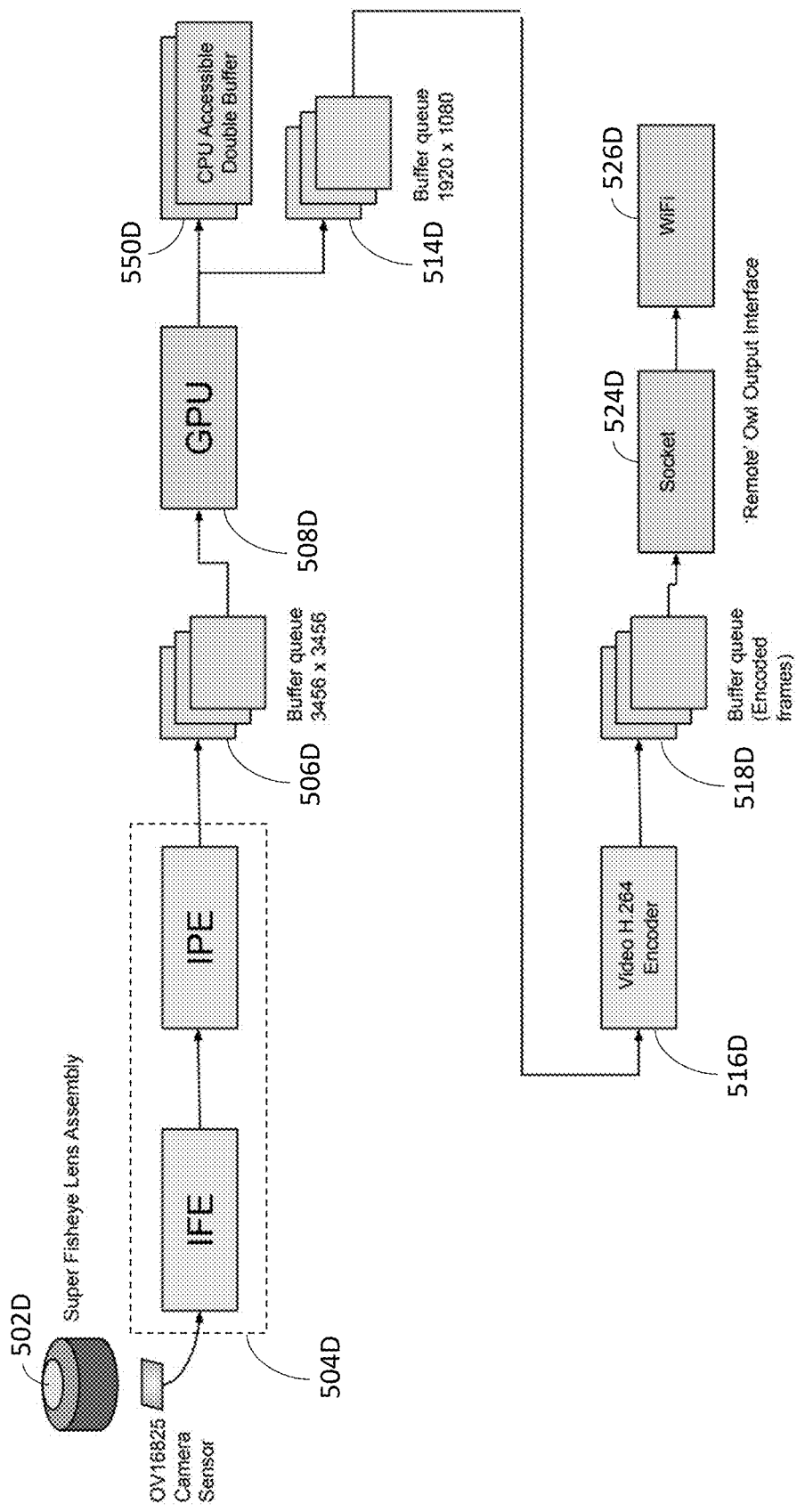

FIGS. 5C and 5D show block diagrams schematically depicting a video pipeline of a secondary role meeting camera. For example, the meeting camera 100 with a secondary or remote role as shown in FIG. 5C or 5D can include the same or similar components and functions shown in FIG. 5A, but may not have a USB connection to a host computer 40 (e.g., because the meeting camera 100 with a secondary or remote role may not need to send a composited video signal CO). For example, the meeting camera 100 with a secondary or remote role can be configured to stream audio and/or video data to a primary meeting camera via a UDP socket on a peer-to-peer WiFi network interface (or via other wired or wireless connections). In other embodiments, the meeting camera 100 with a secondary or remote role is identical to the meeting camera performing the primary role, but certain components (e.g., the USB port) are not used.

In some embodiments, as shown in FIG. 5C, the meeting camera 100 with a secondary or remote role can include a panorama camera 502C, a camera processor 504C, a raw image buffer queue 506C, GPU 508C, CPU 510C, shared buffer(s) 512C, a panorama scene buffer queue 514C, a video encoder 516C, a video encoded frame queue 518C, a socket 524C, and WiFi 526C with the same or similar functions as those in FIG. 5A. In some embodiments, the meeting camera 100 with a secondary or remote role can be configured not to composite a webcam video signal CO, and send an (e.g., uncomposited) encoded panorama view to a primary meeting camera using the WiFi 526C.

In some embodiments, as shown in FIG. 5D, the meeting camera 100 with a secondary or remote role can include a panorama camera 502D (e.g., "super fisheye lens assembly" with a camera sensor such as OmniVision's OV16825 CameraChip™ Sensor), a camera processor 504D including IFE and IPE, a raw image buffer queue 506D (e.g., for buffering 3456×3456 pixel images), GPU 508D, a panorama scene buffer queue 514D (e.g., for buffering 1980×1080 panorama images), a video encoder 516D, a video encoded frame queue 518D, a socket 524D, and WiFi 526D with the same or similar functions as those in FIG. 5A. In addition, the meeting camera as shown in FIG. 5D can, for example, include a CPU accessible double buffer 550D. In some embodiments, the meeting camera 100 with a secondary or remote role can include a network interface (e.g., a socket 524D and WiFi 526D) to send an encoded panorama view to a primary meeting camera over a wireless WiFi network.

Figure 5E:
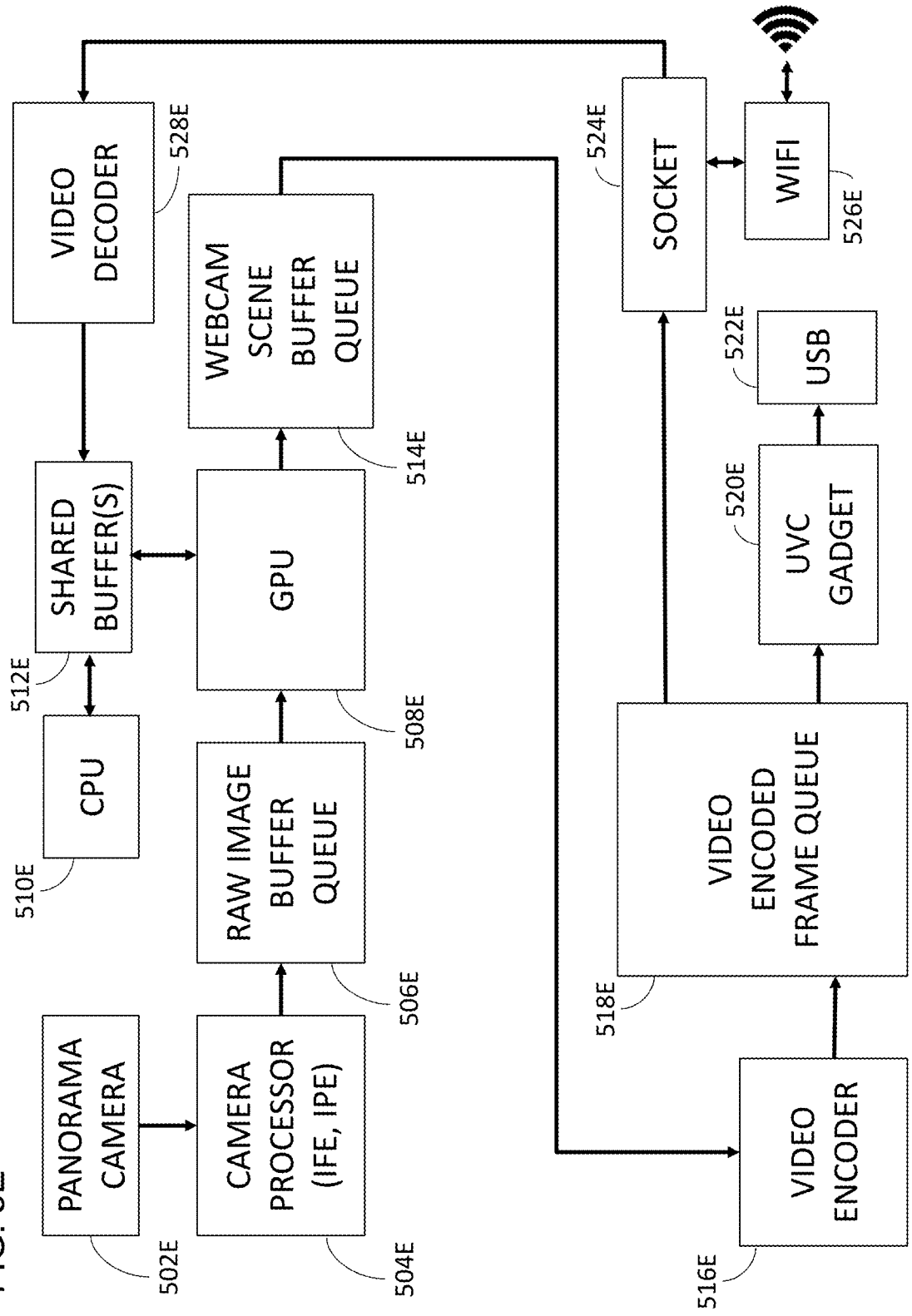
Figure 5F:
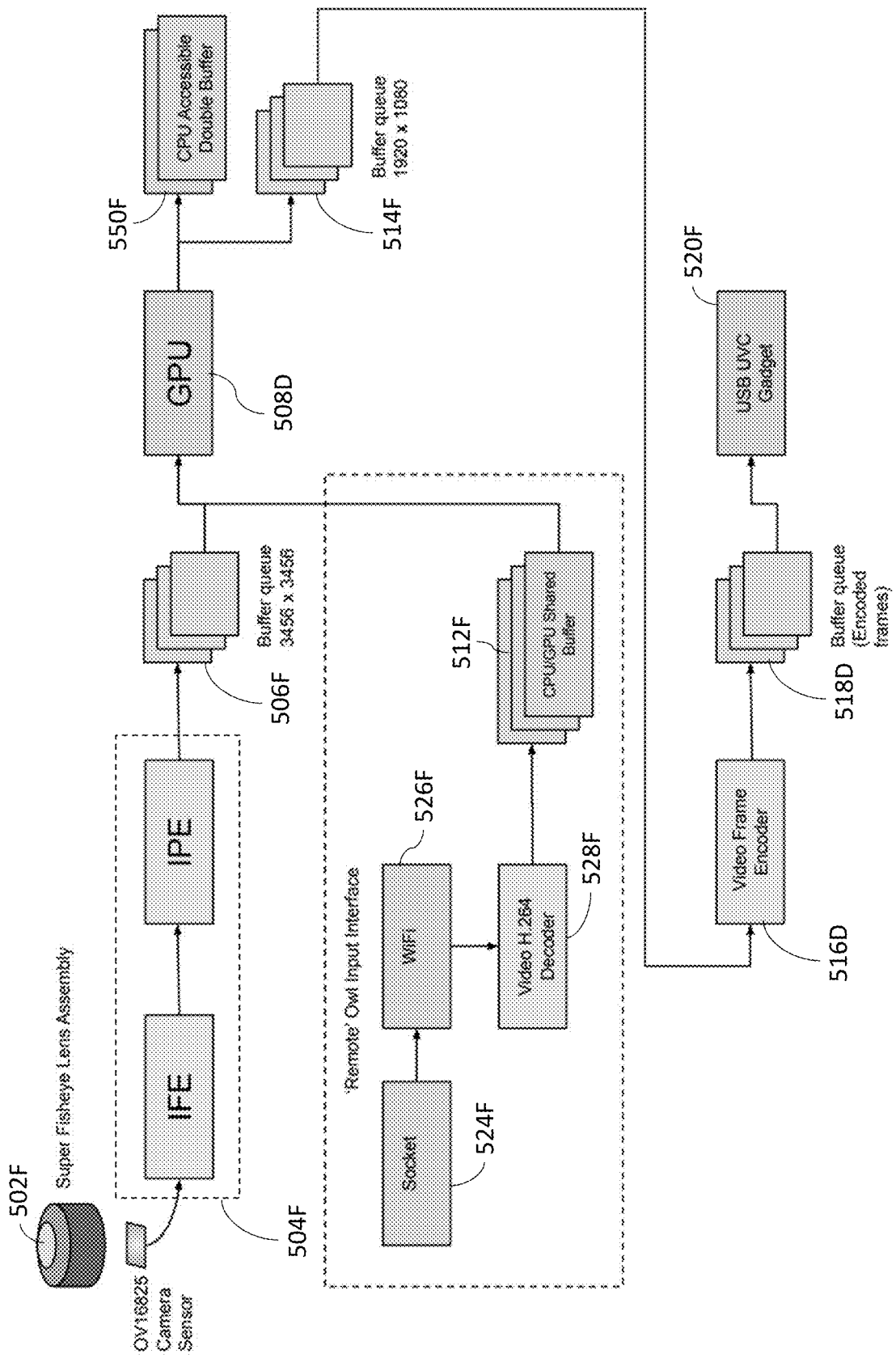

FIGS. 5E and 5F are block diagrams schematically depicting a video pipeline of a primary role meeting camera. For example, the meeting camera 100 with a primary role as shown in FIG. 5E or 5F can include the same or similar components and functions shown in FIG. 5A. For example, the meeting camera 100 in a primary role can be configured to receive audio and/or video data from secondary device(s) (e.g., as shown in FIGS. 5C and 5D) through a socket 524E on a WiFi network 526E. For example, the meeting camera 100 in a primary role can be configured to select and process the audio and video data from the secondary device(s) to generate a composited video signal CO for output through a USB connection to a host computer 40, or it can be a standalone unit (as shown in FIG. 1B) that can directly output the composited video signal CO to the internet 60.

In some embodiments, as shown FIG. 5E, the meeting camera 100 with a primary role can include a panorama camera 502E, a camera processor 504E, a raw image buffer queue 506E, GPU 508E, CPU 510E, shared buffer(s) 512E, a panorama scene buffer queue 514E, a video encoder 516E, a video decoder 528E, a video encoded frame queue 518E, a UVC gadget 520E, USB 522E, a socket 524E, and WiFi 526E with the same or similar functions as those in FIG. 5A. In some embodiments, the meeting camera 100 with a primary role can be configured to receive an encoded panorama view from the secondary device(s) via WiFi 526C. For example, the encoded panorama view from the secondary device(s) can be decoded by a video decoder 528E for processing by CPU 510E and/or GPU 508E as described herein.

In some embodiments, as shown FIG. 5F, the meeting camera 100 with a primary role can include a panorama camera 502F (e.g., "super fisheye lens assembly" with a camera sensor such as OmniVision's OV16825 CameraChip™ Sensor), a camera processor 504F including IFE and IPE, a raw image buffer queue 506F (e.g., for buffering 3456×3456 pixel images), GPU 508F, CPU/GPU shared buffer(s) 512E, a panorama scene buffer queue 514F (e.g., for buffering 1980×1080 panorama images), a video encoder 516F, a video decoder 528F, a video encoded frame queue 518F, a USB UVC gadget 520F, a socket 524F, and WiFi 526F with the same or similar functions as those in FIG. 5A. In addition, the meeting camera as shown in FIG. 5F can, for example, include a CPU accessible double buffer 550F. In some embodiments, the meeting camera 100 with a primary role can include an input interface (e.g., a socket 524F, WiFi 526F, a video decoder 528F, and CPU/GPU 512F) to receive an encoded panorama view from the secondary device(s). For example, the encoded panorama view from the secondary device(s) can be received via WiFi 526F and can be decoded by a video decoder 528E for processing by CPU 510E and/or GPU 508E as described herein.

Figure 5G:
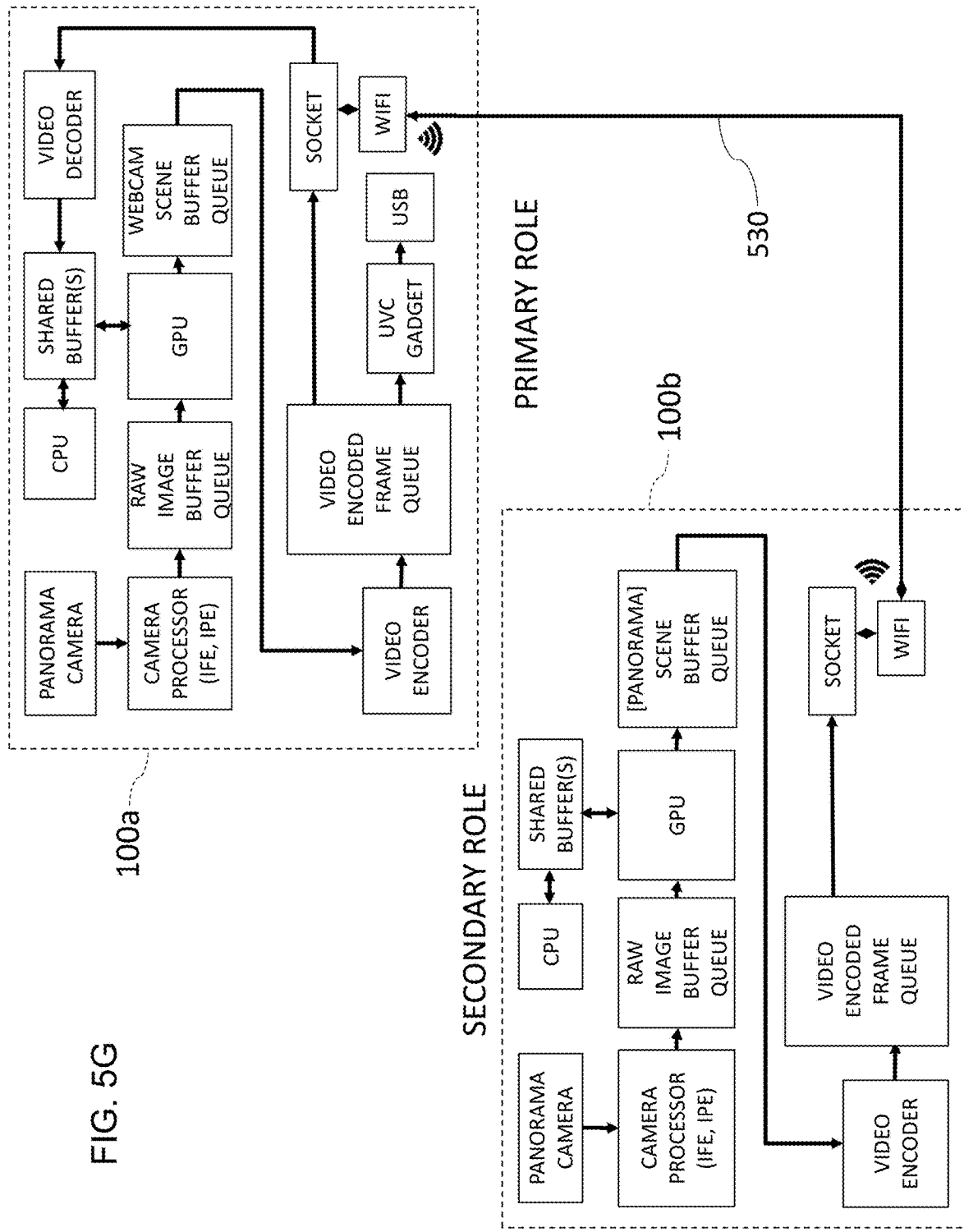

FIG. 5G shows a block diagram schematically depicting a video pipeline of a primary role video camera 100a and a secondary role video camera 100b that are paired and co-operating. For example, the primary role video camera 100a and the secondary role video camera 100b can be connected by a WiFi connection 530 to exchange information. The primary role video camera 100a as shown in FIG. 5G can include the same or similar components and functions shown in FIGS. 5E and 5F. The secondary role video camera 100b as shown in FIG. 5G can include the same or similar components and functions shown in FIGS. 5C and 5D.

Pairing

In some embodiments, before the primary and secondary role meeting cameras (e.g., meeting cameras 100a and 100b in FIGS. 1C and 5C-5G) can co-operate, the two meeting cameras can be paired, for example, to provide them with their respective identities and at least one wireless connection (or wired connection) over which they can exchange information (e.g., WiFi connection 530 in FIG. 5G).

In some embodiments, one meeting camera 100 can be paired with another (or a subsequent one with the first) via a Bluetooth connection shared with, for example, a PC or mobile device. For example, an application on a host PC 40 or mobile device 70 provided with Bluetooth access may identify each unit and issue a pairing command. Once the units are paired in this manner, WiFi connection credentials may be exchanged between the two meeting cameras over a securely encrypted channel to establish a peer-to-peer WiFi connection. For example, this process can create a password protected peer-to-peer connection for subsequent communications between the meeting cameras. This channel can be monitored to make sure the channel's performance meets requirements, and is re-established per the techniques described herein when broken.

In some embodiments, within or under the Wi-Fi Direct/P2P protocol, a "switchboard" protocol may allow various devices to broadcast data (JSON or binary), over a connection oriented protocol, e.g., a TCP connection, to each other.

In some embodiments, within the network, one device can assume a primary role and the other a secondary role. In Wi-Fi P2P terminology, the primary role meeting camera may be a Group Owner and the secondary role meeting camera may be a client or a station (STA). In some embodiments, the network subsystem operating upon each device may receive commands via the "switchboard" protocol that inform the primary device, or each device, when and how to pair (or unpair) the two or more devices. For example, a 'CONNECT' command may specify, for example, what roles each device can assume, which device should the secondary role device connect to (e.g., using the primary's MAC address), and a randomly-generate WPS PIN that both devices will use to establish connectivity. In some embodiments, the primary role device, as a Group Owner, may use this PIN to create a persistent Wi-Fi P2P Group and the secondary role device may use the same PIN to connect to this newly-created persistent Wi-Fi P2P Group. In some embodiments, once the group is established, both devices may store credentials that can be used at a later time to re-establish the group without a WPS PIN. Each device, also, may store some meta data about the paired, other device, such as MAC address, IP address, role, and/or serial No.

In one example, a low level Wi-Fi Direct protocol may be handled by Android's 'wpa_supplicant' daemon that can interface with the Android's Wi-Fi stack, and the device network subsystem may use 'wpa_cli' command-line utility to issue commands to 'wpa_supplicant'.

In some embodiments, once a Wi-Fi P2P Group is established, the paired and communicating devices may open a "switchboard" protocol connection to each other. This connection allows them to send and receive various commands For example, a subsystem may use a "switchboard" command to cause a peer meeting camera system to "blink" (e.g., flash LEDs externally visible upon the so-commanded meeting camera), and the commanding meeting camera can confirm the presence of the other meeting camera in its camera view (e.g., panoramic view) or sensor's image. In some embodiments, the meeting cameras can be configured to command one another to begin sending audio & video frames via UDP. In one example, the secondary role camera may send (via WiFi) H264 encoded video frames that are encoded from the images produced by the image sensor. The secondary role camera may also send audio samples that have been captured by its microphones.

In some embodiments, the primary role camera can be configured to send audio frames to the secondary role camera. For example, the primary role camera can send the audio frames that are copies of the frames that the primary role meeting camera plays through its speaker, which can be used for localization and/or checking microphone reception quality or speaker reproduction quality. For example. each individual stream may be sent over a separate UDP port. In this AV streaming, each meeting camera can be configured to send data as soon as possible to avoid synchronization, which can be beneficial for each stage during streaming (encoding, packetization, etc.).

Jitter Amelioration

In some embodiments, video frames are split up into packets of 1470 bytes and contain meta data that enables the primary meeting camera to monitor for lost or delayed packets and/or video frames. Exemplary meta data would be timestamps (e.g., actually used, projected, or planned) and/or packet or frame sequence numbers (e.g., actually used, projected, or planned). Using this metadata, the primary meeting camera can repeatedly, continuously, and/or independently check and track video packet jitter (e.g., including non-sequential frame arrival or loss), while using a different method to track audio frames' jitter. "Jitter," herein, may be a value reflecting a measurement of non-sequential frame arrival and/or frame loss.

In some embodiments, if jitter for either audio or video stream becomes greater than a predetermined threshold representative of poor connectivity), the primary meeting camera may trigger a WiFi channel change that can move both devices (e.g., the primary and the secondary meeting cameras) to a different Wi-Fi channel frequency as an attempt to provide for better connectivity quality. For example, if more than WiFi modality (e.g., 2.4 and 5.0 GHz) are enabled, then channels in both frequency bands may be attempted.

In some embodiments, in one frequency band, more than 7, or among two frequency bands more than 10 channels may be attempted. In some embodiments, if all channels, or all channels deemed suitable, have been tried and connectivity does not improve, the list of channels can be sorted by jitter value, from the least to most, and the jitter thresholds can be increased. In some embodiments, communications may continue without triggering frequency hopping, using the least jitter-prone channel (or hopping only among the lowest few channels). In some embodiments, when a new higher threshold is exceeded, a frequency hopping over all the channels or only a subset of low jitter channels can be configured to begin again.

In some embodiments, once both (or more than two) devices store credentials for the established P2P group and/or meta data about each other, the devices can use the credentials to re-connect without user intervention based upon a timer or detected loss of connection or power-cycling event. For example, should either of two previously paired tabletop 360 cameras be power-cycled at any time, including during streaming, and the P2P Group will be re-established without user intervention. In some embodiments, streaming may be resumed as needed, for example, if the secondary unit was power cycled but the primary role unit remained in a meeting.

Establishing Co-Location

FIG. 5H shows an exemplary process for the two paired meeting cameras to determine their relative location and/or pose using computer vision according. For example, each meeting camera can be configured to send a command (e.g., over wireless peer-to-peer or pairing channel) to the other to flash LEDs in a recognizable manner. In some embodiments, the LEDs can be in a known location upon the housing of each meeting camera, and the meeting camera can analyze the captured panorama view to detect the LEDs and obtain a bearing. In some embodiments, range between the two paired meeting cameras can be obtained according to any available triangulation methods, for example, known distance between any two LEDs, known scale of an LED cover lens, etc. In some embodiments, relative orientation can be provided by having the meeting cameras communicate each camera's relative bearing to one another. In some embodiments, a computer vision model can be implemented to configure the meeting cameras to recognizes features of the other meeting camera's housing texture shape, color, and/or lighting.

In step S5-2, the two paired meeting cameras (e.g., meeting cameras 100a and 100b in FIGS. 1C and 5G) are placed in a line of sight from each other. In some embodiments, the two paired meeting cameras 100a and 100b can be placed about 3 to 8 feet apart from each other without an obstacle blocking the line of sight from each other.

In step S5-4, the first meeting camera 100a can be configured to send a command to the second meeting camera 100b to turn on its LED(s). In some embodiments, the first meeting camera 100a can be configured to send other commands such as a command to generate a certain sound (e.g., beep), etc.

In step S5-6, the second meeting camera 100b can receive the command from the first meeting camera 100b and flash LED(s). In some embodiments, the second meeting camera 100b can send a message to the first meeting camera 100a acknowledging the receipt of the command, and/or a message indicating that the LED(s) are turned on (e.g., flashing).

In step S5-8, the first meeting camera 100a can use the wide camera 2, 3, 5 (e.g., 360-degree camera) to capture one or more panoramic images of its surrounding. The first meeting camera 100a can analyze the panoramic images to find the LEDs. For example, the first meeting camera 100a can compare the panoramic images with LED(s) on and LED(s) off to detect the bright spots. In some embodiments, the first meeting camera 100a can detect bright spots from other sources (e.g., lamp, sun light, ceiling light, flat-panel display FP, etc.), and in such cases, the meeting camera 100a can be configured to perform one or more iterations of the steps S5-4 to S5-8 to converge on the bright spots that correspond to the second meeting camera's LED(s). For example, if the first meeting camera's command is to flash two LEDs on the second meeting camera, the first meeting camera can be configured to run the process until it converges and finds the two bright spots in the captured panoramic images. In some embodiments, if the first meeting camera 100a cannot converge the process after a certain predetermined number of iterations (e.g., cannot find or reduce the number of the bright spots in the panoramic images to the ones that correspond to the second meeting camera's LED(s)), the meeting camera 100a can proceed to step S5-10.

In step S5-10, the first meeting camera 100a can be configured to adjust the camera's exposure and/or light balance settings. For example, the first meeting camera 100a can be configured to automatically balance for the light from other sources (e.g., lamp, sun light, ceiling light, flat-panel display FP, etc.). For example, if the meeting cameras are placed near a window and sun light is exposed to the meeting cameras, the first meeting camera 100a can perform an automatic white balance to adjust for the light from the window. In some embodiments, the first meeting camera 100a can be configured to change the camera's exposure. After adjusting the camera's exposure and/or light balance settings in step S5-10, the meeting camera 100a can return to step S5-4 and repeat the steps S5-4 to S5-10 until the process can converge on the bright spots that correspond to the second meeting camera's LED(s).

In step S5-12, the first meeting camera 100a can calculate the bearing (e.g., direction) of the second meeting camera 100b based on the detected LED spot(s). In some embodiments, when the first meeting camera 100a calculates the bearing of the second meeting camera 100b, the process can proceed to steps S5-14 to S5-22.

In steps S5-14 to S5-22, the second meeting camera 100b can be configured to perform the similar or analogous steps to calculate the bearing of the first meeting camera 100a.

In some embodiments, when the meeting cameras 100a and 100b calculate the bearings of each other, this can be used for establishing a common coordinate system between the two meeting cameras.

In some embodiments, in establishing a common coordinate system, the secondary role camera can be designated to be at 180 degrees in the primary role camera's field of view, while the primary role camera can be designated to be at 0 degrees in the secondary role camera's field of view. In some embodiments, the panorama view sent by the primary role camera over USB or other connections (e.g., composited webcam video signal CO) can be displayed in the common coordinate system.

In some embodiments, in order to verify physical co-location for security from eavesdropping, the paired units may be set to remain paired only so long as they maintain a line of sight to one another (e.g., again checked by illuminated lights or a computer vision model). In other embodiments, the meeting cameras can be configured to send audio or RF signals to verify physical co-location of each other.

In some embodiments, in order to initiate streaming using the available WiFi channel, addressing, and transport, the secondary role unit may not form subscenes or select areas of interest, but may defer this to the primary role unit, which will have both panorama views (e.g., from the meeting cameras 100a and 100b) available to it. In one example, as shown in FIGS. 5C and 5D, the secondary unit may "unroll" a high resolution panorama for transmission of each frame. For example, the CPU and/or GPU may extract, dewarp, and transform from a 4K (e.g., 3456 pixels square) image sensor, a panorama view of 3840×540 that can include the perimeter 75 degrees of a super-fisheye lens view. In some embodiments, the secondary unit can be configured to convert the panorama view of 3840×540 into a 1920×1080 image, e.g., two stacked up 1920×540 images, the top half containing 180 degrees×75 degrees of panorama, and the lower half containing the remaining 180 degrees×75 degrees of panorama. In some embodiments, this formatted 1920×1080 frame can be encoded and compressed by an H.264 encoder. In some embodiments, the secondary unit may also provide audio data from, e.g., 8 microphones, preprocessed into a single channel stream of 48 KHz 16-bit samples.

Attention Systems

Figure 6B:
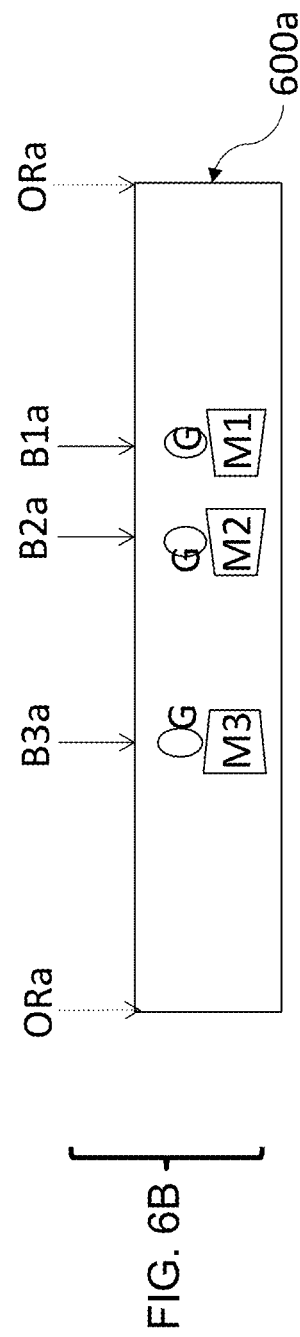
Figure 6C:
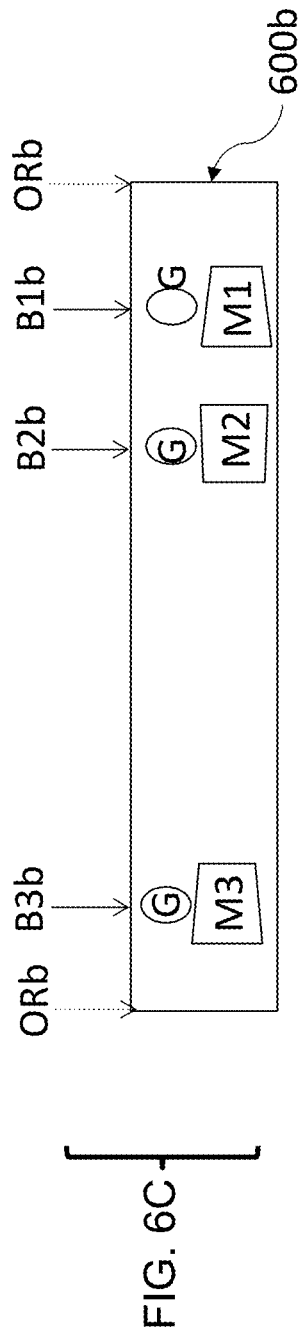

FIGS. 6A-6C show exemplary top down view of using two meeting cameras 100a and 100b, and a panorama image signal according to aspects of the disclosed subject matter. In some embodiments, as shown in FIG. 6A, when two separated meeting camera units are available from which to select portrait subject views of meeting attendees to crop and render as subscenes upon the stage, the two meeting cameras can obtain two views of the same attendee (e.g., one view from each meeting camera), and each of the two views can have a different head pose or gaze for the attendee. For example, the meeting camera 100a in FIG. 6A can capture and generate a panorama view 600a in FIG. 6B showing the three meeting attendees M1, M2, and M3, which the attendees' gazes are shown by "G." Similarly, the meeting camera 100b in FIG. 6A can capture and generate a different panorama view 600b in FIG. 6C showing the same meeting attendees M1, M2, and M3, but the panorama view 600b can capture a different head pose or gaze of M1, M2, and M3, again with gaze shown by "G." In some embodiments, it can be preferable to present only one of the two available views with the face-on view to the stage. In other embodiments, one of the two available view with the profile view (e.g., a side view of the attendee's face or head) can be presented to the stage. In other embodiments, both of the two available view can be presented to the stage. Gaze direction can be determined using techniques known to those of ordinary skill in the art.

FIG. 6A shows an exemplary top down view of using two meeting cameras 100a and 100b that are placed on a long conference table CT. In some embodiments, the meeting camera 100*a*, which is placed near a wall-mounted videoconferencing display FP, can be configured to perform the primary role, and the meeting camera 100*b*, which is placed further away from the FP, can be configured to perform the secondary role. In other embodiments, the meeting camera 100*b* can be configured to perform the primary role, and the meeting camera 100*a* can be configured to perform the secondary role. The meeting cameras' primary and secondary roles may switch depending on various conditions. For example, a user can configure one particular meeting camera to perform the primary role. For example, as shown in FIG. 1C, the meeting camera (e.g., 100*a*) that is connected to the host computer 40 can be configured to perform the primary role, and other meeting cameras (e.g., 100*b*) can be configured to perform the secondary role(s).

FIG. 6A shows three meeting participants labeled as subjects M1, M2, and M3. Each subject has a letter "G" near the head indicating the direction of the subject's head turn and/or gaze. The subject M1, for example, can be looking at a remote participant upon the wall-mounted videoconferencing display FP. As shown in FIGS. 6B and 6C, the meeting camera 100*a*'s view B1*a* can capture a nearly face-on view (e.g., referencing the gaze "G") of subject M1 (e.g., M1 in FIG. 6B), while the meeting camera 100*b*'s view B1*b* can capture a side of subject M1's head (e.g., M1 in FIG. 6C). The subject M2, for example, can be looking at a laptop screen in front of him, or the meeting camera 100*b*. As shown in FIGS. 6B and 6C, the meeting camera 100*a*'s view B2*a* can capture a side view of subject M2 (e.g., M2 in FIG. 6B), while the meeting camera 100*b*'s view B2*b* can capture a nearly face-on view M2 (e.g., M2 in FIG. 6C). The subject M3, for example, can be looking at the subject M2. As shown in FIGS. 6B and 6C, the meeting camera 100*a*'s view B3*a* can capture a side view of subject M3 (e.g., M3 in FIG. 6B), while the meeting camera 100*b*'s view B3*b* can capture a nearly face-on view M3 (e.g., M3 in FIG. 6C).

In some embodiments, as shown in FIGS. 7A-7C, the meeting camera 100*a* can be configured to perform the primary role, for example, by compositing the webcam video signal CO for a host computer 40, remote clients 50, etc. For example, as shown in FIGS. 7A-7B, the meeting camera 100*a* can be configured to communicate with the meeting camera 100*b* and composite the webcam video signal CO by determining which subject is to be shown (e.g., a meeting participant who is speaking), and determining the most face-on view available from the two meeting cameras 100*a* and 100*b* for the stage view. In another example, as shown in FIG. 7C, the meeting camera 100*a* can be connected to a local mobile device 70 (e.g., via Bluetooth or other connections describe herein) and composite the webcam video signal CO based on instructions from the local mobile device 70 (e.g., regarding the designated view DV).

In some embodiments, as shown in FIGS. 7A-7C, the primary meeting camera 100*a* can be configured to show the panorama view captured by the primary meeting camera 100*a* for the panorama ribbon view (e.g., 706A-C) of the composited webcam signal CO. In some embodiments, the primary meeting camera 100*a* can be configured to show the panorama view captured by the secondary meeting camera 100*b* for the panorama ribbon view. In some embodiments, the primary meeting camera 100*a* can be configured to select the panorama view depending of the gaze angle of the people, relative size of the people, and/or the size of the flat-panel FP that are captured in the panorama views by the two meeting cameras. For example, the primary meeting camera 100*a* can be configured to composite the webcam video signal CO's panorama ribbon view (e.g., 706A-C) by selecting the panorama view showing the meeting participants to have similar sizes. In another example, the primary meeting camera 100*a* can be configured to composite the webcam video signal CO's panorama ribbon view (e.g., 706A-C) by selecting the panorama view that can display the highest number of face-on views of the meeting participants. In another example, the primary meeting camera 100*a* can be configured to composite the webcam video signal CO's panorama ribbon view (e.g., 706A-C) by selecting the panorama view that can display the flat-panel display FP (or other monitors in the meeting room) with the smallest size (or with the largest size).

In other embodiments, the primary meeting camera 100*a* can be configured to composite the webcam video signal CO's panorama ribbon view to show more than one panorama views. For example, the primary meeting camera 100*a* can composite the webcam video signal CO's panorama ribbon view to display the primary meeting camera 100*a*'s panorama view with a horizontal field of view of 180 degrees or greater (e.g., 180-360 degrees), and the secondary meeting camera 100*b*'s panorama view with a horizontal field of view of 180 degrees or greater (e.g., 180-360 degrees).

FIG. 7A shows the two meeting cameras 100*a* and 100*b* capturing two views of the meeting participants M1, M2, and M3 (e.g., one view from each meeting camera). In some embodiments, the two meeting cameras 100*a* and 100*b* can be configured to capture the audio sound and the direction of the audio sound in the meeting room. For example, FIG. 7A shows that the meeting participant M1 is a speaker SPKR who is speaking at a given moment, and audio sound generated by M1 (or by other meeting participants) can be captured by a microphone array 4 in the meeting cameras 100*a* and 100*b*. In some embodiments, the meeting cameras 100*a* and 100*b* can analyze the audio sound captured by the microphone sensor array 4 to determine M1's direction and that M1 is a speaker SPKR (or any other meeting participants who are speaking). In some embodiments, the meeting cameras 100*a* and 100*b* can also analyze the audio sound captured by the microphone array 4 to determine the bearing and the distance of M1 from each meeting camera. In some embodiments, as shown in FIGS. 6A-6C, the meeting camera 100*a* can be configured to capture and generate a panorama view 600*a* showing the meeting participants M1, M2, and M3. Similarly, the meeting camera 100*b* can be configured to capture and generate a different panorama view 600*b* showing the same meeting participants M1, M2, and M3, which can show different head poses or gazes of M1, M2, and M3. In some embodiments, as shown in FIG. 7A, the meeting camera 100*a* can be configured to composite and send the webcam video signal CO, which can be received and displayed, for example, by a host computer 40, remote client 50, etc. For example, the meeting camera 100*a* (e.g., based on communicating with the meeting camera 100*b*) can be configured to composite the webcam signal CO comprising the panorama view 600*a* (e.g., as shown in FIG. 6B) captured by the meeting camera 100*a* and a stage view with sub-scenes of meeting participants (e.g., based on analyzing and selecting relevant portion(s) of one of the two available views of the meeting participants as captured in 600*a* and 600*b*).

In some embodiments, as shown in FIG. 7A, the meeting camera 100*a* can be configured to detect that M1 is a speaker SPKR who is speaking at a given moment (e.g., based on the audio captured by a microphone array 4 in the meeting cameras 100*a* and 100*b*) and composite the webcam signal CO to include the speaker's face-on view (e.g., M1's face-on view) in the stage view. For example, the meeting camera 100a can analyze the two panorama views 600a and 600b captured by the meeting cameras 100a and 100b, respectively, and determine that the panorama view 600a includes the speaker's face-on view (e.g., M1's face-on view B1a), whereas the panorama view 600b includes the speaker's profile view (e.g., M1's side view B1b). For example, the meeting camera 100a can composite the webcam signal CO by cropping and/or rendering the panorama view 600a to show the speaker's face-on view (e.g., M1's face-on view) as the stage view's subscene. In some embodiments, the webcam video signal CO in FIG. 7A can generate a composited video 704A, which can be displayed, for example, by a host computer 40, remote client 50, etc. For example, the composited video 704A as shown in FIG. 7A can show the panorama ribbon 706A by displaying the panorama view 600a captured and generated by the meeting camera 100a, and the stage view 708A with M1's face-on view (e.g., by cropping and/or rendering the relevant portions of the panorama view 600a). In other embodiments, the composited video 704A can show the panorama ribbon 706A by displaying the panorama view 600b or by displaying the one or more of the panorama views 600a and 600b. In other embodiments, the composited video 704A can show the stage view with two or more sub-scenes.

FIG. 7B shows the same or similar devices and meeting participants as shown in FIG. 7A, but with a new speaker SPKR. FIG. 7B shows that M2 is now a speaker SPKR, who is speaking at a given moment. For example, the audio sound generated by M2 can be captured by a microphone sensor array 4 in each of the meeting cameras 100a and 100b, and the captured audio sound from M2 can be analyzed to determine M2's direction and that M2 is the new speaker SPKR. In some embodiments, the meeting camera 100a can be configured to composite the webcam video signal CO in response to a new speaker SPKR (e.g., M2). For example, the meeting camera 100a can composite the webcam video signal CO to include the new speaker's face-on view (e.g., M2's face-on view) in the stage view. For example, the meeting camera 100a can analyze the two panorama views 600a and 600b captured by the meeting cameras 100a and 100b, respectively, and determine that the panorama view 600b includes the speaker's face-on view (e.g., M2's face-on view B2b), whereas the panorama view 600a includes the speaker's profile view (e.g., M2's side view B2a). For example, the meeting camera 100a can composite the webcam signal CO by cropping and/or rendering the panorama view 600b to show the speaker's face-on view (e.g., M2's face-on view) as the stage view's subscene. In some embodiments, the webcam video signal CO in FIG. 7B can generate a composited video 704B, which can be displayed, for example, by a host computer 40, remote client 50, etc. For example, the composited video 704B as shown in FIG. 7B can show the panorama ribbon 706B by displaying the panorama view 600a captured and generated by the meeting camera 100a, and the stage view 708B with two sub-scenes showing M2's face-on view (e.g., by cropping and/or rendering the relevant portions of the panorama view 600b) as the sub-scene on the left side of the stage view and M1's face-on view (e.g., by cropping and/or rendering the relevant portions of the panorama view 600a) as the sub-scene on the right side of the stage view. In other embodiments, the composited video 704B can be configured to show the panorama ribbon 706B by displaying the panorama view 600b, or by displaying one or more of the panorama views 600a and 600b. In other embodiments, the composited video 704B can be configured to show the stage view with one sub-scene of the new speaker M2. For example, when the new speaker M2 continues to speak while the other participant remains silent (e.g., M1 remains silent) for a predetermined time period (e.g., 1-30 seconds), the meeting camera 100a may composite the webcam video signal CO to show the stage view with only one sub-scene of the new speaker M2, for example, by removing the sub-scene of M1 who remained silent for a predetermined time period.

FIG. 7C shows the same or similar devices and meeting participants as shown in FIGS. 7A and 7B, but with a mobile device 70 sending a DV-change signal to the meeting cameras. For example, the local mobile device 70 can be connected to one or more meeting cameras 100a and/or 100b via a peripheral interface, e.g., Bluetooth, and may be configured to provide the location or size or change in either location or size "DV-change" of the designated view DV within the panorama views 600a and/or 600b (e.g., captured and generated by the meeting cameras 100a and/or 100b). For example, as shown in FIG. 7C, the local mobile device 70 can be manually designating a certain portion of the participant M1's side view in the panorama view 600b. In response to receiving the signal from the mobile device 70, the meeting camera 100a can be configured to composite the webcam video signal CO, including the designated view DV that shows the participant M1's side view a stage view's sub-scene. In some embodiments, the meeting camera 100a can determine that M2 is a speaker SPKR, and composite the webcam signal CO by cropping and/or rendering the panorama view 600b to show the speaker's face-on view (e.g., M2's face-on view) as the stage view's another subscene. In some embodiments, the webcam video signal CO in FIG. 7C can generate a composited video 704C, which can be displayed, for example, by a host computer 40, remote client 50, etc. For example, the composited video 704C as shown in FIG. 7C can be configured to show the panorama ribbon 706C by displaying the panorama view 600a, and the stage view 708C with two sub-scenes showing M2's face-on view (e.g., by cropping and/or rendering the relevant portions of the panorama view 600b) as the sub-scene on the left side of the stage view and M1's side-view (e.g., based on the signal from the mobile device 70) as the sub-scene on the right side of the stage view. In other embodiments, the composited video 704C can be configured to show the panorama ribbon 706B by displaying the panorama view 600b, or by displaying one or more of the panorama views 600a and 600b. In other embodiments, the composited video 704C can be configured to show the stage view with one sub-scene of the designated view DV.

In some embodiments, in order to identify a preferred choice of view from the two meeting cameras 100a and 100b, each meeting camera can be configured to detect: visual cues such as face location, face height, gaze direction, face or other motion, and/or audio direction (e.g., based on the wide camera 2, 3, 5, and the microphone array 4 as shown in FIGS. 1A-1D). In some embodiments, each meeting camera can be configured to track each detection in its own map data structure.

In some embodiments, a map data structure may be an array of leaky integrators, each representing likelihood or probability that an event occurred recently in a certain location in the meeting room (e.g., a certain location in space surrounding the two meeting cameras 100a and 100b). For example, the maps may be divided into spatial buckets corresponding to the spatial location (e.g., within the view, at an angle, or about the camera) of detected events. In some embodiments, the spatial buckets around a detected event may be incremented with large values upon a detection, with the maps being updated at regular intervals. In some embodiments, as a "leaky integrator," upon each update every bucket can be decremented by a small value in order to maintain recency as one of the factors. In some embodiments, face height and gaze direction can be detected and tracked in 2-D maps.

In some embodiments, for gaze direction, each direction may have an array of possible values, each containing a score. For example, the X axis may be the angle around the 360 degrees of horizontal field of view in the panorama view by a meeting camera (e.g., a tabletop 360-degree camera), while the Y axis may be the gaze direction angle observed for a face at that location (e.g., the angle around the 360 degrees in the panorama view). In some embodiments, after a detection event, an area surrounding the event in the map data structure may be incremented. In some embodiments, the gaze direction may be determined by finding the weighted centroid of a peak that can overlap with a given panorama angle in the score map. In some embodiments, detecting and tracking a combination of features in a map data structure can reduce noises in the signal, provides temporal persistence for events, and accommodates inconsistency in spatial location of events.

In some embodiments, an aggregate map can be implemented by the meeting cameras to accumulate sensor data from the individual sensor maps for each kind of detection. For example, at each update of the aggregate map, a peak finder may identify "instantaneous people" items (e.g., detections that are potentially people), which may be filtered to determine "long term people" items (e.g., detections which form peaks among different detections, and/or which recur, and are more likely people).

Attention System Communication

In some embodiments, in order to communicate attention system detections within the paired systems, the secondary meeting camera can be configured to run a standalone attention system. For example, this system in the secondary meeting camera may stream its attention data to the primary meeting camera over a wired or wireless connection (e.g., in a connection-oriented manner). In some embodiments, the data passed may include audio events, "Long term people" items, face height for each person, gaze direction for each person. For example, the directions may be provided with a panorama offset, which can be based on the angle of the primary meeting camera in the secondary meeting camera's field of view.

In some embodiments, the primary meeting camera may run a modified or blended attention system including content from both cameras in order to select a camera view for cropping and rendering any particular subscene view. For example, data examined may include the primary role camera and secondary role camera audio events, the primary role camera and secondary role camera gaze direction at angles of audio events, and/or the primary role camera and secondary role camera panorama offset directions. In some embodiments, outputs from the primary role camera attention system may include the preferred camera, after latest update, for each or any subscene that is a candidate to be rendered.

In some embodiments, a testing process may be used to test gaze direction preference. For example, as shown in FIGS. 6A-6C and 7A-7C, the gaze direction can be a criterion for camera selection. In some embodiments, the ruleset can be applied as shown in FIG. 6A, with the primary camera 100a placed near any shared videoconferencing monitor (e.g., FP) that is wall or cart mounted and adjacent the table. In some embodiments, if only one meeting camera has determined valid gaze data, and the gaze is oriented toward that camera (e.g., within 30 degrees of a subject-to-camera vector), then that camera may be preferred, chosen, or promoted/incremented for potential selection (e.g., these choices may be alternative embodiments or jointly performed). In some embodiments, if both meeting cameras have determined valid gaze data, and the difference between their subject-to-camera vectors is sufficient (e.g., greater than 20 degrees), the more direct one may be preferable. For example, the camera with the smaller gaze angle may be preferred, chosen, or promoted/incremented for potential selection.

Figure 8:
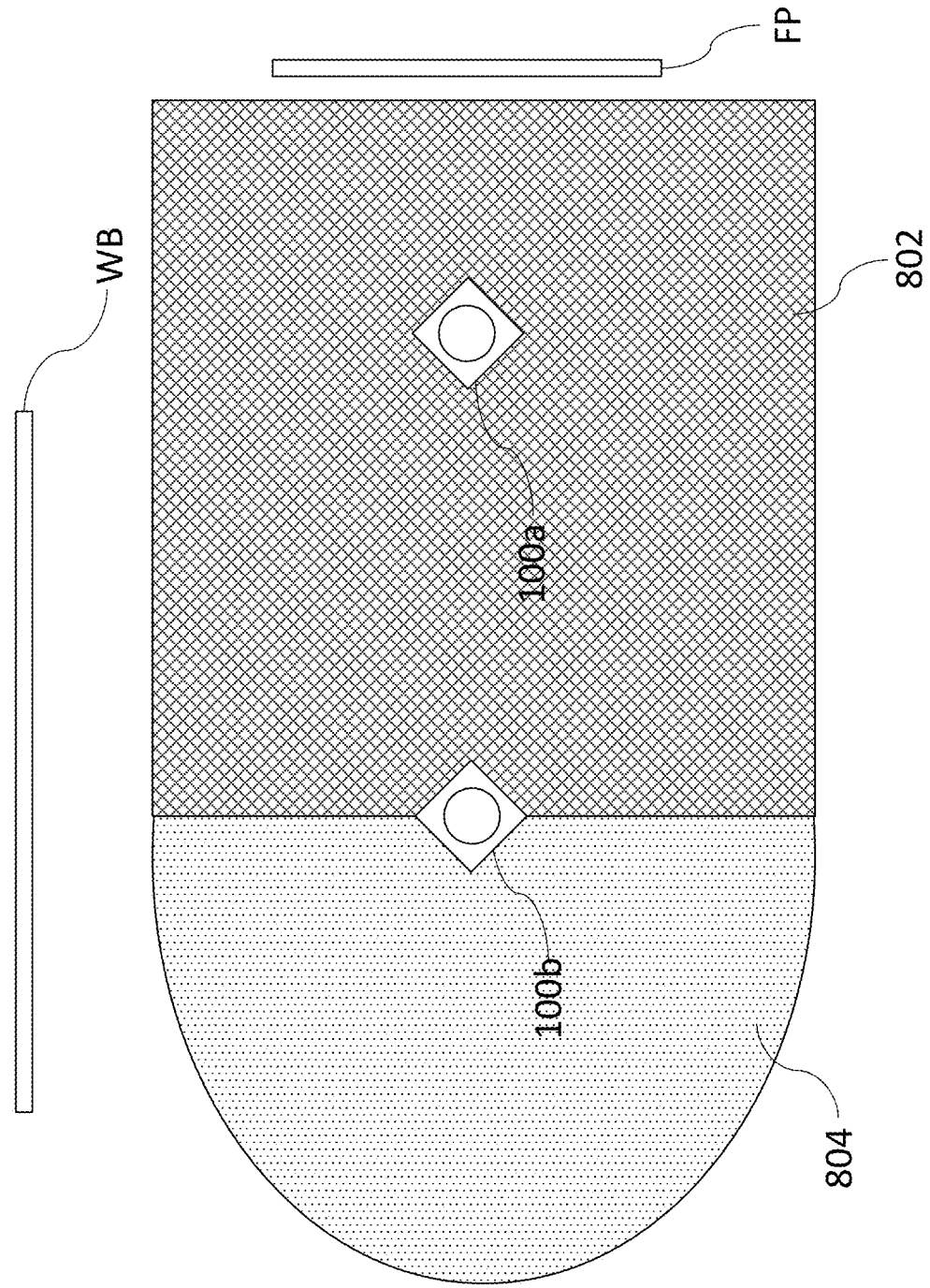
FIG. 8 shows an exemplary top down view of using two meeting cameras with a geometric camera criterion according to aspects of the disclosed subject matter.

In some embodiments, a geometric camera criterion can be used as a factor for final selection of the two or more meeting cameras' panorama views for compositing the video signal CO (e.g., for selecting the panorama ribbon and the stage view's sub-scenes). For example, when no valid gaze angle is available, or no clear preference is determined, or the gaze angle is used to rank potential choices, a geometric camera criterion can be used as a factor for final selection. In some embodiments, the geometric camera criterion implementation can be performed by straight-line angles as shown in FIG. 8, where the secondary camera 100*b* can be used for audio events perceived in region 804, which is on the left side of a 90-270 degree line (e.g., a vertical 180 degree line shown) through the secondary camera 100*b*, and the primary camera 100*a* can be used for audio events perceived in region 802. For example, if a meeting participant M1 is a speaker SPKR and is located in the region 802, the meeting camera can be configured to composite a webcam signal CO by cropping and/or rendering the meeting camera 100*a*' s panorama view to show M1's portrait view in the stage view. In another example, if a meeting participant M2 is a speaker SPKR and is located in the region 804, the primary meeting camera can be configured to composite a webcam signal CO by cropping and/or rendering the secondary meeting camera 100*b*'s panorama view to show M2's portrait view in the stage view.

In some embodiments, a geometric camera criterion can be implemented, such that the secondary meeting camera 100*b* is used for audio events perceived to be substantially farther away from the primary meeting camera 100*a* than the distance from the secondary meeting camera 100*b*. The primary meeting camera 100*a* can be used for other audio events perceived to be closer to the primary meeting camera 100*a* than the distance from the secondary meeting camera 100*b*. In some embodiments, the primary meeting camera 100*a* can be configured to track directions of audio events detected by the primary and the secondary meeting cameras (e.g., as a part of the attention system described here). For example, the primary meeting camera 100*a* can track directions of audio events (e.g., measured by the sensor array 4 in the primary and secondary cameras) in a direction indexed table. In some embodiments, the primary meeting camera 100*a* can consider the direction indexed table for the geometric camera criterion to determine if an audio event is perceived to be closer to the primary meeting camera 100*a* or to the secondary meeting camera 100*b*.

In some embodiments, in order to complete selecting a meeting camera together with a sub-scene (e.g., typically an active speaker), the primary meeting camera can be configured to create an area of interest (AOI) in response to an audio event. For example, the AOI can include a flag indicating which camera should be used in rendering a portrait view, e.g., compositing a subscene of the subject speaker to the stage. As shown in FIG. 7B, if the secondary camera 100*b* is selected, the subscene can be composited or rendered from the high resolution 'stacked' panorama image frame (e.g., the panorama image frame 600b) received from the secondary camera 100b. In some embodiments, the portion selected from the high resolution image from the secondary meeting camera can be corrected for relative offsets of video orientation of each meeting camera relative to the common coordinate system. As shown in FIG. 7A, if the primary camera 100a is selected, the subscene can be composited or rendered from the high resolution 'stacked' panorama image frame (e.g., the panorama image frame 600a) from the primary camera 100a (e.g., captured and generated by the meeting camera 100a's wide camera 2, 3, 5).

In some embodiments, an item correspondence map can be implemented by the meeting cameras to determine that only one camera view of a meeting participant is shown. For example, the item correspondence map can be a 2-D spatial map of space surrounding the meeting camera pair. In some embodiments, the item correspondence map can be tracked, upon each audio event, by configuring the meeting camera's processor to "cast a ray" from each meeting camera perceiving the event toward the audio event, e.g., into the mapped surrounding space. For example, map points near the ray can be incremented, and the map areas where rays converge can lead to peaks. In some embodiments, the processor can use a weighted average peak finder to provide locations of persons or person "blobs" (e.g., as audio event generators) in the 2-D spatial map. In some embodiments, angles from each meeting camera (e.g., with 360-degree camera) to each person blob are used to label "long term people." In some embodiments, one camera can be used for each audio event corresponding to the same blob. In some embodiments, the attention system can be configured to avoid showing the two sub-scenes in the stage view with same person from different points of view (e.g., unless manually designated by a user as shown in FIG. 7C).

Figure 9A:
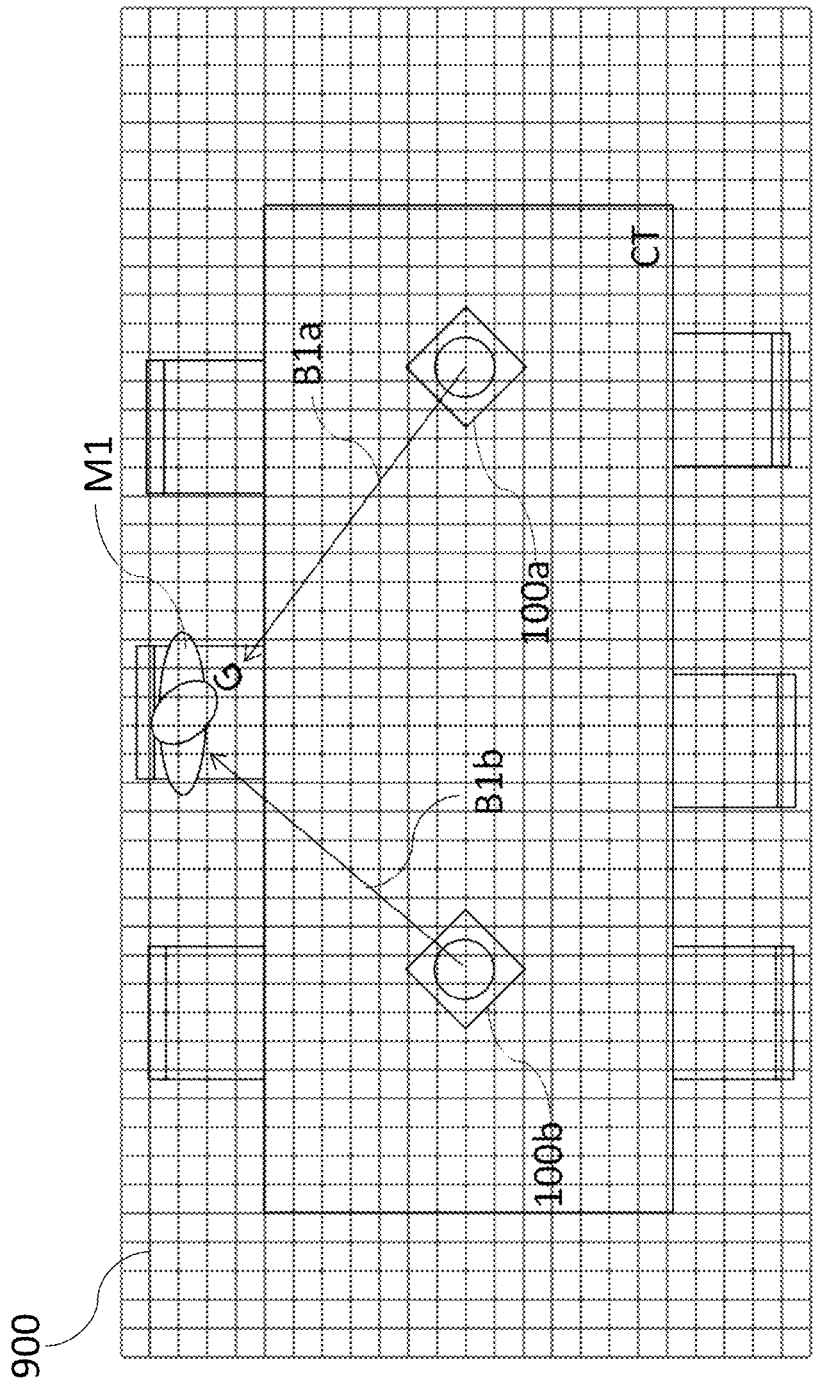

FIG. 9A-9B show an exemplary representation of a 2-D spatial map (e.g., an item correspondence map) of space surrounding the meeting cameras 100a and 100b. FIG. 9A shows a top down view of using two meeting cameras 100a and 100b that are placed on a conference table CT, and a meeting participant M1. FIG. 9A also shows an exemplary 2-D spatial map (e.g., an item correspondence map) represented as a 2-D grid 900. In some embodiments, the meeting cameras 100a and 100b can be configured to detect an event (e.g., audio, motion, etc.) in their surroundings. For example, when the meeting participant M1 generates sound by speaking, the meeting cameras 100a and 100b can be configured to detect that sound and the direction of that sound. In some embodiments, each meeting camera can be configured to "cast a ray" from the meeting camera's view point toward the detected event (e.g., audio sound of M1 speaking). For example, each meeting camera can cast multiple rays depending on the uncertainty of the directionality of the detected event (e.g., angle or bearing of the audio generating source such as M1 speaking from the meeting camera's view point). In some embodiments, the microphone sensor array 4 in the meeting camera 100a or 100b can be configured to detect a direction of the audio generating source (e.g., M1 speaking) within 5 degrees of accuracy. In some embodiments, the uncertainty of the directionality of the detected event can be greater than 5 degrees, for example, depending on the microphone sensor array's measuring and/or detecting capability. In some embodiments, each meeting camera can be configured to cast rays that can spread out in a wedge shape to address the uncertainty of a direction of the audio generating source (e.g., M1 speaking).

FIG. 9B shows exemplary ray castings by the meeting cameras 100a and 100b. For example, the meeting camera 100a's ray casting 902 can be represented as grey pixels extending from the meeting camera 100a's view point toward the detected event (e.g., audio sound of M1 speaking). Similarly, the meeting camera 100b's ray casting 904 can be represented as grey pixels extending from the meeting camera 100b's view point toward the detected event (e.g., audio sound of M1 speaking). For example, the rays (e.g., 902 and 904) can spread out in a wedge shape to address the uncertainty of a direction of the audio generating source (e.g., M1 speaking). For example, the microphone sensor array 4 in the meeting camera 100a or 100b can be configured to detect a direction of the audio generating source (e.g., M1 speaking) within 5 degrees of accuracy. In such case, the meeting cameras can be configured to cast rays that can spread out 5 degrees or more. In some embodiments, the rays from the meeting camera 100a and the meeting camera 100b can converge (e.g., at the detected event such as sound of M1 speaking). FIG. 9B shows the 2-D grid map areas where the rays converged as black pixels 906.

In some embodiments, the map points (e.g., the "pixels" of the 2-D grid 900 in FIGS. 9A-9B) where the ray is cast can be incremented, and the map points near where the ray is cast can be incremented as well. As shown in FIG. 9B, the incremented map points can be represented by grey or black color pixels. For example, black color can represent higher map points (e.g., where the rays converged), and grey color can represent lower map points (e.g., map points that are less than the map points represented by black). For example, black pixels 906 in FIG. 9B can represent 2-D grid map areas with peak map points (e.g., high map points in the 2-D grid map). In some embodiments, the meeting camera's processor can be configured to use a weighted average peak finder to provide a location of a person or person "blob" (e.g., as audio event generator) in the 2-D spatial map. For example, FIG. 9B represents the location of a person or person blob as black pixels 906 (e.g., a location of M1 who generated an audio event by speaking). In some embodiments, the bearings or angles from each meeting camera (100a and 100b) to the location of the blob (e.g., black pixels 906 as shown in FIG. 9B) can be used to label the "long term people" tracking.

The determination of which map points near where the ray is cast to increment may be based on the resolution of the sensor that is detecting the event along the ray. For example, if an audio sensor is known to have a resolution of approximately 5 degrees, then map points that are within 5 degrees of the cast ray are incremented. In contrast, if a video sensor (e.g., a camera) has a higher resolution, then only the map points within the higher resolution deviance from the cast ray are incremented.

In some embodiments, a 2-D spatial map (e.g., an item correspondence map) as represented in FIGS. 9A-9B can be implemented by the meeting cameras to determine that only one camera view of a meeting participant is shown. Based on the 2-D spatial map (e.g., an item correspondence map) processing as represented in FIGS. 9A-9B, the meeting camera may not composite a video signal CO to show the same meeting participant side-by-side in the two sub-scenes with different points of view (e.g., a view of the person from the primary meeting camera's panorama view side-by-side with a view of the same person from the secondary meeting camera's panorama view). For example, if the meeting camera's 2-D spatial map processing detects the person blob (e.g., represented by black pixels 906 in FIG. 9B) in the panorama views, the meeting camera can be configured to composite a video signal CO to show only one panorama view of the person blob in the sub-scene.

In some embodiments, an image recognition processing can be implemented by the meeting cameras to determine that only one camera view of a meeting participant is shown. For example, the meeting camera's processor can be configured to use face recognition processing to detect the meeting participant's face. Based on the face recognition processing of the meeting participants, the meeting camera may not composite a video signal CO to show the same meeting participant side-by-side in the two sub-scenes with different points of view (e.g., a view of the person from the primary meeting camera's panorama view side-by-side with a view of the same person from the secondary meeting camera's panorama view). For example, if the meeting camera's face recognition processing detects the same face in the panorama views, the meeting camera can be configured to composite a video signal CO to show only one panorama view of the meeting participant with the detected face in the sub-scene.

In another example, the camera's processor can be configured to recognize meeting participants based on color signatures. For example, the meeting camera's processor can be configured to detect color signature(s) (e.g., certain color, color pattern/combination of clothing and/or hair, etc.) of each meeting participant. Based on the color signatures of the meeting participants, the meeting camera may not composite a video signal CO to show the same meeting participant in the two sub-scenes with different points of view (e.g., a view of the person from the primary meeting camera's panorama view side-by-side with a view of the same person from the secondary meeting camera's panorama view). For example, if the meeting camera's color signature processing detects the same or similar color signature(s) corresponding to a meeting participant in the panorama views, the meeting camera can be configured to composite a video signal CO to show only one panorama view of the meeting participant with the detected color signature(s).

In some embodiments, audio response can be inconsistent among the devices due to sound volumes, and a room configuration can have non-linear effects on measured volume. In some embodiments, a geometric approach relying on a common coordinate system and measured directions of sound events can work, but may not include gaze directions, and may not properly select a face-on view of a speaker. In some embodiments, gaze directions can be an additional cue permitting the primary meeting camera to choose a camera that gives the best frontal view. In some embodiments, relatively low resolution images can be used by a face detection algorithm, and gaze direction determined by face detection algorithms can be improved by implementing a 2-D probability map and weighted centroid detection technique as discussed herein.

In some embodiments, the meeting camera can provide a webcam signal CO with multiple panels or subscenes on screen simultaneously, to filter out repetitive displays, a spatial correspondence map can allow the meeting camera to infer which items in each meeting camera's long term person map correspond to items in the other meeting camera's map.

Two or More Units—Designated Views

In some embodiments, to select an arbitrary designated view as shown in FIG. 7C, input coordinates from the controller app (e.g., in a mobile device 70, in a host computer 40, etc.) can overlap ranges scanned from each camera. The designated view may hop between paired cameras either manually or in response to scrolling a selection from near one camera to near another. For example, this can allow selection of an angle of view, a magnification level, and an inclination angle, and remaps selected angle from a controlling application to allow full scans of all paired meeting cameras' fields of view.

In some embodiments, a meeting camera (e.g., tabletop 360 camera) may switch between being in the Pair or Lone/Solitary mode based on detections that are continuously or sporadically monitored. For example, if a line of sight is broken or broken for a predetermined period of time, each of the primary and secondary meeting cameras may revert to solitary operation, and may re-pair using previously established credentials when coming back into a common line of sight. In another example, if the secondary meeting camera (e.g., meeting camera 100b) is plugged into a USB port of a host computer, and a videoconferencing platform begins to use or connect to the secondary meeting camera as a solitary unit, both primary and secondary cameras may revert to solitary operation, and may re-pair, again, once the secondary camera is disconnected. In some embodiments, the meeting cameras can be configured to continue to monitor for the loss of the triggering 'solitary mode' event, and again pair autonomously and immediately once the 'solitary mode' trigger is no longer present.

Paired Unit Audio Protocols

In some embodiments, a paired set of primary and secondary meeting cameras may exchange audio exchange protocol in a connectionless UDP stream in each direction.

In some embodiments, the meeting cameras' speakers, e.g., audio generally received from a remote source via the host computer, can be emitted simultaneously from both camera speakers. For example, the primary role unit may send audio frames (e.g., 20 ms per frame) across UDP to the secondary role unit (e.g., addressing provided by a higher layer such as the 'Switchboard', WiFi p2P, or Bluetooth). In some embodiments, when this data is received by the secondary role unit, the data can be buffered to smooth out WiFi imposed jitter (e.g., out of order frames or lost frames) and then is presented to the speaker in the same manner as local speaker.

In some embodiments, the meeting cameras' microphones can be configured to capture, e.g., audio generally received by each unit. For example, the secondary meeting camera may send audio frames (e.g., also 20 ms per frame) across UDP to the primary meeting camera. For example, the address used as the destination for microphone data can be the source address for speaker stream. In some embodiments, when the primary meeting camera receives the microphone data from the second meeting camera, it can be passed through a similar jitter buffer, and then mixed with the microphone data from the primary's microphones.

In some embodiments, a synchronization between the two meeting cameras can be maintained such that the speakers in the two meeting cameras can appear to be playing the same sound at the same time. In some embodiments, when the two microphone streams are mixed together, it may be desirable to have no discernible echo between the two microphone streams.

In the following discussion, the "remote" unit is the one from which audio data is received (e.g., a primary meeting camera sending the audio data can be a remote unit, or a secondary meeting camera sending the audio data can be a remote unit) or otherwise according to context, as would be understood by one of ordinary skill in the art.

In some embodiments, a WiFi network channel can experience impairments from time to time. For example, when the WiFi network channel in impaired, the data packets that are transmitted via the WiFi can be lost, or delivered late. For example, a packet may be deemed to be late (or missing) when the underlying audio devices need the audio data from the remote unit and the data is not available. For example, the meeting camera may need to present the audio data from the remote unit to either the remote speaker or the local speaker mixer. At this point, in some embodiments, the meeting camera system can be configured to attempt an error concealment. In some embodiments, the receiving device may insert data to replace any missing data. In order to maintain synchronization, when the remote data becomes available, the inserted data can be thrown away.

In some embodiments, a frame may be determined to be late by a timer mechanism that predicts the arrival time of the next packet. For example, in order to maintain that the audio is synchronous, the receiving or remote system may be expecting a new frame every 20 ms. In some embodiments, in the meeting cameras (e.g., 100a and 100b in FIG. 1C), audio jitter buffers may allow for a packet to be up 100 ms late, and if the packets are arriving later than 100 ms, the data may not be available when needed.

In some embodiments, a frame may be determined to be missing using a sequence number scheme. For example, the header for each frame of audio can include a monotonically increasing sequence number. In some embodiments, if the remote meeting camera receives a frame with a sequence number that is unexpected, it may label the missing data as lost. In some embodiments, a WiFi network may not be configured to include a mechanism for duplicating frames, so this may not be explicitly handled.

In some embodiments, packet errors may arise when data from the remote meeting camera is either late or missing completely. In this situation, the meeting camera can be configured to conceal any discontinuities in sound. For example, with respect to error concealment for speakers, one explicit error concealment mechanism for the speaker path is to fade out audio. In some embodiments, if a frame of audio is lost and replaced with zeros, the resulting audio can have discontinuities that can be heard as clicks and pops. In some circumstances, these transients (e.g., discontinuities) can damage the speaker system.

In one implementation, the speaker system can maintain a single frame buffer of audio between the jitter buffer and output driver. In the normal course of events, this data can be transferred to the output driver. In some embodiments, when it is determined that zeros need to be inserted, this frame can be fade out where the volume of the data in this buffer can be reduced from full to zero across this buffer. In some embodiments, this can provide a smoother transition than simply inserting zeros. In some embodiments, this takes place over about 20 ms, which can blunt more extreme transients. Similarly, when the remote stream is resumed the first buffer can be faded in.

In some embodiments, the meeting camera(s) can be configured to perform error concealment for microphones. For example, the source of audio for each microphone can be the same (e.g., the same persons speaking in the same room). Both meeting cameras' microphone arrays can capture the same audio (e.g., with some volume and noise degradation). In some embodiments, when a primary meeting camera determines that there is missing or late microphone audio from the secondary camera unit, the primary role unit can be configured to replace the missing data with zeros. For example, the two streams from the two units are mixed, and this may not result in significant discontinuities on the audio. In some embodiments, mixing the audio streams can lead to volume changes on the microphone stream as it switches between using one and two streams. In order to ameliorate this effect, the primary meeting camera can be configured to maintain a measurement of the volume of primary microphone stream and the mixed stream. In some embodiments, when the secondary stream is unavailable, gain can be applied to the primary stream such that the sound level can remain roughly the same as the sum of the two streams. For example, this can limit the amount warbling that microphone stream can exhibit when transitioning between one and two streams. In some embodiments, the volume can be crossfaded to prevent abrupt transitions in volume.

EXAMPLE

Figure 10:
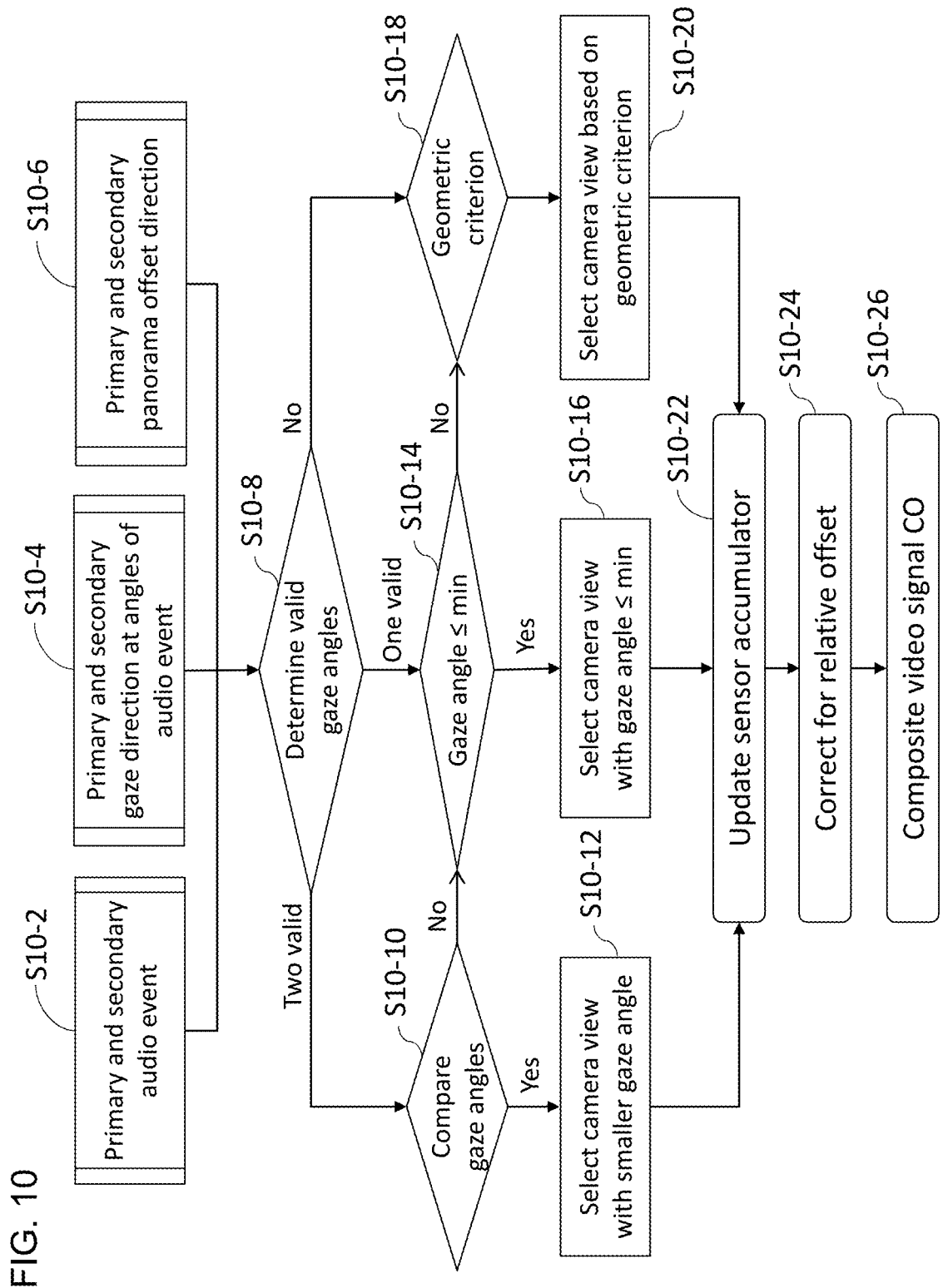
FIG. 10 shows an exemplary process for selecting a camera view from two meeting cameras according to aspects of the disclosed subject matter.

FIG. 10 shows an exemplary process for selecting a camera view from two meeting cameras according to aspects of the disclosed subject matter. In some embodiments, FIG. 10's exemplary process for selecting a camera view from the two meeting cameras (e.g., meeting cameras 100a and 100b as described herein) can be implemented by a primary role meeting camera's processor. Steps S10-2, S10-4, and S10-6 can be the inputs to this camera view selection process.

As shown in step S10-2, the inputs can include the audio events (or other events described herein) detected by the two meeting cameras. For example, the inputs can include angles of the detected audio events for each meeting camera. For example, the detected audio events can be one of the meeting participants speaking (e.g., a meeting participant M1 is the speaker SPKR in FIG. 7A and a meeting participant M2 is the speaker SPKR in FIG. 7B), and the inputs can include the bearing, angle, or location of the speaker SPKR for each meeting camera.

As shown in step S10-4, the inputs can also include the gaze directions for each angle of the detected audio events. For example, the inputs can be the gaze directions of meeting participant who is speaking (e.g., SPKR). The gaze direction can be measured as an angle observed for the face of the speaker SPKR. For example, the gaze angle measured by the meeting camera 100a can be 0 degree if the speaker's face (e.g., gaze) is directly facing the meeting camera. In another example, the gaze angle measured by the meeting camera 100a can increase as the speaker's face (e.g., gaze) faces away more from the meeting camera. For example, the gaze angle measured by the meeting camera 100a can be 90 degrees when the meeting camera 100a captures the profile view (e.g., side view of the face) of the speaker's face. In some embodiments, the gaze angle can be measured in absolute values (e.g., no negative gaze angles), such that a measured gaze angle for the speaker's face (e.g., gaze) can be a positive angle regardless of whether the speaker is gazing to the left or to the right side of the meeting camera.

As shown in step S10-6, the inputs can also include offsets of orientation of each meeting camera relative to a common coordinate system as described herein. For example, one offset can be based on an angle of the primary role meeting camera in the secondary role meeting camera's field of view. Another offset can be based on an angle of the secondary role meeting camera in the primary role meeting camera's field of view. In some embodiments, when establishing a common coordinate system (e.g., during a paring/co-location process) of the two meeting cameras, the secondary role camera can be designated to be at 180 degrees in the primary role camera's field of view, while the primary role camera can be designated to be at 0 degrees in the secondary role camera's field of view.

In some embodiments, the inputs as shown in steps S10-2, S10-4, and S10-6 can be provided to the primary role meeting camera's processor to perform the camera view selection process described herein. In step S10-8, the processor can be configured to determine whether the gaze direction data from step S10-4 is valid. For example, the gaze direction data from the primary role or secondary role camera can be missing or not properly determined. For example, if the processor determines that the gaze angles for the primary role camera and the secondary role camera are both valid (e.g., two valid gaze angles each for the primary and secondary), the process can proceed to step S10-10. For example, if the processor determines that one gaze angle is valid (e.g., either for the primary or the secondary), the process can proceed to step S10-14. For example, if the processor determines that the valid gaze angle data is not available, the process can proceed to step S10-18.

In some embodiments, if the gaze angles for the two meeting cameras are both valid, the primary role meeting camera's processor can be configured to compare the two valid gaze angles as shown in step S10-10. For example, if the difference between the two gaze angles is greater than or equal to a minimum threshold value (e.g., the difference between their subject-to-camera vectors is sufficient), then the processor can be configured to select the camera view with the smaller gaze angle as shown in step S10-12. For example, a minimum threshold value for step S10-10 can be 20 degrees (or any values between 0-45 degrees). For example, if the difference between the two valid gaze angle is greater than or equal to 20 degrees, the processor can be configured to select the camera view with the smaller gaze angle as shown in step S10-12. The selected camera view can be a panorama view for cropping and rendering any particular subscene view. In some embodiments, if the difference between the two valid gaze angle is less than a minimum threshold value, the process can proceed to step S10-14 or step S10-18, or the process can proceed to step S10-12 by selecting the camera view with the smaller gaze angle.

In some embodiments, if one valid gaze angle is available, the primary role meeting camera's processor can be configured to perform step S10-14 by comparing the one valid gaze angle with a minimum threshold value (e.g., whether the gaze is sufficiently directed to the camera, such that the gaze angle is within a certain minimum threshold degrees of a subject-to-camera vector). For example, a minimum threshold value for step S10-14 can be 30 degrees (or any values between 0-45 degrees). For example, if the valid gaze angle is less than or equal to 30 degrees, the processor can be configured to proceed to step S10-16 and select the camera view with the gaze angle that is within the minimum threshold value. The selected camera view can be a panorama view for cropping and rendering any particular subscene view. In some embodiments, if the valid gaze angle above the minimum threshold value, the process can proceed to step S10-18, or the process can select the camera view with the valid gaze angle.

In some embodiments, if the valid gaze angle is not available, or the valid gaze angles do not pass the conditions in step S10-10 or S10-14, the processor can be configured to perform step S10-18 by selecting the camera view based on a geometric criterion (e.g., as illustrated in FIG. 8). For example, the processor can use the angles or directions of the detected audio events for each meeting camera to determine if the detected audio events are closer to the primary role camera or the secondary camera. In step S10-20, the processor can be configured to select the camera view that is closer to the perceived audio events (e.g., as illustrated in FIG. 8).

In step S10-22, the aggregate map for tracking the detections described herein can be updated using the sensor accumulator to accumulate sensor data. For example, the inputs described in steps S10-2, S10-4, and S10-6 can be updated. In step S10-24, the selected camera view can be corrected for relative offsets of video orientation of each camera relative to a common coordinate system. In step S10-26, the primary role meeting camera can be configured to composite a webcam video signal CO (e.g., as illustrated in FIGS. 7A-7C).

In the present disclosure, "wide angle camera" and "wide scene" is dependent on the field of view and distance from subject, and is inclusive of any camera having a field of view sufficiently wide to capture, at a meeting, two different persons that are not shoulder-to-shoulder.

"Field of view" is the horizontal field of view of a camera, unless vertical field of view is specified. As used herein, "scene" means an image of a scene (either still or motion) captured by a camera. Generally, although not without exception, a panoramic "scene" SC is one of the largest images or video streams or signals handled by the system, whether that signal is captured by a single camera or stitched from multiple cameras. The most commonly referred to scenes "SC" referred to herein include a scene SC which is a panoramic scene SC captured by a camera coupled to a fisheye lens, a camera coupled to a panoramic optic, or an equiangular distribution of overlapping cameras. Panoramic optics may substantially directly provide a panoramic scene to a camera; in the case of a fisheye lens, the panoramic scene SC may be a horizon band in which the perimeter or horizon band of the fisheye view has been isolated and dewarped into a long, high aspect ratio rectangular image; and in the case of overlapping cameras, the panoramic scene may be stitched and cropped (and potentially dewarped) from the individual overlapping views. "Sub-scene" or "subscene" means a sub-portion of a scene, e.g., a contiguous and usually rectangular block of pixels smaller than the entire scene. A panoramic scene may be cropped to less than 360 degrees and still be referred to as the overall scene SC within which sub-scenes are handled.

As used herein, an "aspect ratio" is discussed as a H:V horizontal:vertical ratio, where a "greater" aspect ratio increases the horizontal proportion with respect to the vertical (wide and short). An aspect ratio of greater than 1:1 (e.g., 1.1:1, 2:1, 10:1) is considered "landscape-form", and for the purposes of this disclosure, an aspect of equal to or less than 1:1 is considered "portrait-form" (e.g., 1:1.1, 1:2, 1:3).

A "single camera" video signal may be formatted as a video signal corresponding to one camera, e.g., such as UVC, also known as "USB Device Class Definition for Video Devices" 1.1 or 1.5 by the USB Implementers Forum, each herein incorporated by reference in its entirety (see, e.g., http://www.usb.org/developers/docs/devclass_docs/USB_Video_Class_1_5.zip or USB_Video_Class_1_1_090711.zip at the same URL). Any of the signals discussed within UVC may be a "single camera video signal," whether or not the signal is transported, carried, transmitted or tunneled via USB. For the purposes of this disclosure, the "webcam" or desktop video camera may or may not include the minimum capabilities and characteristics necessary for a streaming device to comply with the USB Video Class specification. USB-compliant devices are an example of a non-proprietary, standards-based and generic peripheral interface that accepts video streaming data. In one or more cases, the webcam may send streaming video and/or audio data and receive instructions via a webcam communication protocol having payload and header specifications (e.g., UVC), and this webcam communication protocol is further packaged into the peripheral communications protocol (e.g. UBC) having its own payload and header specifications.

A "display" means any direct display screen or projected display. A "camera" means a digital imager, which may be a CCD or CMOS camera, a thermal imaging camera, or an RGBD depth or time-of-flight camera. The camera may be a virtual camera formed by two or more stitched camera views, and/or of wide aspect, panoramic, wide angle, fisheye, or catadioptric perspective.

A "participant" is a person, device, or location connected to the group videoconferencing session and displaying a view from a web camera; while in most cases an "attendee" is a participant, but is also within the same room as a meeting camera 100. A "speaker" is an attendee who is speaking or has spoken recently enough for the meeting camera 100 or related remote server to identify him or her; but in some descriptions may also be a participant who is speaking or has spoken recently enough for the videoconferencing client or related remote server to identify him or her.

"Compositing" in general means digital compositing, e.g., digitally assembling multiple video signals (and/or images or other media objects) to make a final video signal, including techniques such as alpha compositing and blending, anti-aliasing, node-based compositing, keyframing, layer-based compositing, nesting compositions or comps, deep image compositing (using color, opacity, and depth using deep data, whether function-based or sample-based). Compositing is an ongoing process including motion and/or animation of sub-scenes each containing video streams, e.g., different frames, windows, and subscenes in an overall stage scene may each display a different ongoing video stream as they are moved, transitioned, blended or otherwise composited as an overall stage scene. Compositing as used herein may use a compositing window manager with one or more off-screen buffers for one or more windows or a stacking window manager. Any off-screen buffer or display memory content may be double or triple buffered or otherwise buffered. Compositing may also include processing on either or both of buffered or display memory windows, such as applying 2D and 3D animated effects, blending, fading, scaling, zooming, rotation, duplication, bending, contortion, shuffling, blurring, adding drop shadows, glows, previews, and animation. It may include applying these to vector-oriented graphical elements or pixel or voxel-oriented graphical elements. Compositing may include rendering pop-up previews upon touch, mouse-over, hover or click, window switching by rearranging several windows against a background to permit selection by touch, mouse-over, hover, or click, as well as flip switching, cover switching, ring switching, Expose switching, and the like. As discussed herein, various visual transitions may be used on the stage—fading, sliding, growing or shrinking, as well as combinations of these. "Transition" as used herein includes the necessary compositing steps.

A 'tabletop 360' or 'virtual tabletop 360' panoramic meeting 'web camera' may have a panoramic camera as well as complementary 360 degree microphones and speakers. The tabletop 360 camera is placed roughly in the middle of a small meeting, and connects to a videoconferencing platform such as Zoom, Google Hangouts, Skype, Microsoft Teams, Cisco Webex, or the like via a participant's computer or its own computer. Alternatively, the camera may be inverted and hung from the ceiling, with the picture inverted. "Tabletop" as used herein includes inverted, hung, and ceiling uses, even when neither a table nor tabletop is used.

"Camera" as used herein may have different meanings, depending upon context. A "camera" as discussed may just be a camera module—a combination of imaging elements (lenses, mirrors, apertures) and an image sensor (CCD, CMOS, or other), which delivers a raw bitmap. In some embodiments, "camera" may also mean the combination of imaging elements, image sensor, image signal processor, camera interface, image front end ("IFE"), camera processor, with image processing engines ("IPEs"), which delivers a processed bitmap as a signal. In another embodiments, "camera" may also mean the same elements but with the addition of an image or video encoder, that delivers an encoded image and/or video and/or audio and/or RGBD signal. Even further, "camera" may mean an entire physical unit with its external interfaces, handles, batteries, case, plugs, or the like. "Video signal" as used herein may have different meanings, depending upon context. The signal may include only sequential image frames, or image frames plus corresponding audio content, or multimedia content. In some cases the signal will be a multimedia signal or an encoded multimedia signal. A "webcam signal" will have a meaning depending on context, but in many cases will mean a UVC 1.5 compliant signal that will be received by an operating system as representing the USB-formatted content provided by a webcam plugged into the device using the operating system, e.g., a signal formatted according to one or more "USB Video Class" specifications promulgated by the USB Implementers Forum (USB-IF). See, e.g., https://en.wikipedia.org/wiki/USB_video_device_class and/or https://www.usb.org/sites/default/files/USB_Video_Class_1_5.zip, hereby incorporated by reference in their entireties. For example, different operating systems include implementations of UVC drivers or gadget drivers. In all cases, the meaning within context would be understood by one of skill in the art.

"Received" as used herein can mean directly received or indirectly received, e.g., by way of another element.

The steps of a method or algorithm described in connection with the embodiments disclosed herein may be embodied directly in hardware, in a software module executed by a processor, or in a combination of the two. A software module may reside in one or more RAM memory, flash memory, ROM memory, EPROM memory, EEPROM memory, registers, hard disk, a removable disk, a CD-ROM, or another form of computer-readable storage medium. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

All of the processes described above may be embodied in, and fully automated via, software code modules executed by one or more general purpose or special purpose computers or processors. The code modules may be stored on one or more of any type of computer-readable medium or other computer storage device or collection of storage devices.

Some or all of the methods may alternatively be embodied in specialized computer hardware.

All of the methods and tasks described herein may be performed and fully automated by a computer system. The computer system may, in some cases, include single or multiple distinct computers or computing devices (e.g., physical servers, workstations, storage arrays, etc.) that may communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. Specifically, any of the functions of manipulating or processing audio or video information described as being performed by meeting camera 100, 100a, and/or 100b can be performed by other hardware computing devices.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
a processor;
a camera operatively coupled to the processor and configured to capture a first panorama view;
an audio sensor system operatively coupled to the processor and configured to capture audio corresponding to the first panorama view;
a first communication interface operatively coupled to the processor; and
a memory storing computer-readable instructions that, when executed, cause the processor to:
determine a first bearing of a person within the first panorama view,
determine a first gaze direction of the person within the first panorama view,
receive, from an external source and via the first communication interface, a second panorama view,
receive, from the external source via the first communication interface, a second bearing of the person within the second panorama view,
receive, from the external source via the first communication interface, a second gaze direction of the person within the second panorama view,
compare the first gaze direction and the second gaze direction,
select, based on comparing the first gaze direction and the second gaze direction, a selected panorama view from between the first panorama view and the second panorama view,
select, based on the selected panorama view, a selected bearing of the person from between the first bearing of the person and the second bearing of the person,
form a localized subscene video signal based on the selected panorama view along the selected bearing of the person,
generate a stage view signal based on the localized subscene video signal,
generate a scaled panorama view signal based on the first panorama view or the second panorama view,
composite a composited signal comprising the scaled panorama view signal and the stage view signal,
receive audio corresponding to the second panorama view,
detect an error in the audio corresponding to the second panorama view by finding a missing audio data of the audio corresponding to the second panorama view,
conceal the detected error in the audio corresponding to the second panorama view by replacing the missing audio data,
synchronize the audio corresponding to the first panorama view and the audio corresponding to the second panorama view,
merge the audio corresponding to the first panorama view and the audio corresponding to the second panorama view into a merged audio signal,
composite the merged audio signal with the composited signal, and
transmit the composited signal.

2. The system of claim 1, wherein the first communication interface is a wireless interface.

3. The system of claim 1, further comprising a second communication interface operatively coupled to the processor, the second communication interface being different from the first communication interface, and wherein the composited signal is transmitted via the second communication interface.

4. The system of claim 3, wherein the second communication interface is a wired interface.

5. The system of claim 1, wherein determining the first bearing of the person within the first panorama view is based on information from the audio sensor system.

6. The system of claim 5, wherein the computer-readable instructions, when executed, further cause the processor to:
establish a common coordinate system of the camera and the external source,
determine an offset of a relative orientation between the camera and the external source in the common coordinate system, and
determine, based on the offset, that the first bearing of the person within the first panorama view is directed to a same location as the second bearing of the person in the second panorama view.

7. The system of claim 1, wherein:
the first gaze direction is determined as a first angle of the person's gaze away from the camera;

the second gaze direction is a measurement of a second angle of the person's gaze away from a video sensor of the external source; and selecting the selected panorama view based on comparing the first gaze direction and the second gaze direction comprises selecting the first panorama view as the selected panorama view when the first angle is smaller than the second angle, or selecting the second panorama view as the selected panorama view when the second angle is smaller than the first angle.

8. The system of claim 1, wherein the computer-readable instructions, when executed, further cause the processor to:
determine a volume of the merged audio;
determine a portion of the audio corresponding to the first panorama view merged with a replaced portion of the audio corresponding to the second panorama view; and
adjust a relative gain of the determined portion of the audio corresponding to the first panorama view to increase a volume of the determined portion of the audio corresponding to the first panorama view.

9. The system of claim 1, wherein the computer-readable instructions, when executed, further cause the processor to:
determine a first coordinate map of the first panorama view;
receive, from the external source, a second coordinate map of the second panorama view via the first communication interface;
determine a coordinate instruction associated with the first coordinate map of the first panorama view and the second coordinate map of the second panorama view;
determine a coordinate of a designated view in the first panorama view or the second panorama view based on the coordinate instruction; and
further composite the designated view with the composited signal.

10. The system of claim 1, wherein
the camera is configured to capture the first panorama view with a horizontal angle of 360 degrees; and
the second panorama view has a horizontal angle of 360 degrees.

11. A method comprising:
capturing a first panorama view with a camera;
capturing audio corresponding to the first panorama view;
determining a first bearing of a person within the first panorama view;
determining a first gaze direction of the person within the first panorama view;
receiving, from an external source and via a first communication interface, a second panorama view;
receiving, from the external source via the first communication interface, a second bearing of the person within the second panorama view;
receiving, from the external source via the first communication interface, a second gaze direction of the person within the second panorama view;
comparing the first gaze direction and the second gaze direction;
selecting, based on comparing the first gaze direction and the second gaze direction, a selected panorama view from between the first panorama view and the second panorama view;
selecting, based on the selected panorama view, a selected bearing of the person from between the first bearing of the person and the second bearing of the person;
forming a localized subscene video signal based on the selected panorama view along the selected bearing of the person;

generating a stage view signal based on the localized subscene video signal;
generating a scaled panorama view signal based on the first panorama view or the second panorama view;
compositing a composited signal comprising the scaled panorama view signal and the stage view signal;
receiving audio corresponding to the second panorama view;
detecting an error in the audio corresponding to the second panorama view by finding a missing audio data of the audio corresponding to the second panorama view;
concealing the detected error in the audio corresponding to the second panorama view by replacing the missing audio data;
synchronizing the audio corresponding to the first panorama view and the audio corresponding to the second panorama view;
merging the audio corresponding to the first panorama view and the audio corresponding to the second panorama view into a merged audio signal;
further compositing the merged audio signal with the composited signal; and
transmitting the composited signal.

12. The method of claim 11, wherein the first communication interface is a wireless interface.

13. The method of claim 11, wherein the composited signal is transmitted via a second communication interface that is different from the first communication interface.

14. The method of claim 13, wherein the second communication interface is a wired interface.

15. The method of claim 11, wherein determining the first bearing of the person within the first panorama view is based on information from an audio sensor system.

16. The method of claim 15, further comprising:
establishing a common coordinate system of the camera and the external source;
determining an offset of a relative orientation between the camera and the external source in the common coordinate system; and
determining, based on the offset, that the first bearing of the person within the first panorama view is directed to a same location as the second bearing of the person in the second panorama view.

17. The method of claim 11, wherein:
the first gaze direction is determined as a first angle of the person's gaze away from the camera;
the second gaze direction is a measurement of a second angle of the person's gaze away from a video sensor of the external source; and
selecting the selected panorama view based on comparing the first gaze direction and the second gaze direction comprises selecting the first panorama view as the selected panorama view when the first angle is smaller than the second angle, or selecting the second panorama view as the selected panorama view when the second angle is smaller than the first angle.

18. The method of claim 11, further comprising:
determining a volume of the merged audio;
determining a portion of the audio corresponding to the first panorama view merged with a replaced portion of audio corresponding to the second panorama view; and
adjusting a relative gain of the determined portion of the audio corresponding to the first panorama view to increase a volume of the determined portion of the audio corresponding to the first panorama view.

19. The method of claim 11, further comprising:
determining a first coordinate map of the first panorama view;
receiving, from the external source, a second coordinate map of the second panorama view via the first communication interface;
determining a coordinate instruction associated with the first coordinate map of the first panorama view and the second coordinate map of the second panorama view;
determining a coordinate of a designated view in the first panorama view or the second panorama view based on the coordinate instruction; and
further compositing the designated view with the composited signal.

20. The method of claim 11, wherein:
the first panorama view has a horizontal angle of 360 degrees; and
the second panorama view has a horizontal angle of 360 degrees.

21. A system comprising:
a processor;
a camera operatively coupled to the processor and configured to capture a first panorama view;
an audio sensor system operatively coupled to the processor and configured to capture audio corresponding to the first panorama view;
a communication interface operatively coupled to the processor; and
a memory storing computer-readable instructions that, when executed, cause the processor to:
receive, from an external source and via the communication interface, a second panorama view,
select a selected panorama view from between the first panorama view and the second panorama view,
form a localized subscene video signal based on the selected panorama view,
generate a stage view signal based on the localized subscene video signal,
generate a scaled panorama view signal based on the first panorama view or the second panorama view,
composite a composited signal comprising the scaled panorama view signal and the stage view signal,
receive audio corresponding to the second panorama view,
detect an error in the audio corresponding to the second panorama view by finding a missing audio data of the audio corresponding to the second panorama view,
conceal the detected error in the audio corresponding to the second panorama view by replacing the missing audio data, and
transmit the composited signal.

22. The system of claim 21, wherein the computer-readable instructions, when executed, further cause the processor to:
determine that the error in the audio is greater than a threshold; and
in response to determining that the error in the audio is greater than the threshold, initiate a WiFi channel frequency change.

23. The system of claim 21, wherein the computer-readable instructions, when executed, further cause the processor to:
determine, based on the audio corresponding to the first panorama view and the audio corresponding to the second panorama view, a physical co-location of the audio sensor system and the external source.

24. The system of claim 21, wherein the computer-readable instructions, when executed, further cause the processor to:
in response to detecting the error in the audio corresponding to the second panorama view, fade out the audio corresponding to the second panorama view.

* * * * *